(12) United States Patent
Dowty et al.

(10) Patent No.: US 10,421,546 B2
(45) Date of Patent: Sep. 24, 2019

(54) AIRCRAFT DOOR AND PRIVACY PANEL ASSEMBLIES

(71) Applicant: Rockwell Collins, Inc., Cedar Rapids, IA (US)

(72) Inventors: Mark B. Dowty, Rural Hall, NC (US); Kent M. Kroener, Cooper City, FL (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 254 days.

(21) Appl. No.: 15/716,205

(22) Filed: Sep. 26, 2017

(65) Prior Publication Data

US 2018/0281963 A1 Oct. 4, 2018

Related U.S. Application Data

(60) Provisional application No. 62/481,616, filed on Apr. 4, 2017.

(51) Int. Cl.
*B64D 11/06* (2006.01)
*B64C 1/14* (2006.01)
*B64D 45/00* (2006.01)

(52) U.S. Cl.
CPC ........ *B64D 11/0606* (2014.12); *B64C 1/1461* (2013.01); *B64D 45/00* (2013.01)

(58) Field of Classification Search
CPC ............................ B64D 11/0606; B64D 45/00
USPC ...................................................... 244/118.5
See application file for complete search history.

(56) References Cited

U.S. PATENT DOCUMENTS

| | | | | |
|---|---|---|---|---|
| 4,597,549 A * | 7/1986 | Ryan | .......................... | B64C 1/10 160/127 |
| 5,816,534 A * | 10/1998 | Schumacher | ...... | B64D 11/0023 244/119 |
| 6,523,779 B1 * | 2/2003 | Michel | ............... | B64D 11/0023 244/118.5 |
| 6,698,690 B2 * | 3/2004 | Novak | .................. | B64C 1/1423 244/118.5 |
| 6,976,658 B2 * | 12/2005 | Sekikawa | ............. | B64C 1/1469 244/118.5 |

(Continued)

FOREIGN PATENT DOCUMENTS

EP 3225548 A1 * 10/2017 ......... B64D 11/0606

*Primary Examiner* — Christopher P Ellis
(74) *Attorney, Agent, or Firm* — Clements Bernard Walker PLLC

(57) ABSTRACT

A panel door assembly for providing access to an aircraft passenger suite includes a stationary panel with a side portion extending between upper and lower ends of the panel door assembly. A lower portion of the stationary panel may extend across a width of the panel door assembly and slide along a rail between open and closed positions. A removable panel may connect to the stationary panel and may include a first latching mechanism connecting the removable panel to an upper portion of the stationary panel and a second latching mechanism connecting the removable panel to the lower portion of the stationary panel. An emergency handle may be connected on an inner side of the removable panel, that when actuated, engages the first latching mechanism and the second latching mechanism, disconnecting the removable panel from the stationary panel and providing an egress path from the suite.

20 Claims, 50 Drawing Sheets

(56) References Cited

U.S. PATENT DOCUMENTS

| | | | | |
|---|---|---|---|---|
| 8,746,739 B2* | 6/2014 | Meggs | ............... | A61G 7/1042 |
| | | | | 104/93 |
| 2003/0189130 A1* | 10/2003 | Dovey | ............... | B64C 1/1469 |
| | | | | 244/118.5 |
| 2005/0178904 A1* | 8/2005 | Mills | ............... | B64D 11/00 |
| | | | | 244/118.5 |
| 2006/0145007 A1* | 7/2006 | Melberg | ............... | B64C 1/1469 |
| | | | | 244/118.5 |
| 2013/0082141 A1* | 4/2013 | Koch | ............... | B64C 1/1469 |
| | | | | 244/118.5 |
| 2013/0241247 A1* | 9/2013 | Wallace | ............... | B64D 11/06 |
| | | | | 297/118 |
| 2014/0158826 A1* | 6/2014 | Young | ............... | B64D 11/02 |
| | | | | 244/118.5 |
| 2015/0307179 A1* | 10/2015 | Ehlers | ............... | B64C 1/20 |
| | | | | 244/118.1 |
| 2016/0298370 A1* | 10/2016 | Druckman | ............... | B64D 11/0606 |
| 2017/0106980 A1* | 4/2017 | Kuyper | ............... | B64D 11/0602 |
| 2019/0144098 A1* | 5/2019 | Gallagher, Jr. | ............... | E05D 11/1007 |
| | | | | 244/118.5 |

\* cited by examiner

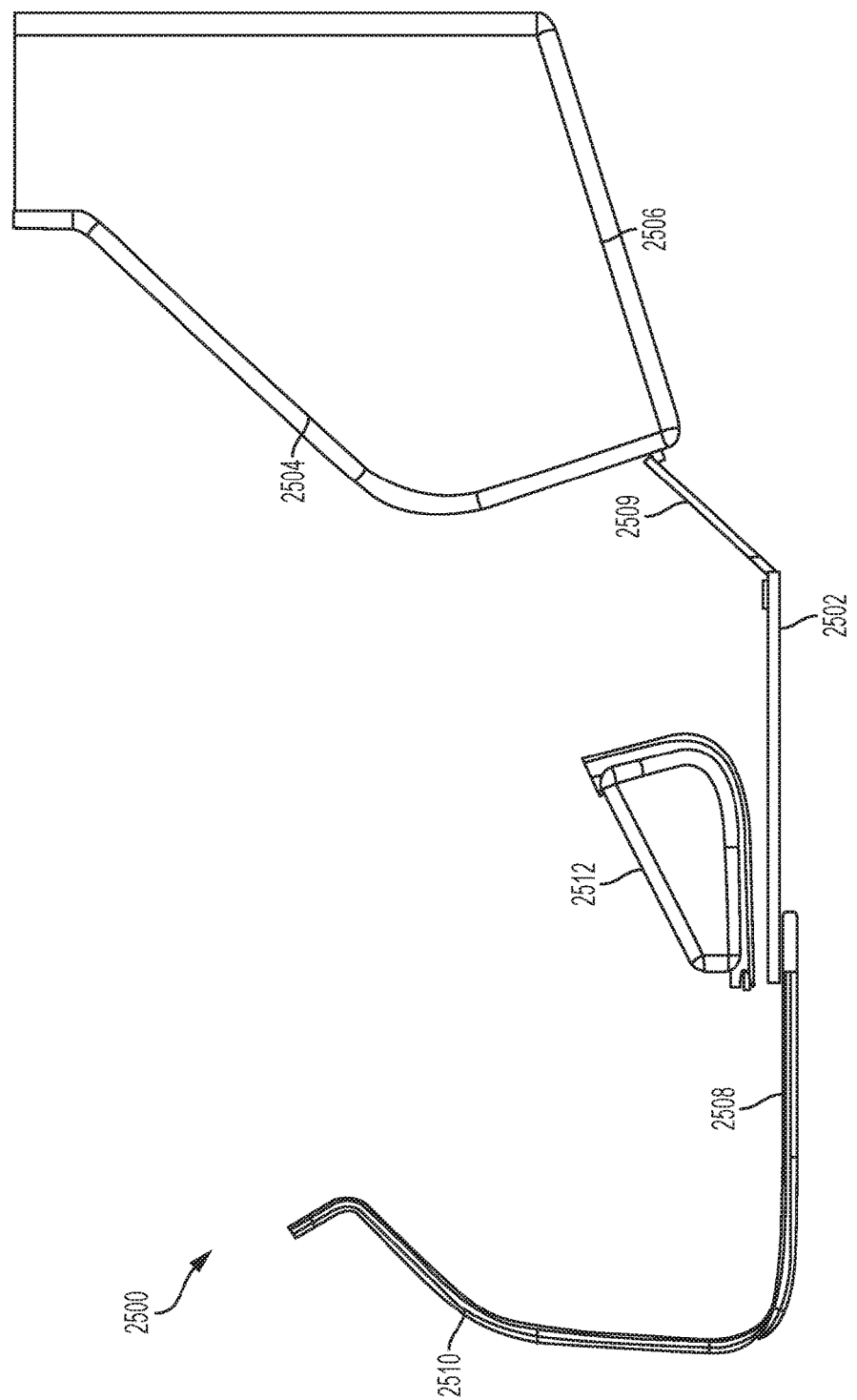

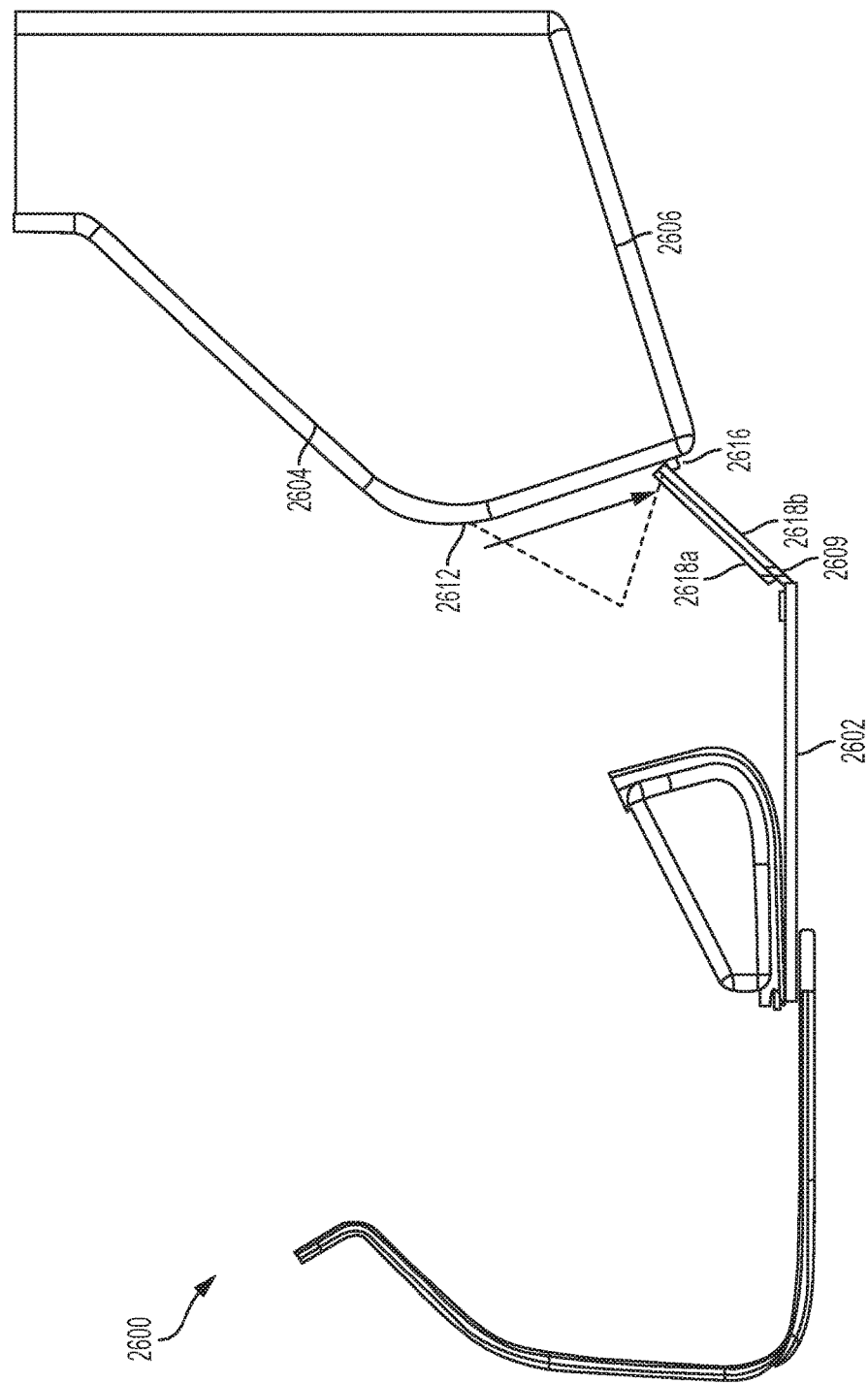

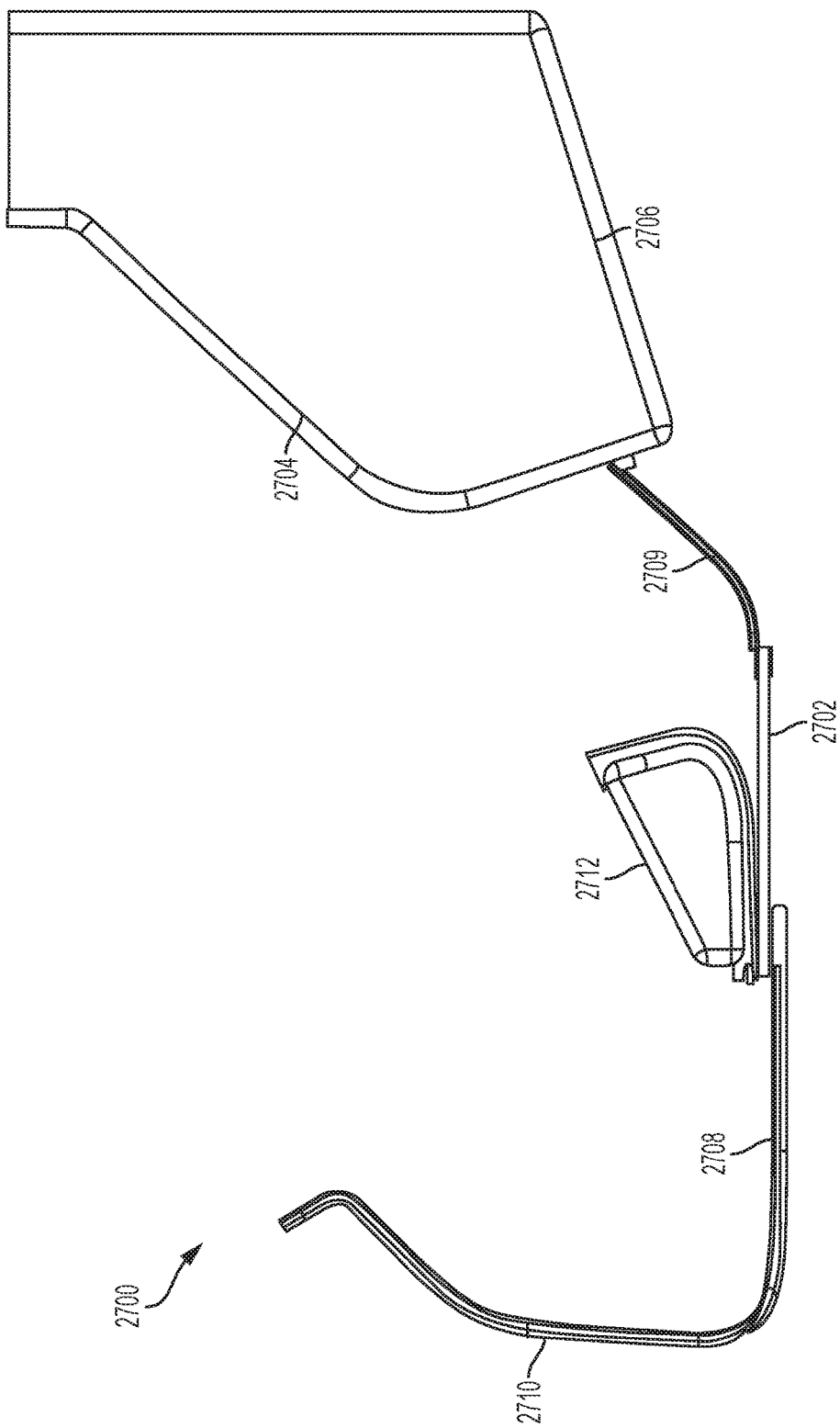

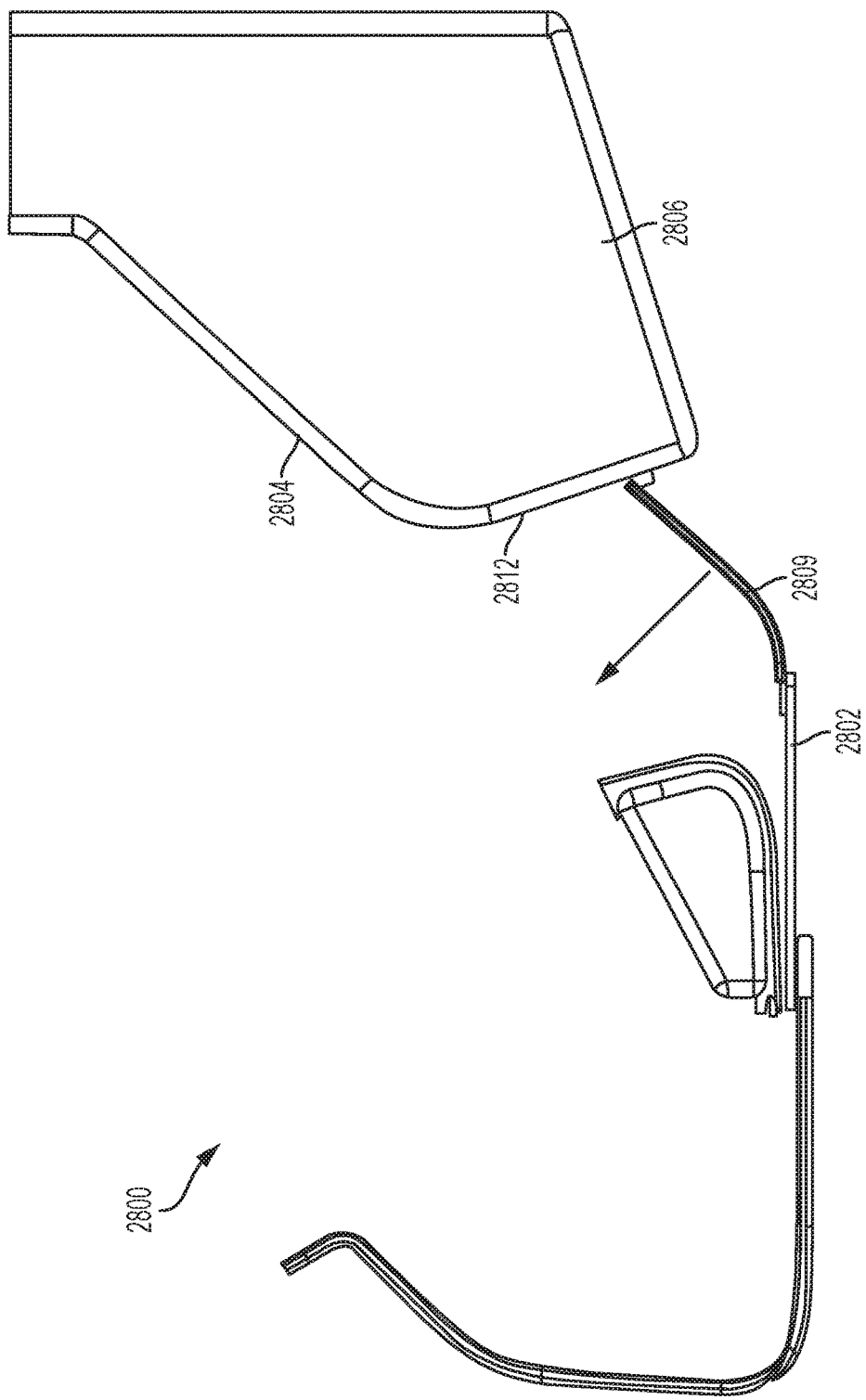

AIRCRAFT DOOR AND PRIVACY PANEL ASSEMBLIES

RELATED APPLICATIONS

This application claims priority to U.S. Provisional Patent Application Ser. No. 62/481,616, entitled "Aircraft Door and Privacy Panel Assemblies," filed Apr. 4, 2017, the contents of which are incorporated by reference in their entirety.

BACKGROUND

In premium class aircraft cabins (e.g., business class, first class), passengers are increasingly afforded larger, more spacious suites that provide privacy from other passengers within the aircraft through various panels, doors, and other cabin monuments that separate the passenger in the suite from the rest of the cabin. However, while attempting to give travelers a highly customized and private travel experience, aircraft cabin designs must still comply with safety and security regulations that regulate a passenger's ability to ingress and egress from any type of seating arrangement in emergencies and/or crash situations. Additional regulations provide aisle clearance specifications that stipulate required amounts of aisle clearance space for safe passage of passengers throughout the aircraft during both normal and emergency situations. Also, security regulations stipulate that flight attendants and other members of the airline crew must have clear sight lines of the passengers within the passenger suites without any obstructions from cabin furniture, suite panels, doors, or any other installed aircraft cabin monuments.

The design of front row passenger suites can be complicated due to the configuration of the suites with respect to forward cabin monuments that are installed forward of the front row passenger suites because the front row passenger suites may be have different relative orientations to the forward cabin monuments than the relative orientations between successive rows of passenger suites. For example, the forward cabin monuments may include various types of cabin furniture such as storage compartments, galley compartments, electronics compartments, and the like. For some front row passenger suite configurations, an aisle-side edge of the suite where a panel door from which a passenger ingresses or egresses from the suite is installed may be in line with an aisle-side edge of the forward cabin monuments. For other front row passenger suite configurations, the aisle-side edge of the suite may be misaligned with the aisle-side edge of the front cabin monuments, increasing the difficulty of designing panel door assemblies that can be adapted between aircraft platforms and configurations.

There is a corresponding need to equip non-suite passenger seats (e.g., coach class seats) with systems that provide privacy and a more intimate environment. Heretofore, use of privacy panels has been limited to deployment on a common armrest disposed between two business class seats.

SUMMARY OF ILLUSTRATIVE EMBODIMENTS

In certain embodiments, a panel door assembly that provides access to an aircraft passenger suite includes a stationary panel with a side portion extending between upper and lower ends of the panel door assembly. A lower portion of the stationary panel extends across a width of the panel door assembly and slides along a rail between an open and closed position. A removable panel connects to the stationary panel and includes a first latching mechanism connecting the removable panel to the upper portion of the stationary panel and a second latching mechanism connecting the removable panel to the lower portion of the stationary panel. An emergency handle is connected on an inner side of the removable panel, that, when actuated, engages the first latching mechanism and the second latching mechanism to disconnect the removable panel from the stationary panel to provide an egress path from the passenger suite.

In some embodiments, the panel door assembly operates as a single panel structure during normal operations. In some implementations, a normal operation handle provides for sliding the panel door assembly along a track between open and closed positions. In an open position, the panel door assembly provides an ingress or egress path into or out of a passenger suite. In a closed position, the panel door assembly separates an interior portion of the passenger suite from the rest of the aircraft cabin.

In certain embodiments, a passenger side of the removable panel includes an emergency handle that actuates upper and lower latching mechanisms to disconnect the removable panel from the stationary panel. The emergency panel is connected to cables that pull upper and lower levers of respective upper and lower latching mechanisms, thereby causing gears connected to pivoting latches to rotate. When the pivoting latches reach an unlatched position, the removable panel disconnects from the stationary panel. In certain embodiments, the removable panel is configured to hinge toward the passenger suite and away from the aisle when disconnecting from the stationary panel.

In certain embodiments, the panel door assembly can be installed in front row passenger suites connecting an aisle-side privacy panel of the passenger suite to forward cabin monuments that form a forward boundary of the passenger suite. In some embodiments, an aisle-side edge of a forward cabin monument is aligned with the aisle-side privacy panel of the passenger suite such that the panel door assembly extends from the privacy panel to the forward cabin monument when in the closed position. In other embodiments, the aisle-side edge of a forward cabin monument is not aligned with the aisle-side privacy panel of the passenger suite so a straight or curved filler door is connected between the panel door assembly and the aisle-side edge of a forward cabin monument.

Benefits of the embodiments described herein include providing both normal and emergency-use operations of the panel door assembly in order to provide maximum privacy and ease of use to the passenger while maintaining emergency ingress/egress paths as well as sight lines for flight crew personnel to have a clear view of the passengers sitting in the passenger suites. Other benefits of the embodiments described herein include providing a panel door assembly that is configurable for various types aircraft cabin and suite configurations, which improves manufacturing and installation efficiency.

In certain coach or business class embodiments, an apparatus and associated methods relate to a flexible privacy panel installed proximate a passenger seat, which at least partially obstructs the view from outside observers into the area around the passenger seat when the flexible privacy panel is in a closed position. In some embodiments, a flexible privacy panel may be in a "flexed-open" state. In some embodiments, a flexible privacy panel may be in a "closed" state, such that the view by outside observers is mostly (if not completely) obstructed by the flexible privacy panel. In some embodiments, the flexible privacy panel may be in a "stowed-open" state. In various embodiments, the flexible privacy panel may be configured to flex to permit ingress to and egress from the area around the passenger seat.

Various embodiments may achieve one or more advantages. For example, some embodiments may at least partially obstruct the view of the area around a passenger seat by outside observers. In some embodiments, the elasticity and stiffness of the flexible privacy panel may be customized to suit a person of average (or below-average) human strength, such that the vast majority of passengers can effectively push open the flexible privacy panel. In some embodiments, a person may use manual force to transition the panel to a "flexed-open" state. In some embodiments, a person may use manual force or electrical power to transition the panel between "closed" and "stowed-open" positions. In some embodiments, a mobile device with a flexible privacy panel program may control and monitor the various functions of the flexible privacy panel.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 25A-25D illustrate views of panel door assemblies for front row passenger suites with a straight filler door connecting a panel door assembly to a forward cabin monument;

FIGS. 26A-26F illustrate operation of a straight filler door for a front row passenger suite;

FIGS. 27A-27D illustrate views of panel door assemblies for front row passenger suites with a curved filler door connecting a panel door assembly to a forward cabin monument; and FIGS. 28A-28C illustrate operation of a curved filler door for a front row passenger suite.

DETAILED DESCRIPTION OF ILLUSTRATIVE EMBODIMENTS

Figure 1A:
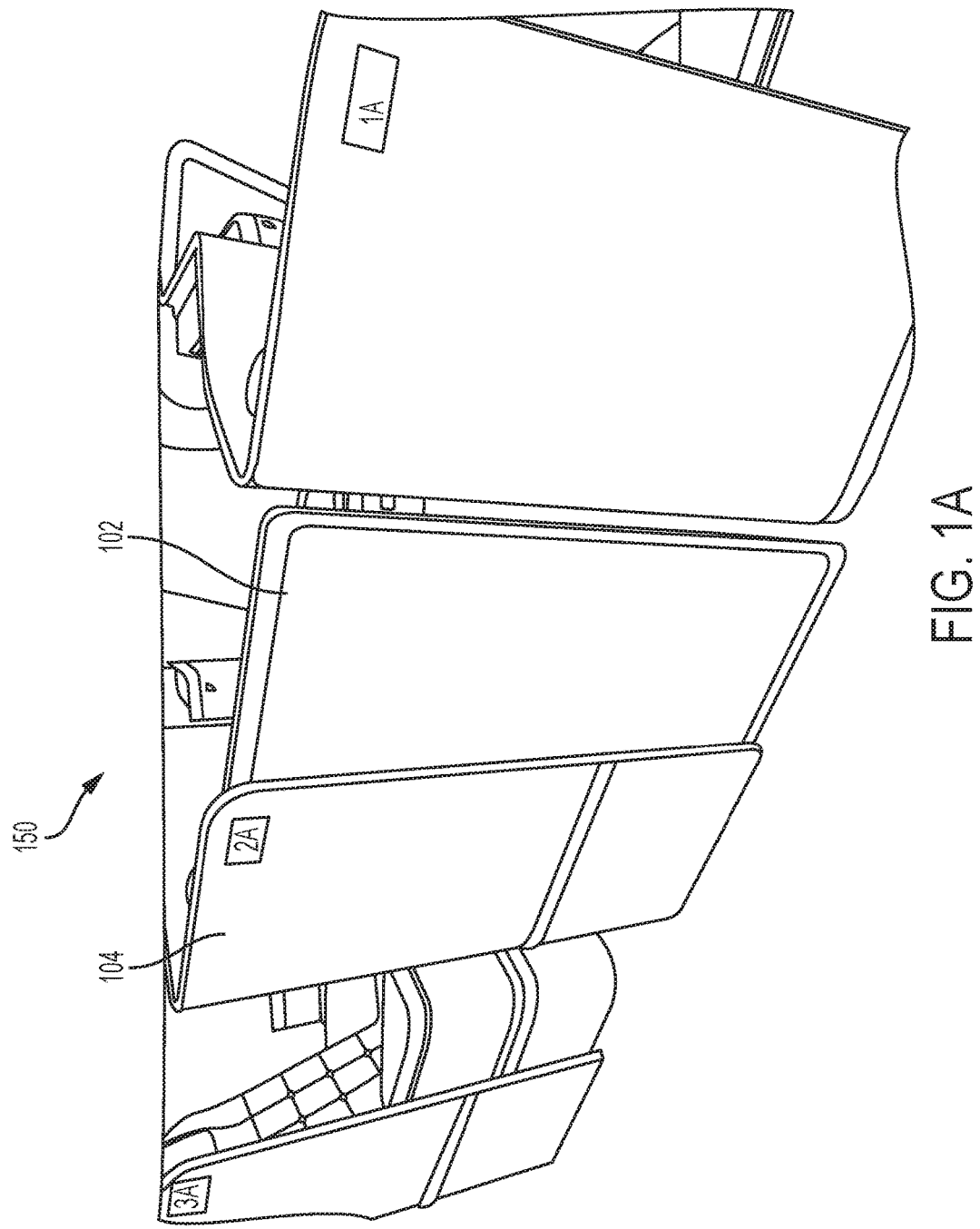
FIG. 1A illustrates an exemplary passenger suite with a panel door assembly.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure are directed to panel door assemblies for aircraft cabin passenger suites. In some implementations, passenger suites in premium class aircraft cabins are equipped with a variety of panels, doors, and cabin furniture that separate an interior of the passenger suite from the rest of the aircraft cabin. To provide ingress/egress paths from the passenger suites, panel door assemblies may be installed that can be operated in normal and emergency use applications. For example, during normal use operations, the panel door assembly may operate as a single panel to either slide into or out of a panel recess in the passenger suite or rotate between open and closed positions without violating aisle clearance regulations. In some implementations, the panel door assembly may also include an emergency handle that may be operated by the passenger from within the suite that separates a removable portion from a stationary portion of the panel door assembly by operating latch mechanisms connecting the removable portion to the stationary portion, allowing the passenger to exit the passenger suite even when a normal operation path of the panel door assembly may be restricted such as during an emergency.

Aspects of the present disclosure are also directed to panel door assembly configurations for front row passenger suites in which forward cabin monuments (e.g., cabin furniture, storage compartments, galley compartments, electronics compartments, etc.) are installed forward of the front row passenger suites. In some implementations, an aisle-side edge of the front row passenger suite is aligned with an aisle-side edge of the forward cabin monuments such that the panel door assembly extends from the passenger suite to the forward cabin monuments so that the passenger is enclosed within the suite when the panel door assembly is in a closed position. In examples of other aircraft cabin configurations, an aisle-side edge of the front row passenger suite may not be aligned with an aisle-side edge of the forward cabin monuments such that a gap exists between the panel door assembly in an extended closed position and the aisle-side edge of the forward cabin monuments. In implementations where the aisle-side edge of the front row passenger suite is not aligned with the aisle-side edge of the forward cabin monuments, a filler door may be included that bridges the gap between the panel door assembly and the forward cabin monuments so that a passenger can be completely enclosed within the suite when the panel door assembly is in the closed position. The filler door may be detachably attached to the forward cabin monuments to provide for opening and closing the filler door during both normal and emergency operations. In addition, the front row passenger suite configurations described further herein may also satisfy security regulations that dictate sight lines that must be visible to flight crew personnel when travelers are enclosed within the passenger suites.

Turning to FIG. 1A, an exemplary passenger suite 150 with a panel door assembly 102 is illustrated. In some implementations, premium class aircraft cabins include multiple passenger suites arranged in various configurations that enhance privacy for travelers residing in those suites. For example, the aircraft cabin may include individual passenger suites extending along port and starboard outboard edges of the cabin such that one side of the passenger suite is adjacent to an aircraft window and another side of the passenger suite is adjacent to an aisle. In addition, the passenger suites may share forward and aft privacy panels with forward and aft passenger suites. For example, as shown in FIG. 1, the passenger suite 150 may be adjacent to outboard aircraft windows on the port side and may be adjacent to an aisle on the starboard side. In addition, the passenger suite 150 may be adjacent to other passenger suites on forward and aft sides of the passenger suite 150. In some examples, the passenger suite 150 may be a front row passenger such that a forward bulkhead and/or forward cabin monuments form a forward boundary of the passenger suite 150. Similarly, the passenger suite 150 may be a back row suite such that an aft bulkhead and/or aft cabin monuments form an rear boundary for the passenger suite 150.

In some implementations, the panel door assembly 102 is configured to move between open and closed positions such that in an open position, an ingress/egress path into and out of the passenger suite 150 is provided. When moving to the open position, the panel door assembly 102 may slide in a rearward direction toward an aisle-side panel 104 such that the panel door assembly 102 is overlapped by the aisle-side panel 104. In addition, the structure and materials that make up the panel door assembly 102 may be based on a shape and configuration of the passenger suite 150. In some implementations, the panel door assembly 102 may be a flexible panel, which may be lightweight and have a minimal thickness to increase spaciousness for the passenger within the passenger suite 150. In other implementations, the panel door assembly 102 may be a solid panel door that provides a more traditional door-like feel to the passenger.

Figure 1B:
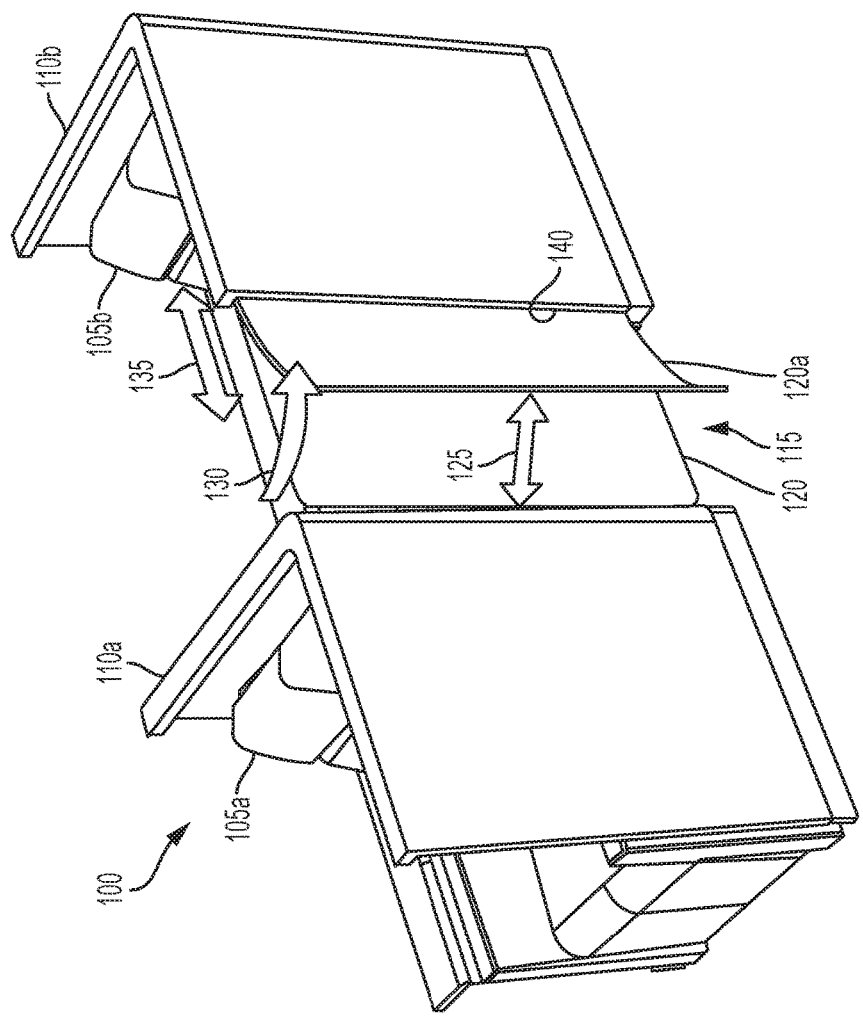
FIG. 1B depicts an exemplary flexible privacy panel installed in aircraft passenger seating.

FIG. 1B depicts an exemplary flexible privacy panel installed in aircraft passenger seating. Aircraft passenger seating 100 is shown as having a front seat 105a and a rear seat 105b. In an exemplary embodiment, seats 105a and 105b are facing in the forward direction of an airplane, and are adjacent to an aisle which passengers can use to travel to and from the seats 105a and 105b. Seats 105a and 105b are also shown as being at least partially enclosed by suite boundaries 110a and 110b. Suite boundaries 110a and 110b provide at least some privacy for the occupants of seats 105a and 105b by at least partially obstructing the view of the area around the respective seats 105a and 105b by observers outside of the suite boundaries 110a and 110b.

An opening in the suite boundary 110b is defined by the ingress/egress point 115. The ingress/egress point 115 allows a passenger to both enter and leave the area around the seat 105b. In one exemplary implementation, a closed flexible privacy panel 120 occupies at least part of the space in the ingress/egress point 115 to provide a passenger using seat 105b with additional privacy. The closed flexible privacy panel 120 at least partially obstructs the view from outside observers into the area around the seat 105b. In contrast, the flexible privacy panel can be in an open flexed-out position, illustrated by flexed-open flexible privacy panel 120a. The spacing between the distal end of closed flexible privacy panel 120 and the distal end of flexed-open flexible privacy panel 120a is shown as being bending distance 125.

The bending distance 125 may be a function of several variables. The bending distance 125 may be a function of the modulus of elasticity (e.g., Young's modulus or tensile modulus) of the material comprising the flexible privacy panel 120 or 120a. The traditional definition for the modulus of elasticity of material is the ratio of stress (force per unit area) along an axis to strain (ratio of deformation over initial length) along that axis:

$$\lambda = \frac{stress}{strain}$$

For example, steel may have a modulus of elasticity in the range of about 180 to about 200 N/m². Such a material may provide little to no practical elasticity for a user attempting to push open the flexible privacy panel 120. Other materials may have a smaller modulus of elasticity that may be more practical for an average person attempting to flex out the flexible privacy panel 120. By way of example and not limitation, such materials may include plastics (with an elastic modulus around 0.5-3.1 N/m²) or rubber (with an elastic modulus around 0.1-0.5 N/m²).

The bending distance 125 may also be a function of the stiffness of the flexible privacy panel 120 or 120a. Although the elastic modulus and stiffness are related, the elastic modulus of a material is not the same as the stiffness of a component made from that material. Elastic modulus is a property of the constituent material, while stiffness is a property of a structure or component of a structure (and is therefore dependent upon various physical dimensions that describe that component). The stiffness is usually defined as:

$$k = \frac{F}{\delta}$$

Where, F is the force applied on the body, and δ is the displacement produced by the force along the same degree of freedom. Thus, the bending distance 125 may also depend upon the physical dimensions of the flexible privacy panel 120. For example, a rectangular shaped flexible privacy panel 120 may have a different stiffness than a circular or curved shaped flexible privacy panel 120. Furthermore, a thick flexible privacy panel 120 may have a different stiffness than a thin flexible privacy panel 120.

The bending distance 125 may further be a function of the amount of force a person exerts on the flexible privacy panel 120 or 120a. A person with great strength may be able to bend the flexible privacy panel 120 with a certain modulus of elasticity, while a weak person may not be able to bend the same flexible privacy panel 120 with the same modulus of elasticity. The modulus of elasticity and stiffness of the flexible privacy panel 120 may therefore be customized to suit a person of average (or below average) human strength, such that the vast majority of passengers can effectively push open the flexible privacy panel 120.

The closed flexible privacy panel 120 in the present exemplary embodiment is shown as moving outward from the area defined by the inside of the suite boundary 110b to achieve the position associated with the flexed-open flexible privacy panel 120a. Although shown as moving out of the area defined by the inside of the suite boundary 110b, the flexed-open flexible privacy panel 120a may instead move within the area defined by the inside of the suite boundary 110b.

The flexible privacy panel 120 and 120a also moves out of or within a pocket 140 in the suite boundary 110b. In this sense, the flexible privacy panel 120 and 120a can be retracted within the pocket 140 to achieve a stowed state. Similarly, the flexible privacy panel 120 and 120a can be extended out of the pocket 140 to achieve a deployed state.

Figure 2:
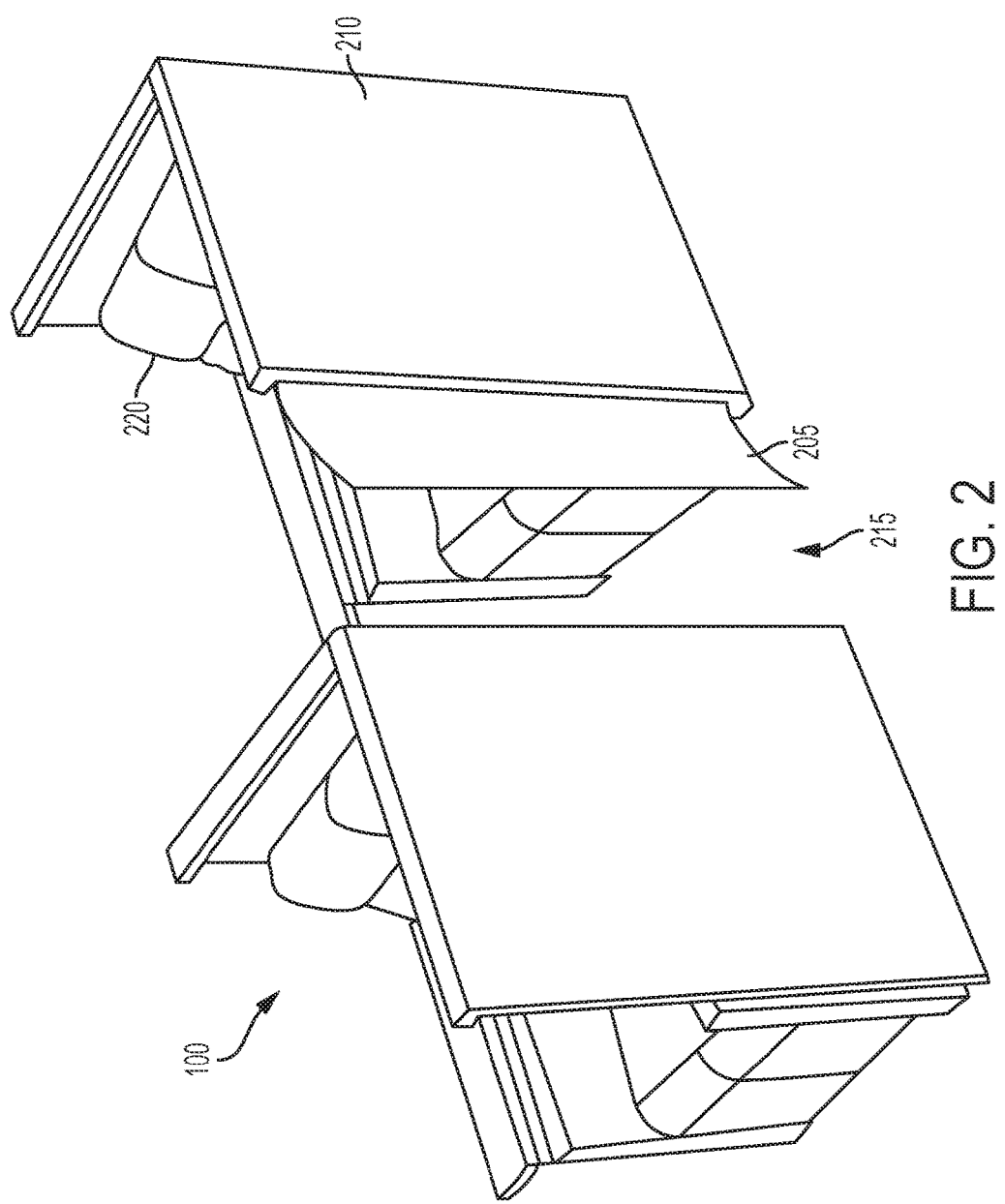
FIG. 2 depicts a perspective view of an exemplary flexible privacy panel installed in aircraft passenger seating in an open flexed-out position.

FIG. 2 depicts a perspective view of an exemplary flexible privacy panel installed in aircraft passenger seating in an open flexed-out position. Flexible privacy panel 205 is shown as being attached to a part of the suite boundary 210. The flexible privacy panel 205 is in a "flexed-open" state, such that the view by outside observers of the area defined by the inside of the suite boundary 210 is not entirely obstructed by the flexible privacy panel 205.

Figure 3:
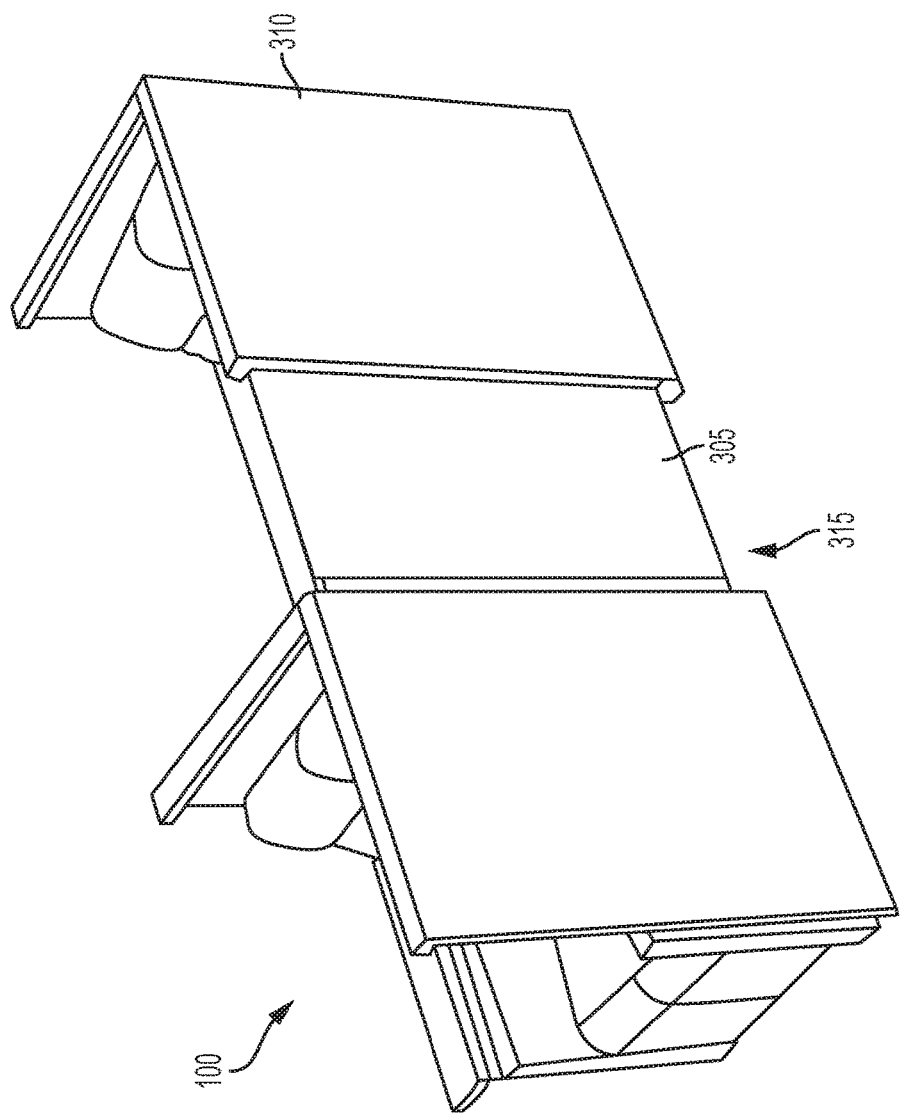
FIG. 3 depicts a perspective view of an exemplary flexible privacy panel installed in aircraft passenger seating in an extended closed position.

FIG. 3 depicts a perspective view of an exemplary flexible privacy panel installed in aircraft passenger seating in an extended closed position. The flexible privacy panel 305 is shown as being attached to a part of the suite boundary 310. The flexible privacy panel 305 is in a "closed" state, such that the view by outside observers of the area defined by the inside of the suite boundary 310 is mostly (if not completely) obstructed by the flexible privacy panel 305. A person may pass through the ingress/egress point 315 to access or leave their seat area by manually pushing the flexible privacy panel 305 to a "flexed-open" state, or by retracting the panel to a "stowed-open" state (described in the next paragraph).

Figure 4:
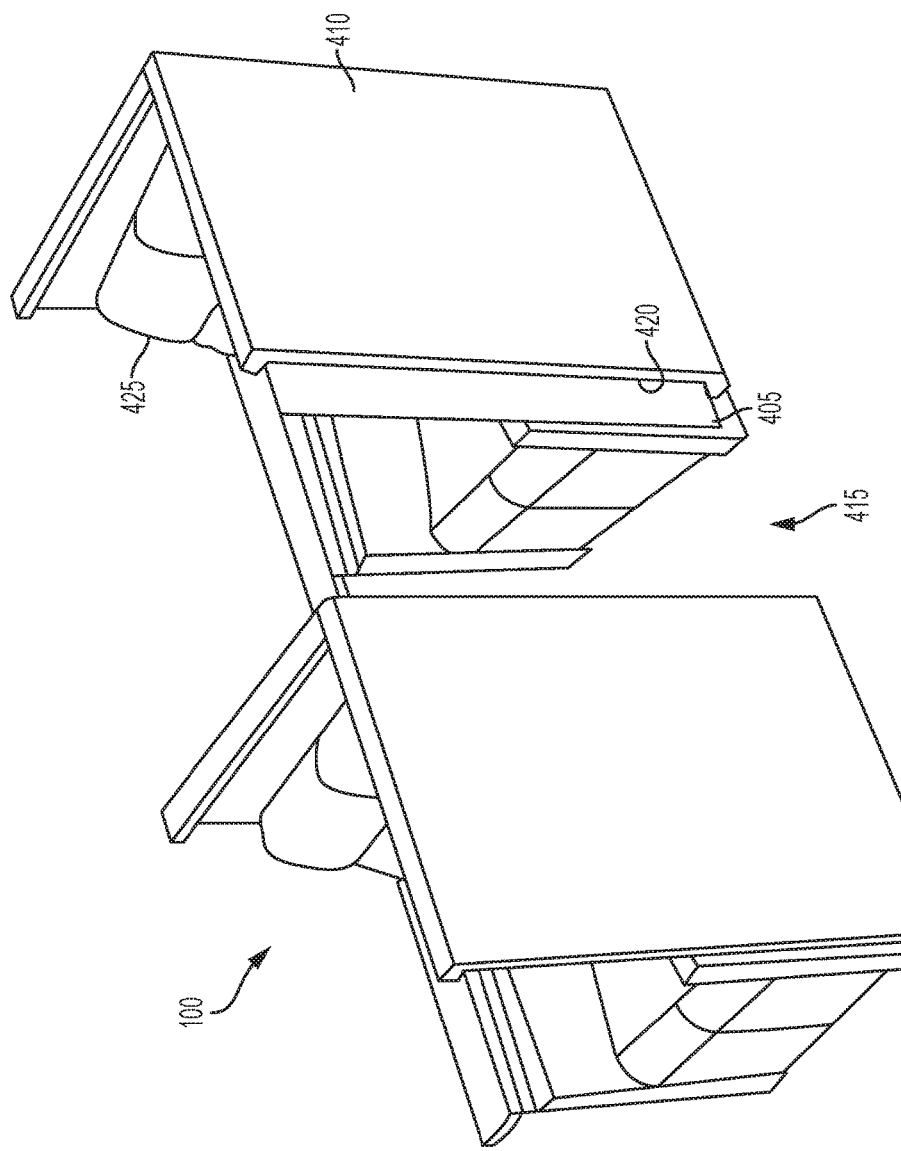
FIG. 4 depicts a perspective view of an exemplary flexible privacy panel installed in aircraft passenger seating in a retracted open position.

FIG. 4 depicts a perspective view of an exemplary flexible privacy panel installed in aircraft passenger seating in a retracted open position. The flexible privacy panel 405 is shown as being attached to a part of the suite boundary 410, and being stowed within a pocket 420 integrated into the suite boundary 410. The flexible privacy panel 405 is in an "stowed-open" state, such that the view by outside observers of the area defined by the inside of the suite boundary 410 is mostly (if not completely) unobstructed by the flexible privacy panel 405. A person using the seat 425 will be able to freely pass through the ingress/egress point 415 to access or leave their seat area.

Figure 5:
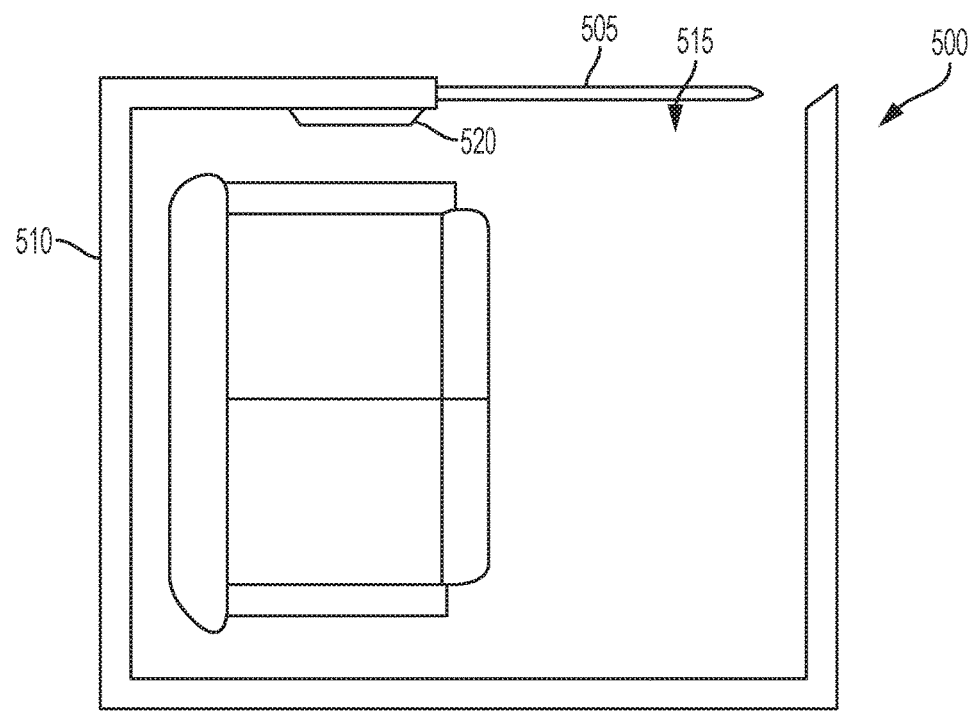
FIG. 5 depicts a top view of an exemplary flexible privacy panel installed in aircraft passenger seating in an extended closed position.

FIG. 5 depicts a top view of an exemplary flexible privacy panel installed in aircraft passenger seating in an extended closed position. The aircraft passenger seating 500 possesses a flexible privacy panel 505 shown in a "closed" state. The flexible privacy panel 505 is attached to a portion of the suite boundary 510, which defines the area inside of the passenger seating 500. The flexible privacy panel 505 occupies the area around the ingress/egress point 515, such that the view by outside observers of the area defined by the inside of the suite boundary 510 is mostly (if not completely) obstructed by the flexible privacy panel 505. In this exemplary embodiment, a control interface 520 controls the transitioning of the flexible privacy panel 505 between the "closed" and "stowed-open" state. This transition is accomplished via electrical means (such as an electric motor or electric actuator housed within the suite boundary 510).

Although the control interface 520 in one exemplary embodiment controls the retraction and extension of the flexible privacy panel 505 via electrical means, other control means are possible. For example, the flexible privacy panel 505 may be retracted into and extended out of the suite boundary 510 by magnetic attraction or solenoids (such as a magnet placed on or within the flexible privacy panel 505). In another exemplary embodiment, the flexible privacy panel 505 may be retracted into and extended out of the suite boundary 510 manually (e.g., by hand). In yet another exemplary embodiment, the flexible privacy panel 505 may be retracted into and extended out of the suite boundary 510 by pneumatic tubes or pistons.

Figure 6:
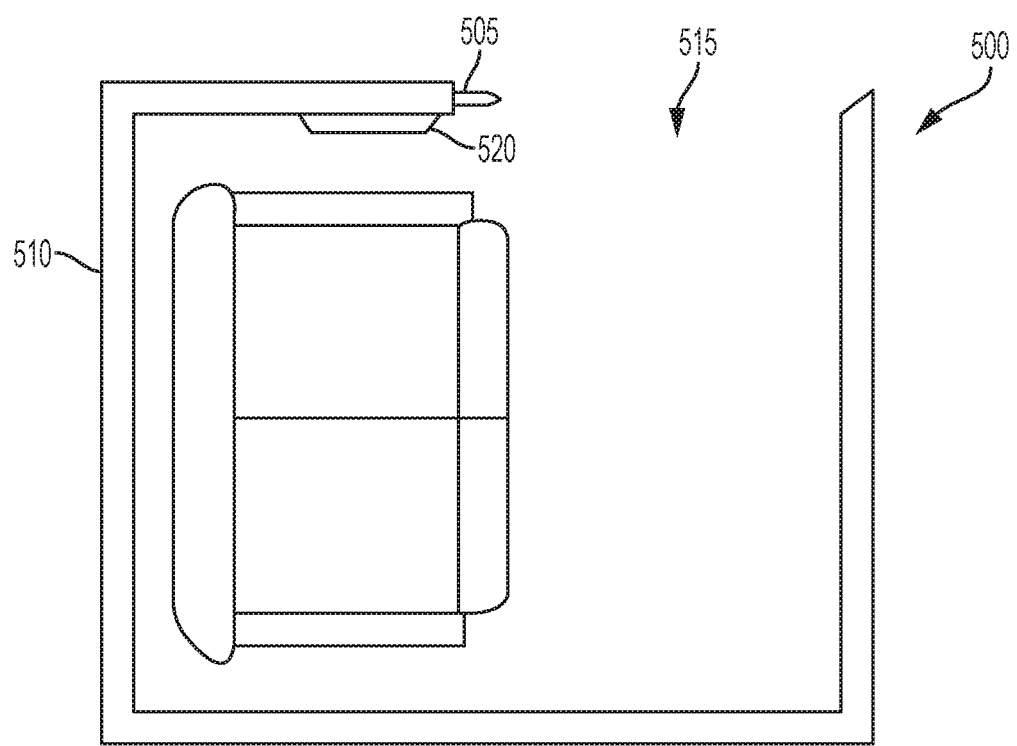
FIG. 6 depicts a top view of an exemplary flexible privacy panel installed in aircraft passenger seating in a retracted open position.

FIG. 6 depicts a top view of an exemplary flexible privacy panel installed in aircraft passenger seating in a retracted open position. The aircraft passenger seating 500 possesses a flexible privacy panel 505 shown in a "stowed-open" state. The flexible privacy panel 505 is attached to a portion of the suite boundary 510, which defines the area inside of the passenger seating 500. The flexible privacy panel 505 has been mostly displaced from the area around the ingress/egress point 515, such that the view by outside observers of the area defined by the inside of the suite boundary 510 is mostly (if not completely) unobstructed by the flexible privacy panel 505. In this exemplary embodiment, the control interface 520 has been utilized to transition the flexible privacy panel 505 from the "closed" state (not shown) to the "stowed-open" state.

Figure 7:
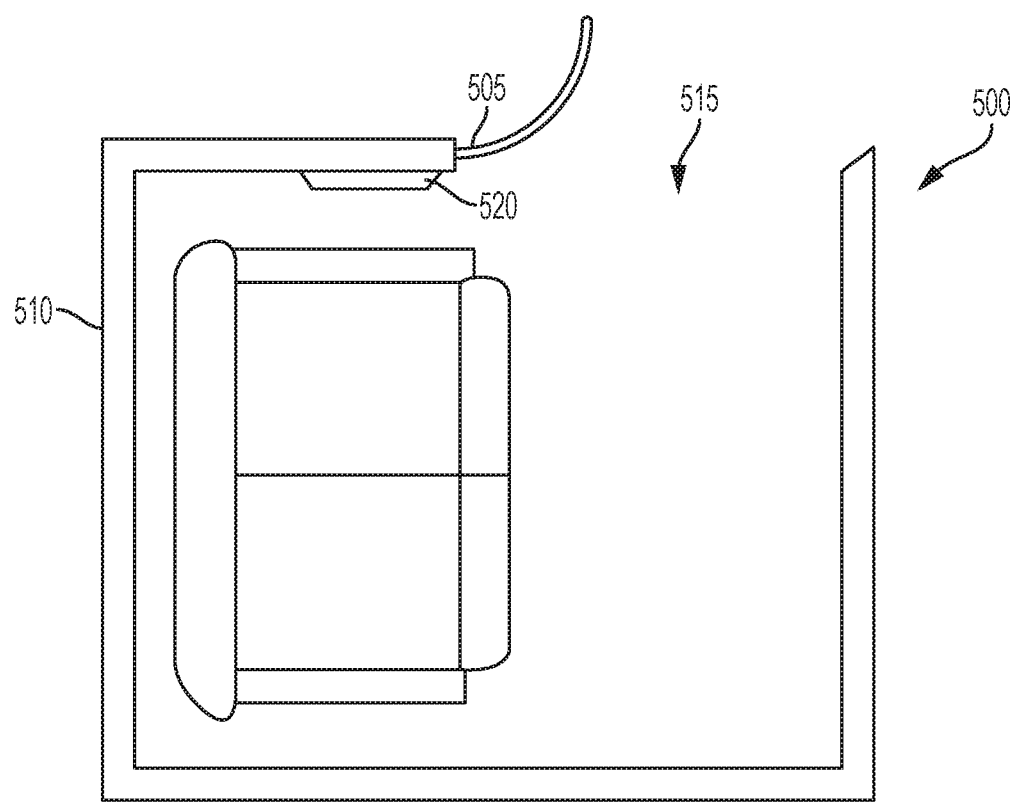
FIG. 7 depicts a top view of an exemplary flexible privacy panel installed in aircraft passenger seating in an open flexed-out position.

FIG. 7 depicts a top view of an exemplary flexible privacy panel installed in aircraft passenger seating in an open flexed-out position. The aircraft passenger seating 500 possesses a flexible privacy panel 505 shown in a "flexed-open" state. The flexible privacy panel 505 is attached to a portion of the suite boundary 510, which defines the area inside of the passenger seating 500. The flexible privacy panel 505 has been partially displaced from the area around the ingress/egress point 515, such that the view by outside observers of the area defined by the inside of the suite boundary 510 is not entirely obstructed by the flexible privacy panel 505. In this exemplary embodiment, the control interface 520 may not be utilized to transition the flexible privacy panel 505 from the "closed" state to the "flexed-open" state. Rather, a person may apply a manual force to the flexible privacy panel 505 to push the panel to a "flexed-open" state.

Although the control interface 520 in one exemplary embodiment may not control the flexing of the flexible privacy panel 505, in other embodiments, the flexing can be controlled by control interface 520. For example, the flexible privacy panel 505 may be formed out of an electroactive polymer that exhibits a change in shape when stimulated by an electric field. The control interface 520 may be configured to control the electricity being provided to the flexible privacy panel 505, so that at a given voltage level, the flexible privacy panel 505 is in a "closed" state, while at another (different) voltage level, the flexible privacy panel 505 flexes to a "flexed-open" state.

Figure 8:
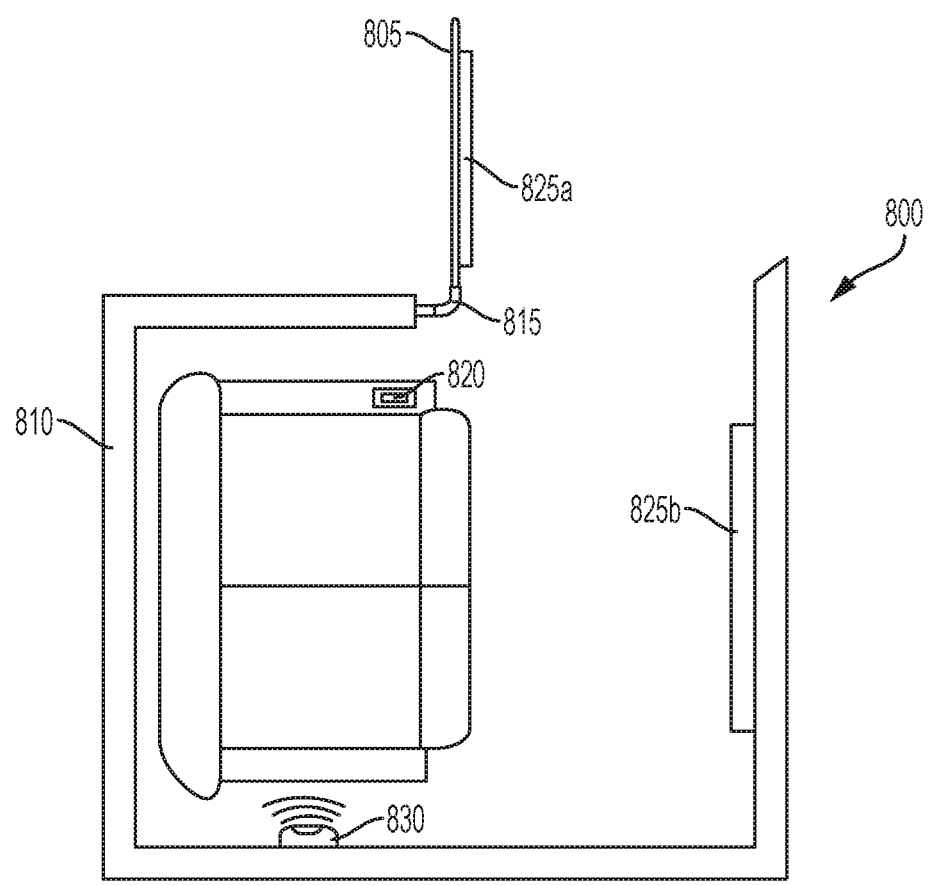
FIG. 8 depicts a top view of an exemplary privacy panel with a flexible hinge installed in aircraft passenger seating in an open flexed-out position.

FIG. 8 depicts a top view of an exemplary privacy panel with a flexible hinge installed in aircraft passenger seating in an open flexed-out position. The aircraft passenger seating 800 possesses a rigid privacy panel 805 shown in a "flexed-open" state. The rigid privacy panel 805 is attached to a portion of the suite boundary 810 via a flexible hinge 815. In this exemplary embodiment, the control interface 820 is located on the seat armrest. The control interface 820 controls the transitioning of the rigid privacy panel 805 to and from the "closed" state (not shown) to the "stowed-open" state (not shown). In this exemplary embodiment, a person has applied a manual force to the rigid privacy panel 805 to push the panel to a "flexed-open" state.

Also shown in the FIG. 8 exemplary embodiment are two video screens 825a and 825b. A panel video screen 825a is shown as being located on the rigid privacy panel 805. Panel video screen 825a faces toward the inside of the interior area defined by the suite boundary 810 when the rigid privacy panel 805 is in the "closed" state. Wall video screen 825b is shown as being located on one of the interior walls of the suite boundary 810. Also located on an adjacent wall of the suite boundary 810 is an emergency alarm 830.

The emergency alarm 830 may notify a passenger with a specific sound whenever an emergency is taking place. A passenger located in the interior area defined by the suite boundary 810 may hear the sound and realize an emergency is taking place. A passenger may then push the rigid privacy panel 805 from a "closed" position (not shown) to a "flexed-open" position in order to escape the interior area defined by the suite boundary 810 in an emergency situation.

Figure 9:
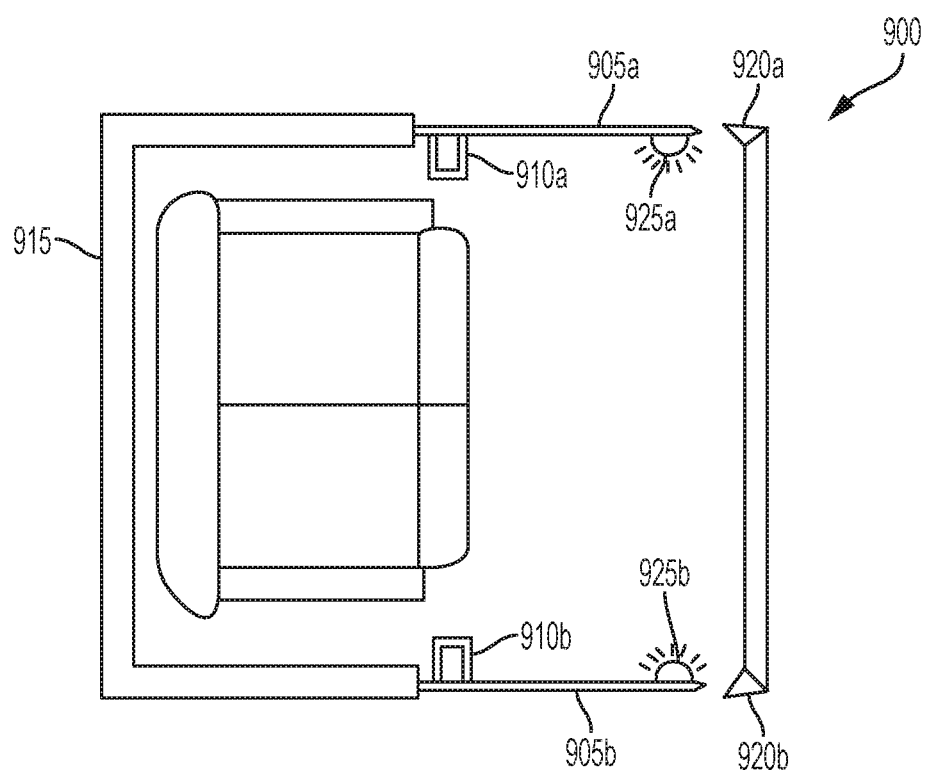
FIG. 9 depicts a top view of exemplary dual flexible privacy panels installed in aircraft passenger seating in an extended closed position.

FIG. 9 depicts a top view of exemplary dual flexible privacy panels installed in aircraft passenger seating in an extended closed position. In contrast with previous embodiments, the aircraft passenger seating 900 is equipped with two opposing flexible privacy panels 905a and 905b. A person may enter into or exit from the aircraft passenger seating area by using either of the flexible privacy panels 905a and 905b. The flexible privacy panels 905a and 905b may transition between an "stowed-open" position (not shown) and a "closed" position using manual handle bars 910a and 910b, respectively. In the exemplary depiction, the flexible privacy panels 905a and 905b are extending from pockets (not shown) housed in the suite boundary 915.

Near the distal ends of the flexible privacy panels 905a and 905b are panel detectors 920a and 920b. The panel detectors 920a and 920b may include switches, contacts, or pressure sensors that may be configured to detect if their respective flexible privacy panels 905a and 905b are in a closed or open position. When the distal ends of the flexible privacy panels 905a or 905b are a certain distance from their respective panel detectors 920a or 920b, the respective panel detector 920a or 920b can indicate that its corresponding flexible privacy panel 905a or 905b is in a "closed" state. Each flexible privacy panel 905a and 905b is also shown with their respective lighting element 925a and 925b.

Panel detectors 920a and 920b may use other methods to determine if the corresponding flexible privacy panels 905a and 905b are in a closed or open position. In some embodiments, the panel detectors 920a and 920b may be configured to detect the intensity of light emitting from lighting elements 925a and 925b. When the light intensity measured by the panel detectors 920a and 920b reaches a certain threshold value, a detector may indicate that its corresponding panel is in a "closed" state. In some embodiments, the flexible privacy panels 905a or 905b may have magnets on or within their distal ends. The panel detectors 920a and 920b may be configured to detect the magnetic field created by the magnets of the flexible privacy panels 905a and 905b. When the magnetic field strength measured by the panel detectors 920a and 920b reaches a certain threshold value, a detector may indicate that its corresponding panel is in a "closed" state. The panel detectors 920a and 920b may report the state of the flexible privacy panels 905a and 905b to a user's mobile device or to the flight crew.

Figure 10:
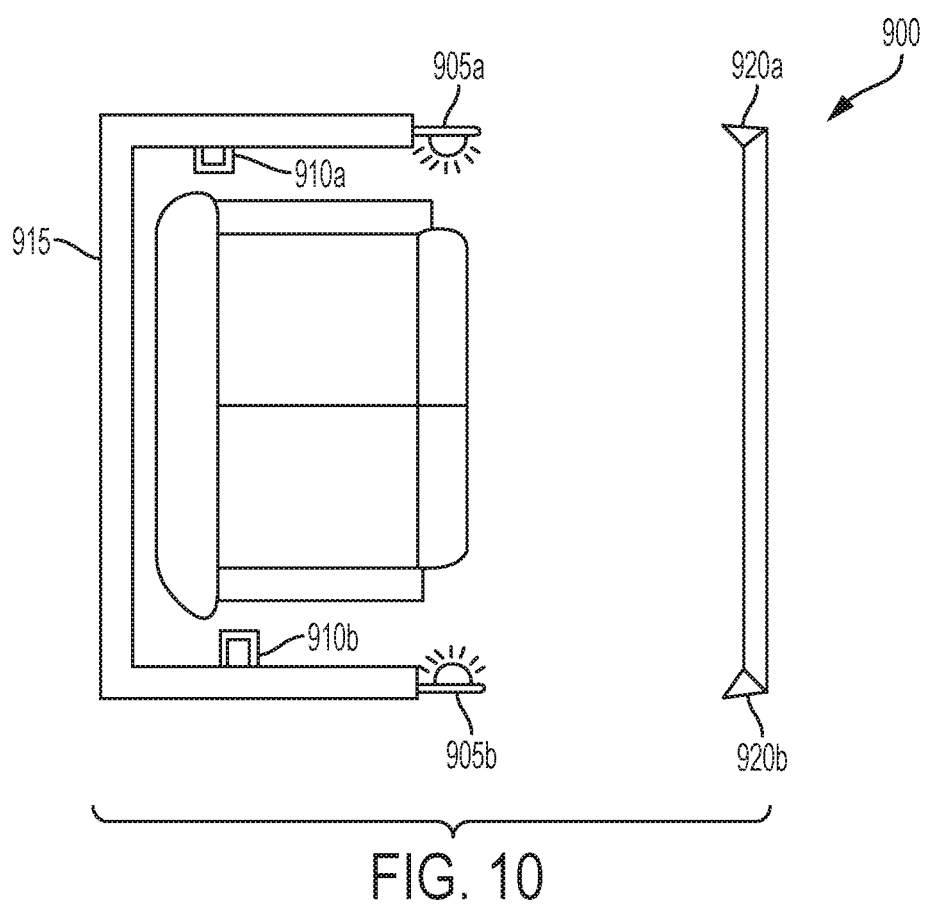
FIG. 10 depicts a top view of exemplary dual flexible privacy panels installed in aircraft passenger seating in a retracted open position.

FIG. 10 depicts a top view of exemplary dual flexible privacy panels installed in aircraft passenger seating in a retracted open position. The flexible privacy panels 905a and 905b are shown as being in a "stowed-open" position. The transition of the flexible privacy panels 905a and 905b from the "closed" state in FIG. 24 to the "stowed-open" state in FIG. 10 is accomplished using manual handle bars 910a and 910b. The manual handle bars 910a and 910b travel in channels (not shown) defined on the interior walls of the suite boundary 915. A person can, by hand, push or pull the manual handle bars 910a and 910b to achieve either the "closed" or "stowed-open" states (or an intermediate state between "closed" and "stowed-open") for the flexible privacy panels 905a and 905b. In this configuration, the panel detectors 920a and 920b are reporting that the flexible privacy panels 905a and 905b are both in the "stowed-open" state.

Figure 11:
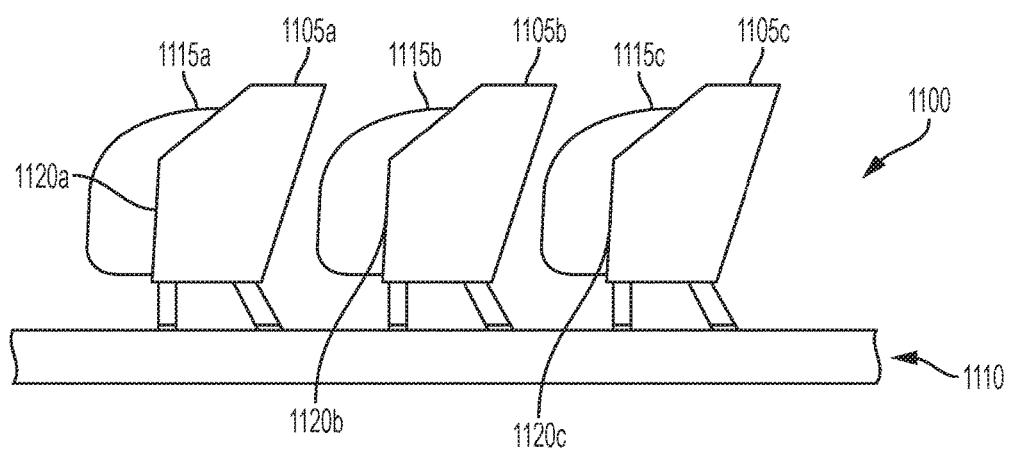
FIG. 11 depicts a side view of exemplary flexible privacy panels installed in aircraft passenger seating in an extended closed position.

FIG. 11 depicts a side view of exemplary flexible privacy panels installed in aircraft passenger seating in an extended closed position. This exemplary aircraft passenger seating 1100 shows aircraft passenger seats 1105a, 1105b, and 1105c adjacent to an aisle 1110. In contrast with previously presented exemplary embodiments, the embodiment of FIG. 11 does not have suite boundaries surrounding each individual passenger seat.

Each of the aircraft passenger seats 1105a, 1105b, and 1105c may have its own corresponding flexible privacy panel 1115a, 1115b, and 1115c attached to the seat. This is another difference from previously presented exemplary embodiments, in that the flexible privacy panels are attached to the individual seats rather than the individual seat boundaries. Each of the flexible privacy panels 1115a, 1115b, and 1115c are shown as being in a "closed" state, such that the view by outside observers of immediate area between one seat and the seat in front of it is at least partially obstructed by that seat's corresponding privacy panel.

Each of the flexible privacy panels 1115a, 1115b, and 1115c is shown as possessing its own pocket 1120a, 1120b, and 1120c (respectively). The pockets 1120a, 1120b, and 1120c are integrally formed with their respective aircraft passenger seats 1105a, 1105b, and 1105c. Each of the pockets 1120a, 1120b, and 1120c are configured to receive their corresponding flexible privacy panel 1115a, 1115b, and 1115c when the panels are transitioned from a "closed" state to a "stowed-open" state (not shown).

Although the flexible privacy panels 1115a, 1115b, and 1115c in the FIG. 11 exemplary embodiment are able to be pulled out from is corresponding aircraft passenger seats 1105a, 1105b, and 1105c, other configurations are possible. For example, the flexible privacy panels may pull out from suite boundaries that substantially surround individual passenger seats (similar to the exemplary embodiments in FIGS. 1-11). In some embodiments, the flexible privacy panels may pull out from an arm rest region of an individual passenger seat. In some implementations, the flexible privacy panel may pull out from a spool or winding in the vicinity of an individual passenger seat.

Figure 12:
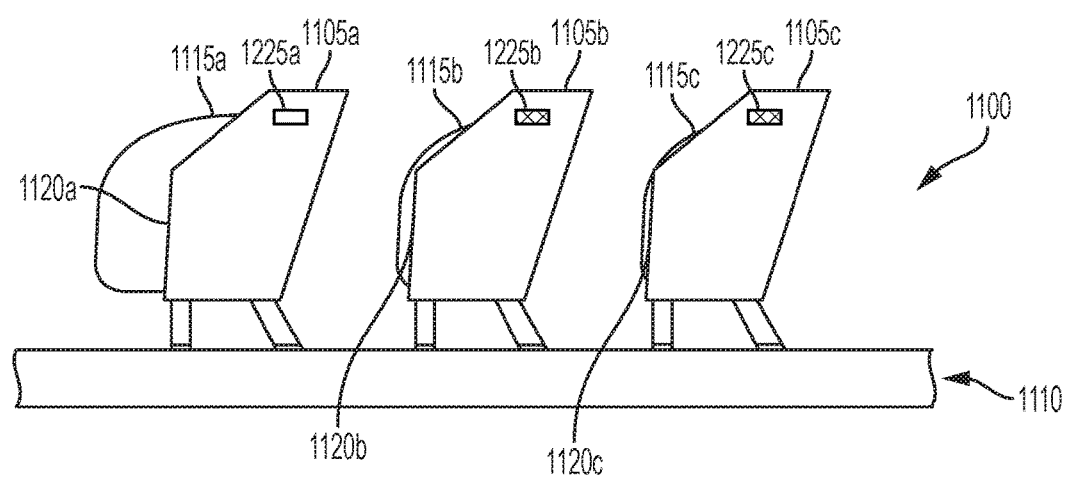
FIG. 12 depicts a side view of exemplary flexible privacy panels installed in aircraft passenger seating with some panels in an extended closed position and other panels in a retracted open position.

FIG. 12 depicts a side view of exemplary flexible privacy panels installed in aircraft passenger seating with one panel in an extended closed position and other panels in retracted open positions. The aircraft passenger seat 1105a is shown with its corresponding flexible privacy panel 1115a in a "closed" state, while the aircraft passenger seats 1105b and 1105c are shown with their corresponding flexible privacy panels 1115b and 1115c in a "stowed-open" state. In the "stowed-open" state, the flexible privacy panels 1115b and 1115c are fully retracted within their respective pockets 1120b and 1120c, while the flexible privacy panel 1115a (in a "closed" state) is fully extended out of its pocket 1120a.

Each of the aircraft passenger seats 1105a, 1105b, and 1105c are shown with their respective do-not-disturb status indicators 1225a, 1225b, and 1225c. The do-not-disturb status indicators 1225a, 1225b, and 1225c may be set by the passenger. The do-not-disturb status indicators 1225a, 1225b, and 1225c may be automatically set based on the state of the corresponding flexible privacy panels 1115a, 1115b, and 1115c. In this exemplary embodiment, the do-not-disturb status indicator 1225a indicates a "do not disturb" status (because its corresponding flexible privacy panel 1115a is in a "closed" state), while the do-not-disturb status indicators 1225b and 1225c both indicate a "may disturb" status (because their corresponding flexible privacy panels 1115b and 1115c are in a "stowed-open" state).

Figure 13:
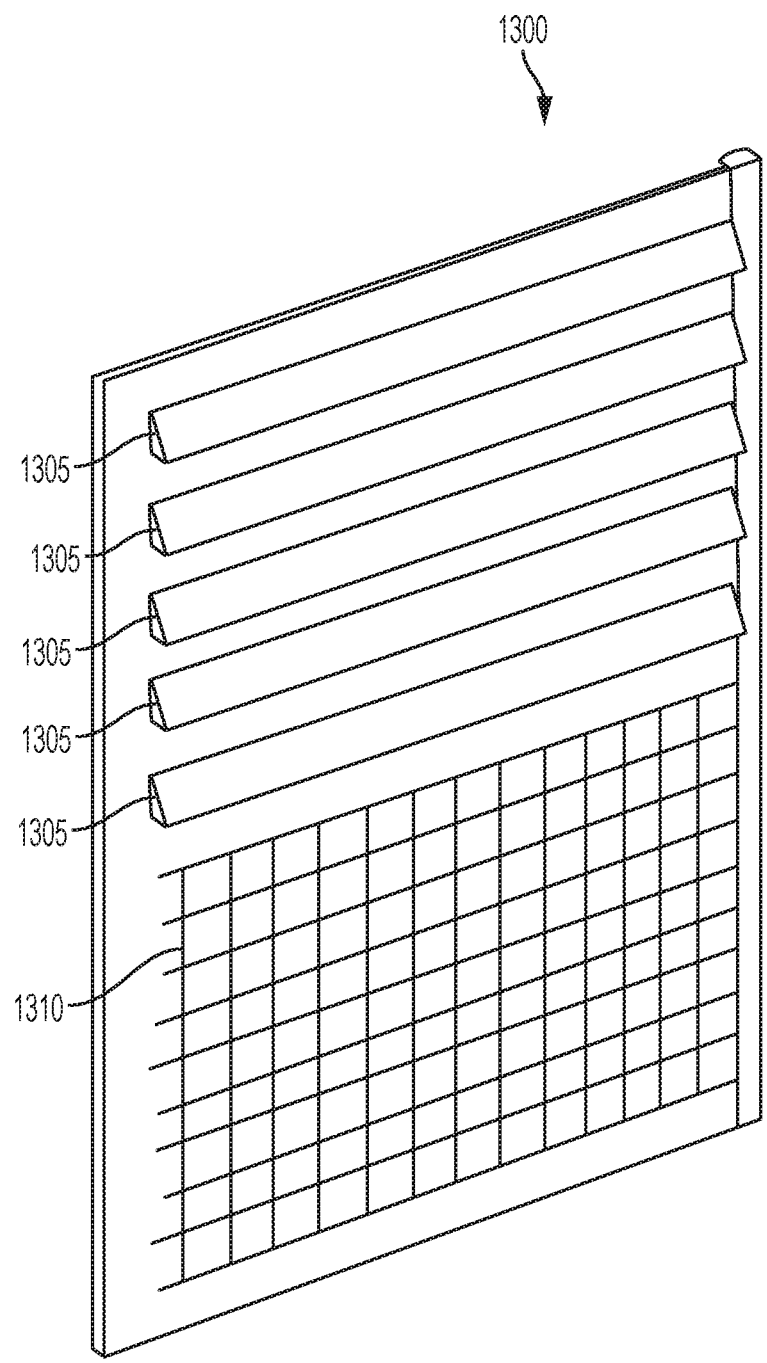
FIG. 13 depicts an exemplary flexible privacy panel with upper venting and lower heating grid.

FIG. 13 depicts an exemplary flexible privacy panel with upper venting and lower heating grid. The flexible privacy panel 1300 possess distal and proximal ends, where the proximal end may be attached to an aircraft passenger seat, a suite boundary, an arm rest region of an individual passenger seat, or any other convenient location. Shown extending along the upper portion of the flexible privacy panel 1300 from a proximal end to a distal end are vents 1305. The vents 1305 provide air flow to and from the area around a passenger aircraft seat.

The vents 1305 may be adjustable (individually or together) such that the slits in the vents 1305 can be widened or narrowed. The opening in the vents 1305 may be adjusted manually or through other means (such as electrically or pneumatically). The vents 1305 may also be disposed on the opposite side of the flexible privacy panel 1300.

On the bottom portion of the flexible privacy panel 1300 are heating elements 1310. The heating elements 1310 are shown in grid-like pattern, and provide a source of heat on the flexible privacy panel 1300. The heating elements 1310 are shown as connecting to the proximal end of the flexible privacy panel 1300 where a power source (not shown) provides power to the heating elements 1310.

Although not shown in this exemplary embodiment, the flexible privacy panel 1300 may be customized with thermal conductivity properties such that the heat from heating elements 1310 effectively emanates from one side of the flexible privacy panel 1300. For example, the front side of the flexible privacy panel may be formed of a high thermal conductivity material, while the back side of the flexible privacy panel 1300 may be formed of a low thermal conductivity material. In such a situation, the flow of heat may be directed to the front side of the flexible privacy panel 1300, while there is minimal heat flow on the back side of the flexible privacy panel 1300.

Figure 14:
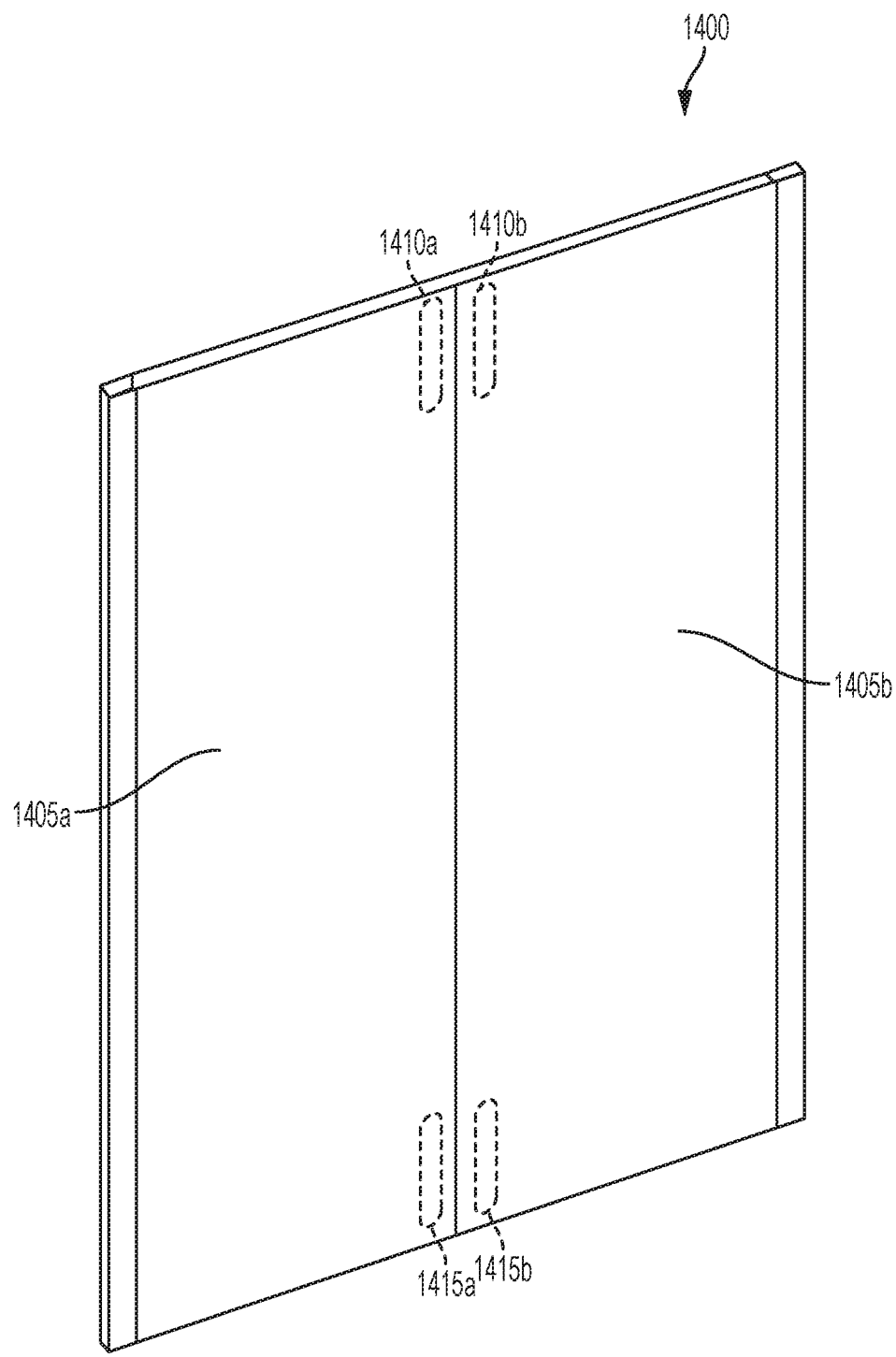
FIG. 14 depicts exemplary paired flexible privacy panels with embedded magnets.

FIG. 14 depicts exemplary paired flexible privacy panels with embedded magnets. The paired flexible privacy panels 1400 include a right panel 1405a and a left panel 1405b. The right panel 1405a and a left panel 1405b are configured such that in the "closed" position, they are substantially touching one another. The right panel 1405a and a left panel 1405b have a set of upper magnets 1410a and 1410b, which are configured to attract one another, and a set of lower magnets 1415a and 1415b, which are also configured to attract one another. A person may open the paired flexible privacy panels 1400 by applying enough force to the panels to overcome the magnetic attraction between both the upper magnets 1410a, 1410b and lower magnets 1415a, and 1415b.

Figure 15:
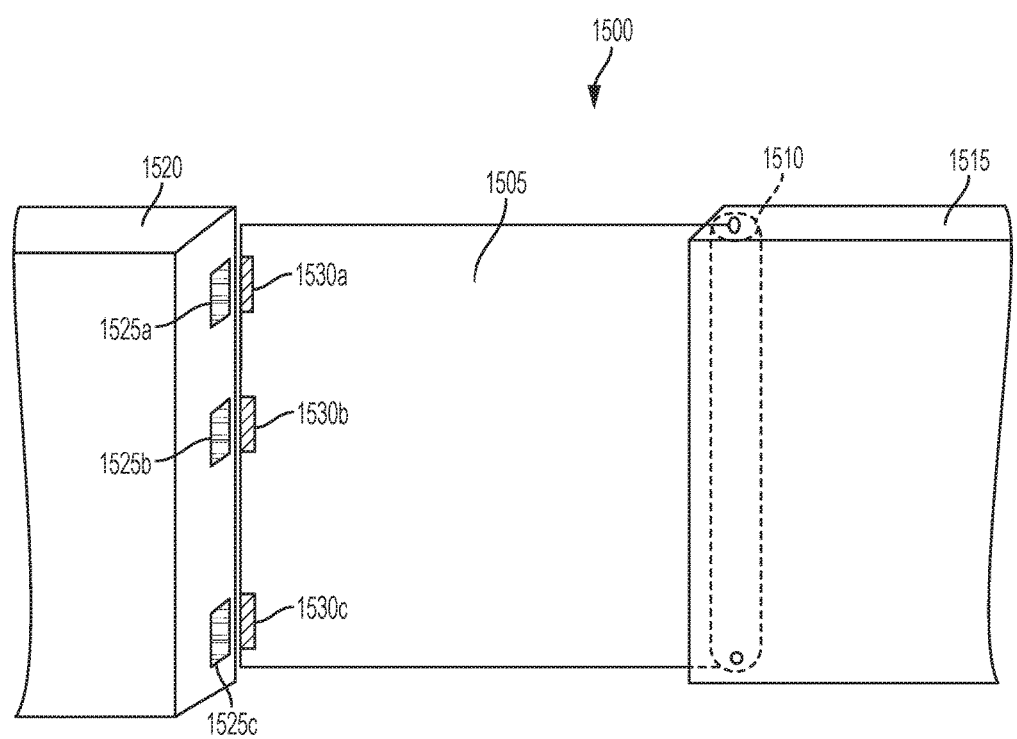
FIG. 15 depicts an exemplary winding flexible privacy panel with a spool.

FIG. 15 depicts an exemplary winding flexible privacy panel with a spool. The winding flexible privacy panel system 1500 includes a winding flexible privacy panel 1505 that is attached to a spool 1510 housed in a first wall 1515. The spool 1510 may be self-retracting or auto-winding, such that the winding flexible privacy panel 1505 automatically retracts within the spool 1510.

On a second wall 1520 are located wall magnets 1525a, 1525b, and 1525c. The wall magnets 1525a, 1525b, and 1525c may be paired with panel magnets 1530a, 1530b, and 1530c, such that the wall magnets and panel magnets attract one another. The magnets may provide a low threshold retention force. In a "closed" position, the force of attraction between the wall magnets 1525a, 1525b, and 1525c and the panel magnets 1530a, 1530b, and 1530c overcomes the winding force of the spool 1510. Once sufficient separation is made between the wall magnets 1525a, 1525b, and 1525c and the panel magnets 1530a, 1530b, and 1530c (manually by hand, for example), the winding force of the spool 1510 dominates, such that the winding flexible privacy panel 1505 auto-winds into the spool 1510.

Although permanent magnets may be used for the wall magnets 1525a, 1525b, and 1525c and the panel magnets 1530a, 1530b, and 1530c, other configurations are possible. In some embodiments, the wall magnets 1525a, 1525b, and 1525c are electromagnets that may de-energize when the power source to the electromagnets is cut off. This may occur, for example, in the case of an emergency, where the magnetic force ceases and the spool 1510 automatically retracts the winding flexible privacy panel 1505 into the wall 1515.

Figure 16:
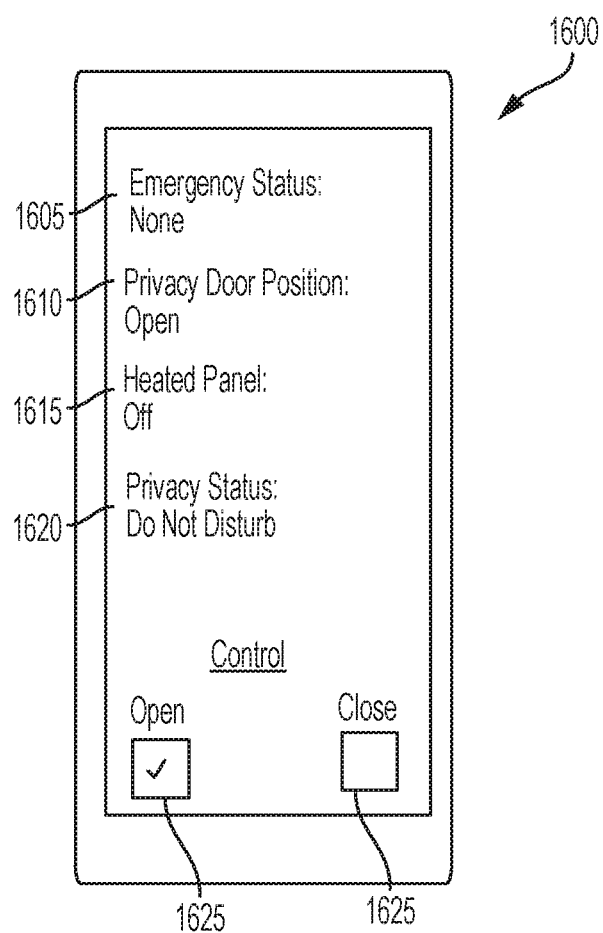
FIG. 16 depicts an exemplary mobile device with a flexible privacy panel program for controlling and monitoring the various functions of the flexible privacy panel.

FIG. 16 depicts an exemplary mobile device with a flexible privacy panel program for controlling the various functions of the flexible privacy panel. A user device 1600 is installed with software to control and monitor the different aspects of an aircraft passenger seating equipped with a flexible privacy panel. The user device 1600 is shown as displaying the emergency status 1605 of the aircraft (in this example, "none"). Also displayed on the user device 1600 is the privacy door position status 1610 (in this example, "open"), the heated panel status 1615 (in this example, "off"), and the privacy status 1620 (in this example, "do not disturb"). A panel control 1625 is shown at the bottom part of the user device 1600 display. A user can choose which state they desire a flexible privacy panel to be in (for example, either "open" or "closed").

Although various embodiments have been described with reference to the Figures, other embodiments are possible. For example, a privacy panel may extend from a seat surround, whether attached to the seat or separately to seat surround furniture. In some embodiments, the privacy panel is flexible so that it may deflect out of the path of egress without any direct passenger action (e.g. the passenger can walk right through the panel). This may allow for at least two methods of egress from the seat: 1) stowing the panel in the "open" position either manually, electrically or by other method and, 2) emergency egress if the panel is in the "closed" position.

In some embodiments, a privacy panel system can be incorporated on a variety of seat types or with furniture surrounding a seat. In some implementations, the privacy panel is a flexible panel that can be deployed/stowed manually, electrically or by other means. In some embodiments, the flexible panel may address airworthiness requirements for egress by being stowed by the passenger or cabin crew (normal use) using methods described above for conditions that require the panel be stowed (e.g. for taxi, take-off or landing). In some embodiments, in the event that the panel system is not able to be stowed due to a failure, the passenger may egress from the seat simply by pushing through the flexible privacy panel.

In some embodiments, sliding privacy panels may be used on business class and first class seats. In some embodiments, a privacy panel may be applied to many airplane passenger seats in different service classes. In some embodiments, some travel horizontally. In some embodiments, some travel vertically. In some embodiments, a flexible privacy panel may have a curved or non-polygonal shape. In some embodiments, a flexible privacy panel may be divided into a top and bottom (or multiple section) panel. In some embodiments, a flexible privacy panel may be retained in a closed position via a fastener (e.g. button snap and/or hook and loop).

In some embodiments, a flexible panel may be stowed between the aisle shell and the inner foam area. In some embodiments, privacy panel may be constructed of a flexible stiffener (e.g., like a tent pole) with fabric stretched over the frame. In some embodiments, a privacy panel may deflect if needed in an egress condition and return to its deployed position without permanently interfering into the aisle. In some embodiments, there may be some wash lighting or projection lighting shining on the deployed panel.

In some embodiments, the flexible privacy panel may be pushed away and return to a "closed" state, which still clears the aisle. In some embodiments, a flexible privacy panel may have flexible plastic. In some embodiments, a flexible privacy panel may have a flexible section within plastic. In some embodiments, a flexible privacy panel may have score points that cause a rigid panel to be hangable and/or flexible upon breaking. In some embodiments, a flexible privacy panel may spring back and not remain in the aisle. In some embodiments, a flexible privacy panel may not break away and fall into the aisle in emergency conditions.

Figure 17A:
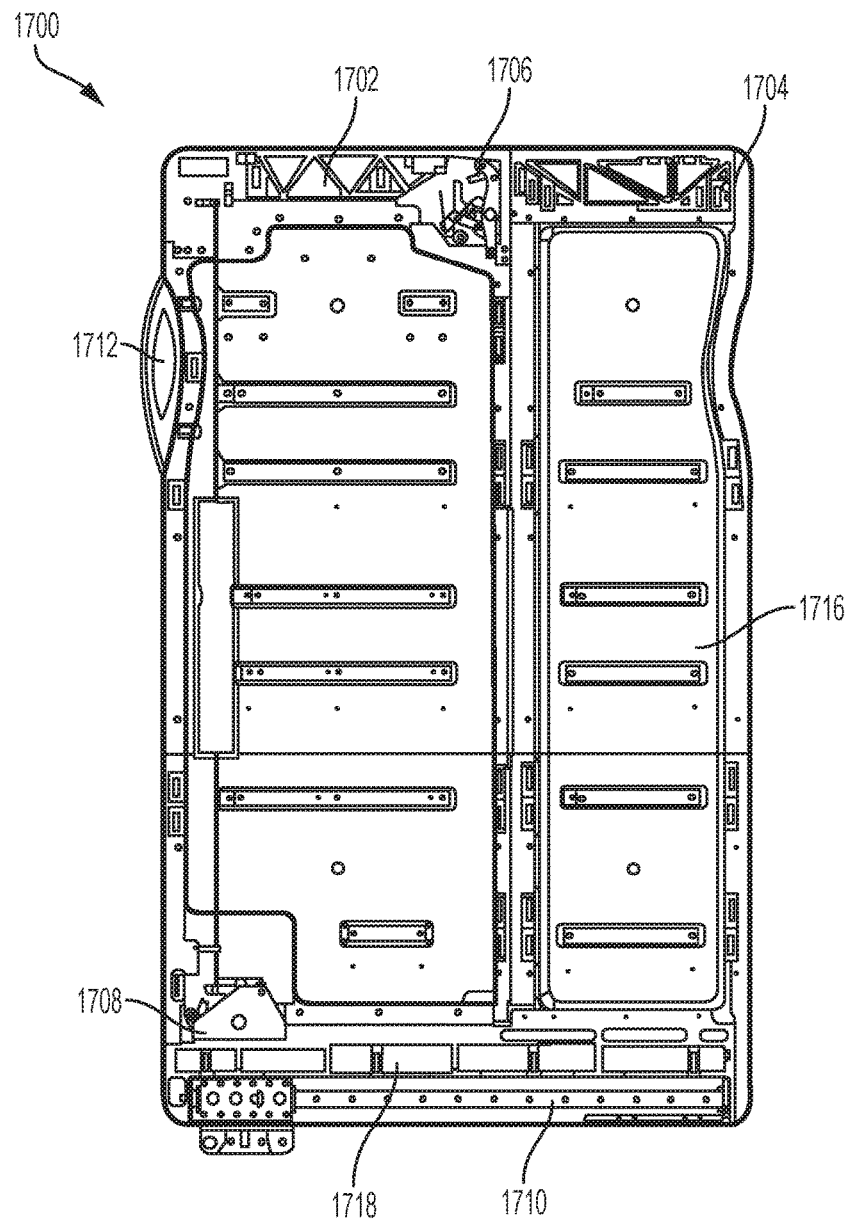
FIG. 17A illustrates an aisle-side view of a panel door assembly.
Figure 17B:
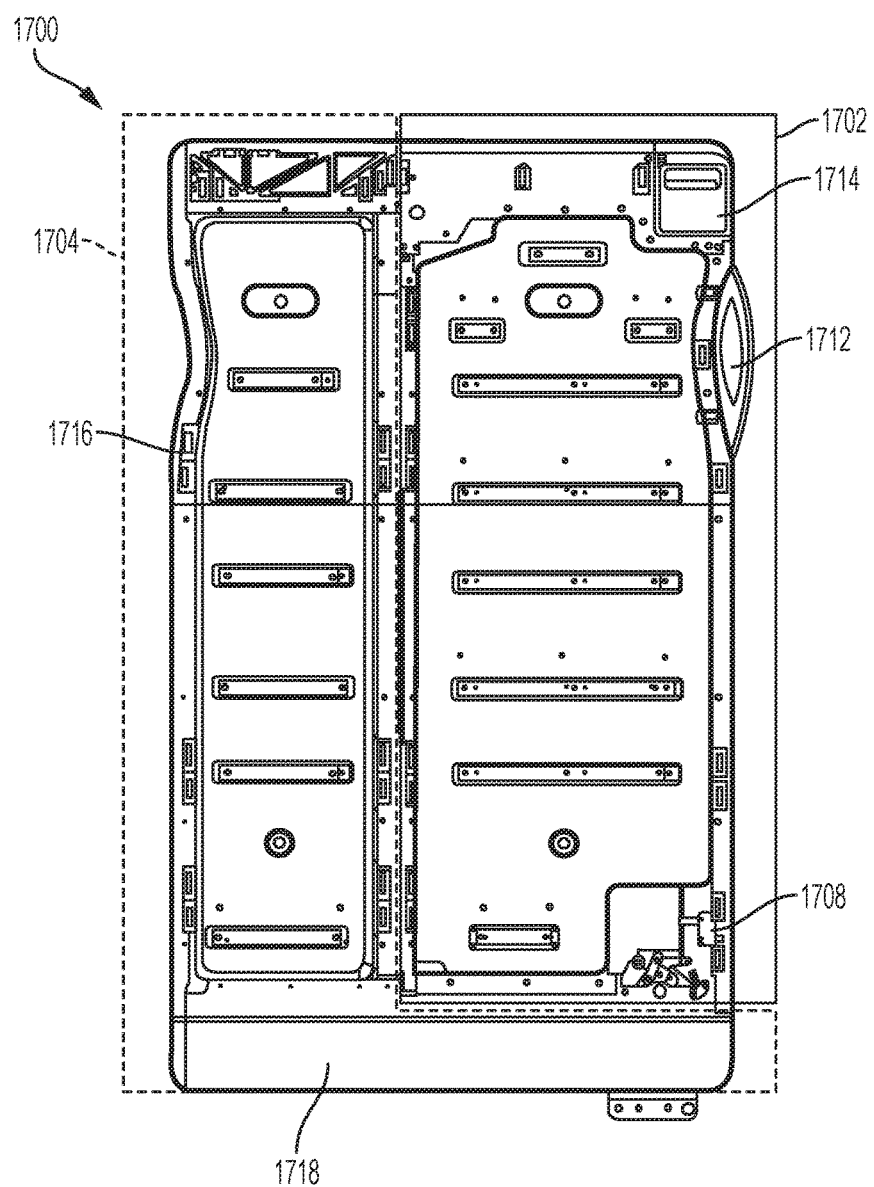
FIG. 17B illustrates a passenger-side view of a panel door assembly.

FIGS. 17A and 17B illustrate views of a panel door assembly 1700, which can be an implementation of the panel door assembly 102 for the passenger suite 150 shown in FIG. 1A. For example, FIG. 17A illustrates an aisle-side view of the panel door assembly 1700, also referred to as an outer view that is adjacent to an aisle of the aircraft cabin. FIG. 17B illustrates a passenger-side view of the panel door assembly 1700, also referred to as an inner view that is adjacent to a passenger sitting within a passenger suite of the aircraft cabin.

In some implementations, the panel door assembly 1700 includes a stationary portion 1702 and a removable portion 1704 that are connected to each other during normal operation of the panel door assembly 1700 such that the panel door assembly 1700 operates as if the panel door assembly 1700 were a single panel structure. The panel door assembly 1700 may include a normal operation handle 1712 from which the panel door assembly 1700 is operated during non-emergency situations. For example, a passenger may grasp the normal operation handle 1712 and slide the panel door assembly 1700 back and forth along rail 1710 to move the panel door assembly 1700 between open and closed positions in order to ingress or egress to/from the passenger suite. As the panel door assembly 1700 is slid back and forth along the rail 1710, the removable and stationary portions of the panel door assembly 1700 remain connected to one another and operate as a single panel structure.

FIG. 17B includes markers indicating the boundaries of the removable panel 1702 and the stationary panel 1704 of the panel door assembly 1700. For example, the solid boundary line delineates the removable panel 1702, and the dashed boundary line delineates the stationary panel 1704. In some implementations, the stationary panel 1704 has an "L" shape with a side portion 1716 extending from an upper edge to a lower edge of the panel door assembly 1700 and a lower portion 1718 extending along a lower edge of the panel door assembly 1700. For example, the lower portion 1718 of the stationary panel 1704 may extend along a length of the rail 1710 on a lower end of the panel door assembly 1700. In some implementations, the removable panel 1702 may have a rectangular shape that is nested between the side portion 1716 and the lower portion 1718 of the stationary panel 1704 when the removable panel 1702 is connected to the stationary panel 1704 during normal operations of the panel door assembly 1700.

In some implementations, a total weight of the panel door assembly 1700 may be designed for ease of operation by an average-sized adult passenger such that the passenger is able to slide the panel door assembly 1700 along the rail 1710 to move the panel door assembly 1700 between open and closed positions. In some examples, a total weight of the panel door assembly 1700 may be preferably less than 30 pounds (lbs.) but may have any weight in ranges from 10-30 lbs., 20-30 lbs., 25-30 lbs., 26-28 lbs., and in one example has a total weight of 27.9 lbs. In addition, the removable panel 1702 may have a weight that is less than the stationary panel 1704 to more easily allow a passenger to remove the removable panel 1702 from the panel door assembly 1700 during emergency operations. In some examples, the weight of the removable panel 1702 may be preferably less than 15 lbs. but may have any weight in ranges from 5-20 lbs., 10-20 lbs., 10-15 lbs., 11-13 lbs., and in one example has a weight of approximately 12.6 lbs. In addition, the weight of the stationary panel 1704 may be preferable less than 20 lbs. but may have any weight in ranges from 5-20 lbs., 10-20 lbs., 15-20 lbs., and in one example has a weight of approximately 15.3 lbs.

In some implementations, an upper latching mechanism 1706 may connect the removable panel 1702 to the side portion 1716 of the stationary panel 1704, and a lower latching mechanism 1708 may connect the removable panel 1702 to the lower portion 1718 of the stationary panel 1704. The passenger side of the removable panel 1702 may also include an emergency handle 1714 that engages the upper latching mechanism 1706 and the lower latching mechanism 1708 to unlatch the removable panel 1702 from the stationary panel 1704 during emergency operations. For example, when the emergency handle 1714 is in a neutral or disengaged position, the upper latching mechanism 1706 and the lower latching mechanism 1708 may be in a latched position, such as when the removable panel 1702 is connected to the stationary panel 1704. To engage the emergency handle 1714, the passenger may pull the emergency handle 1714 away from the removable panel 1702 and toward himself or herself. When the emergency handle 1714 is moved from the neutral position to the engaged position, the upper latching mechanism 1706 and the lower latching mechanism 1708 are actuated and unlatch from the stationary panel 1702, and the removable panel 1702 can be removed from the panel door assembly 1700.

Figure 19A:
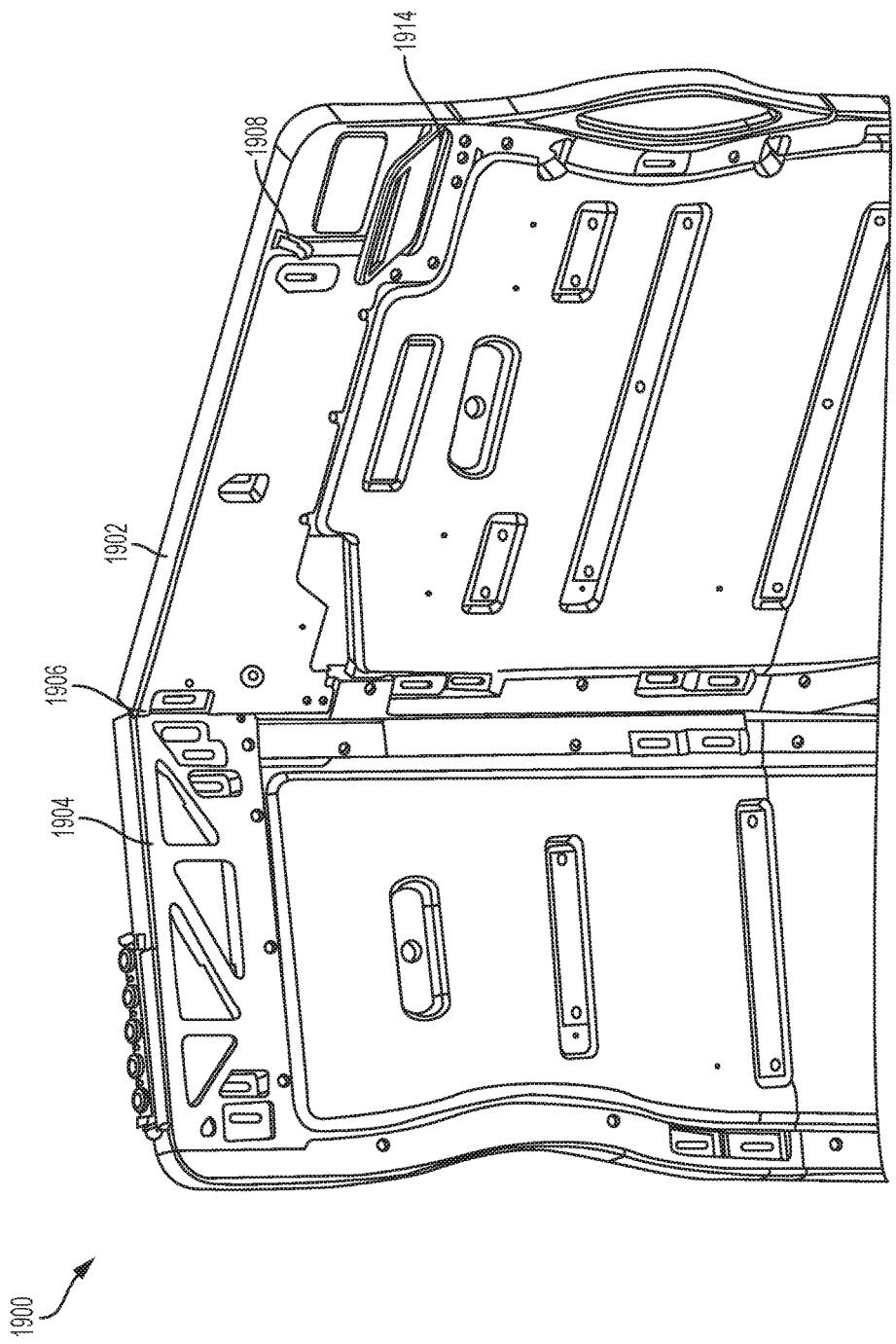
FIG. 19A illustrates hinged operation of the panel door assembly upon actuation of an emergency handle from an aisle-side view.
Figure 19B:
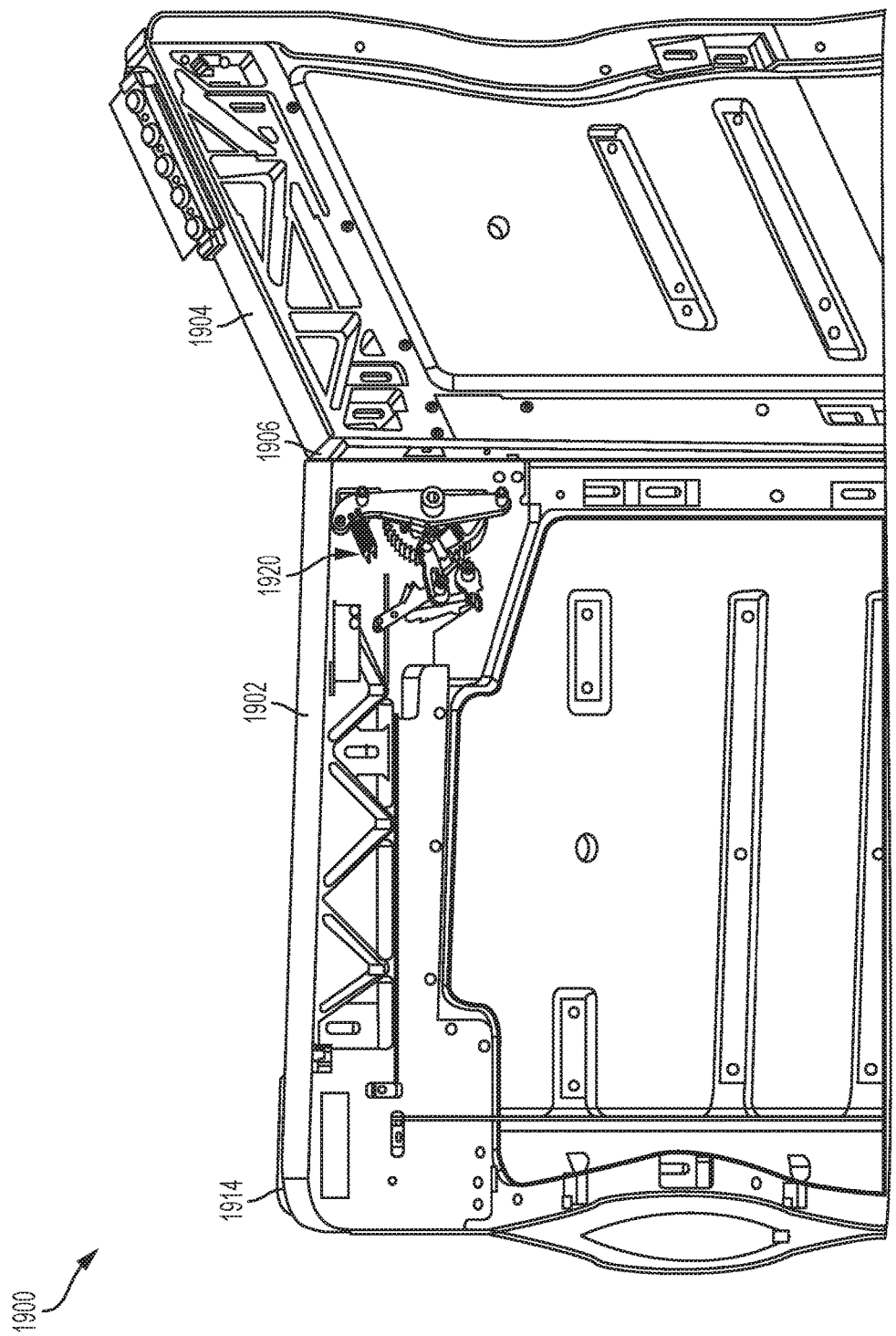
FIG. 19B illustrates hinged operation of the panel door assembly upon actuation of an emergency handle from a passenger-side view.

For example, FIGS. 19A and 19B provide an illustrative example of disconnection of a removable panel 1902 from a stationary panel 1904 of a panel door assembly 1900 upon actuation of an emergency handle 1914. FIG. 19A provides an aisle-side view, and FIG. 4B provides a passenger side view of the panel door assembly 1900. In some implementations, a passenger side of the removable panel 1902 includes a securing mechanism 1908 that holds emergency handle 1914 in a neutral position during normal operations of the panel door assembly 1900 in order to prevent inadvertent unlatching of the removable panel 1902 from the stationary panel 1904. In some implementations, the removable panel 1902 includes upper latching mechanism 1920 and lower latching mechanism (not shown in FIGS. 19A and 19B), which become unlatched from the stationary panel 1902 in response to actuation of the emergency handle 1914. In addition, the panel door assembly 1900 may include a hinge 1906 between the removable panel 1902 and a side portion of the stationary panel 1904 that allows the removable portion to hinge toward the passenger suite/seat during disconnection of the removable panel 1902 from the stationary panel 1904. In some implementations, the removable panel 1902 may be designed to hinge or pivot toward the suite or seat of the passenger to prevent obstruction of an aisle by the removable panel 1902 during emergency operation.

Figure 18A:
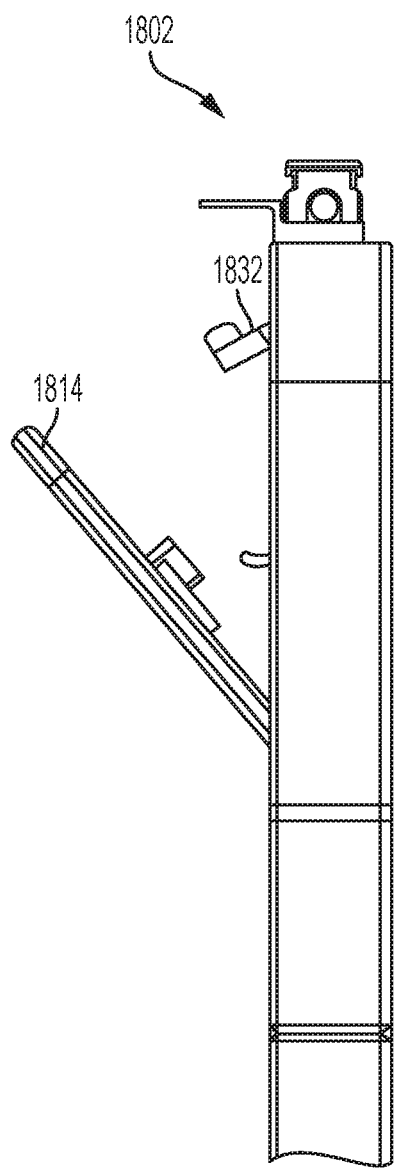
FIG. 18A illustrates operation of an emergency handle on a removable door panel.
Figure 18B:
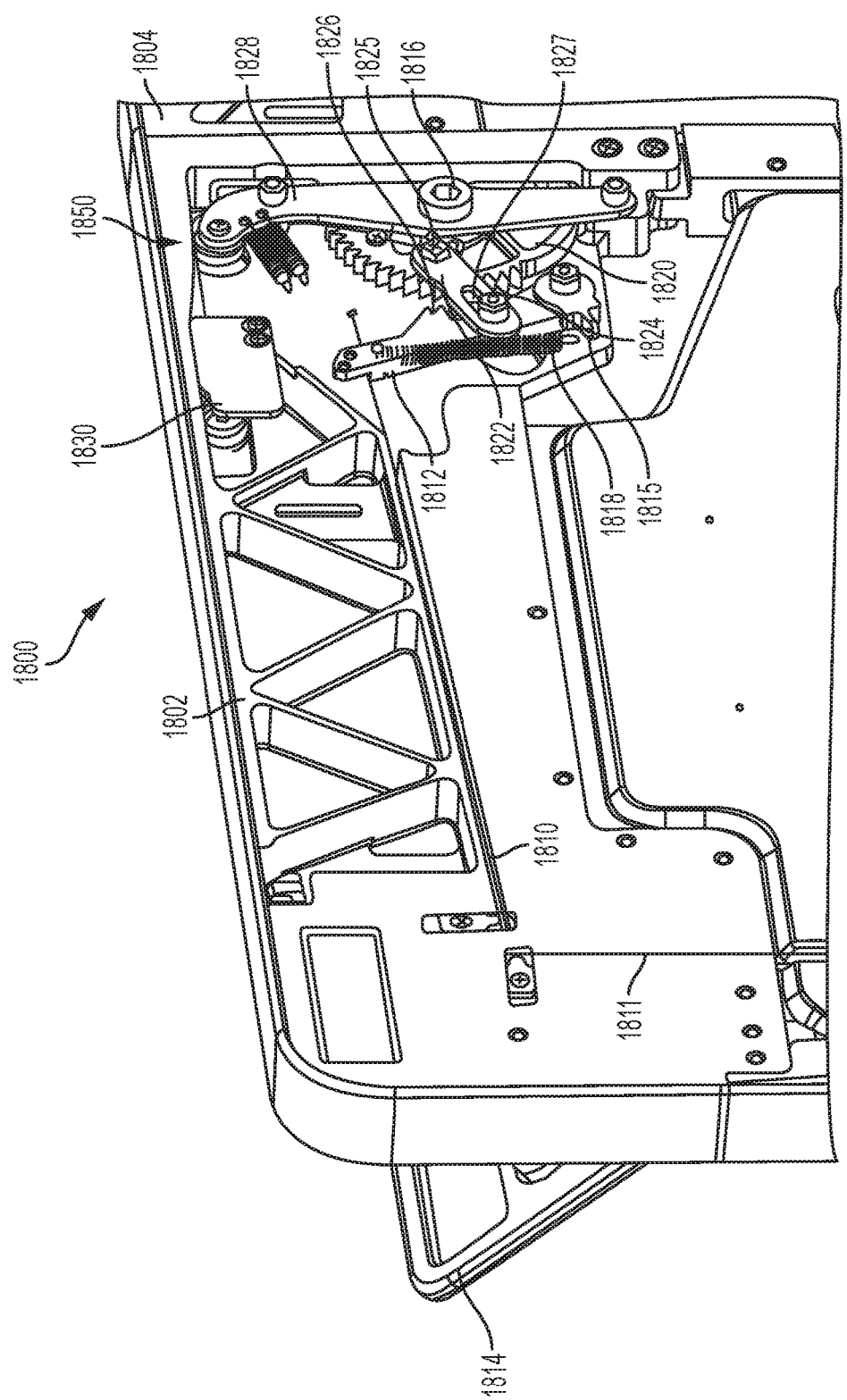
FIG. 18B illustrates operation of an upper latching mechanism for a removable door panel.
Figure 18C:
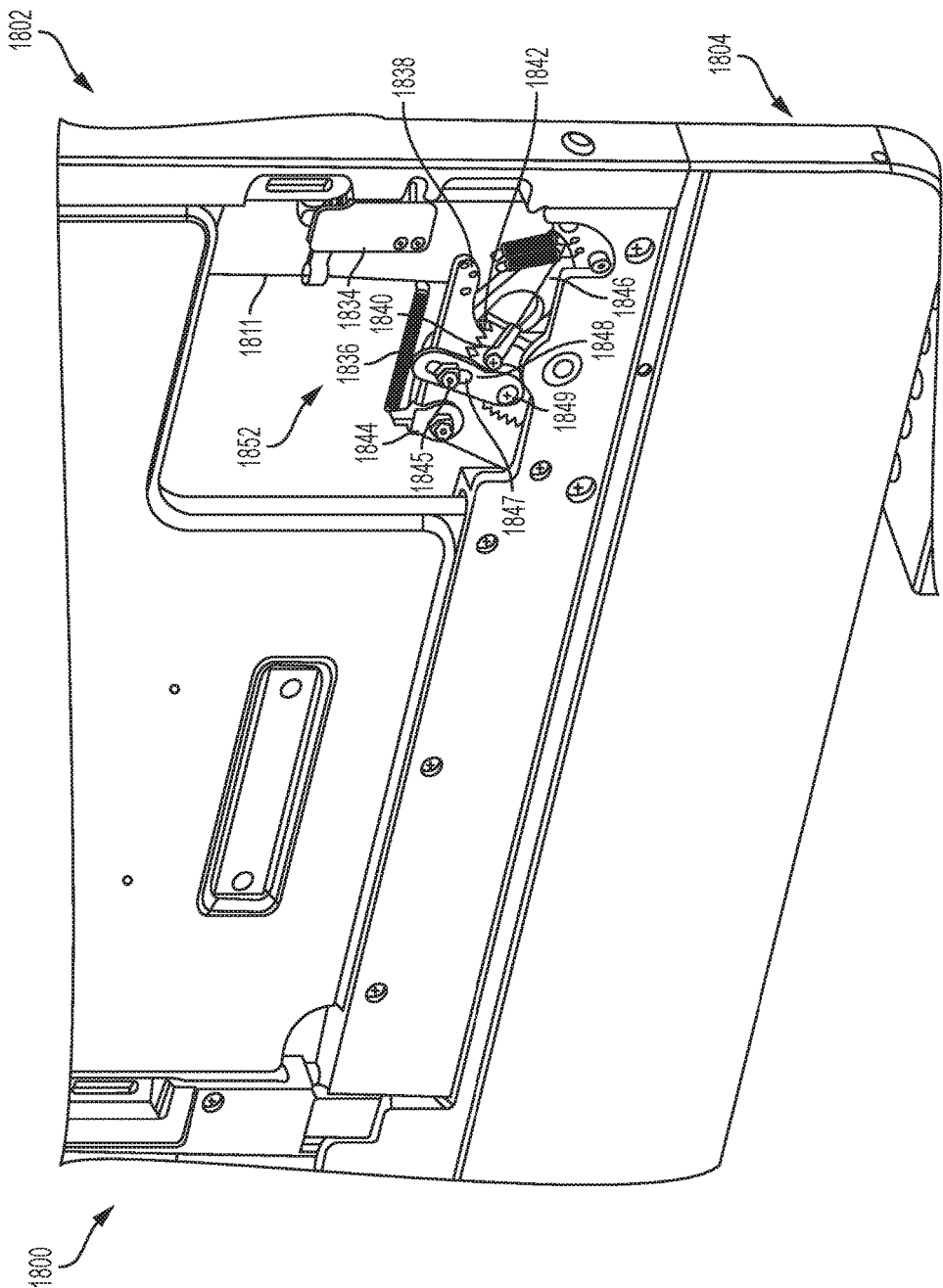
FIG. 18C illustrates operation of a lower latching mechanism for a removable door panel.

Turning to FIGS. 18A-18C, zoomed in views of an upper latching mechanism 1850 and a lower latching mechanism 1852 of a removable panel 1802 for a panel door assembly 1800 are illustrated. FIG. 18A illustrates a side view of removable panel 1802 where emergency handle 1814 is in an engaged or actuated position. In some implementations, a passenger side of the removable panel 1802 includes a securing mechanism 1832 that holds the emergency handle 1814 in a neutral position during normal operations of the panel door assembly 1800 in order to prevent inadvertent unlatching of the removable panel 1802 from stationary panel 1804. To engage the emergency handle 1814, the passenger may pull emergency handle 1814 away from the removable panel 1802 and toward himself or herself. When the emergency handle 1814 is moved from the neutral position to the engaged position, the upper latching mechanism 1850 and the lower latching mechanism 1852 are actuated and unlatch from the stationary panel 1802 so that the removable panel 1702 can be removed from the panel door assembly 1700.

FIG. 18B illustrates the upper latching mechanism 1850 for the removable panel 1802 that provides for disconnecting the removable panel 1802 from a side portion of a stationary panel 1804 during emergency situations when the emergency handle 1814 on the passenger side of the panel door assembly 1800 is pulled. For example, the emergency handle 1814 may be connected to the upper latching mechanism 1850 by a first cable 1810 and to the lower latching mechanism 1852 by a second cable 1811. In some implementations, the first cable 1810 and second cable 1811 pass through apertures between the passenger-side and aisle-side of the removable panel 1802 such that the first cable 1810 activates the upper latching mechanism 1850 and the second cable 1811 activates the lower latching mechanism 1852 in response to actuation of the emergency handle 1814.

The first cable 1810 and second cable 1811 pass through the panel 300 from the aisle-side to the passenger-side of the panel and connect to the emergency handle 1814. When the emergency handle 1814 is pulled toward the passenger, the first cable 1810 and second cable 1811 are pulled with the emergency handle 1814. In some implementations, when the emergency handle 1814 is actuated, the first cable 1810 is pulled by the emergency handle, thereby engaging the upper latching mechanism 1850 by rotating an upper lever 1812 on a pivot 1815 away from the stationary panel 1804. In some examples, a resisting spring 1818 may connect between the upper lever 1812 and the pivot 1815 and may provide resistance to rotational motion of the upper lever 1812.

In addition, the upper lever 1812 may be connected to a rotating gear 1820 by a bar 1822 that is secured at a first end to the upper lever 1812 by a first fastener 1824 and at a second end to the gear 1820 by a second fastener 1825. The first fastener 1824 and second fastener 1825 may be any type of fastener such as any type screws, nuts, bolts, and the like. In some implementations, the bar 1822 may include an elongated groove 1827, which functions as a translation path for the first fastener 1824 such that the first fastener 1824 translates across the groove 1827 as the upper lever 1812 rotates away from the stationary panel 1804 in response to a force applied to the upper lever 1812 by the first cable 1810. As the upper lever 1812 and the gear 1820 rotate, the first fastener 1824 travels from a first end to the second end of the groove 1827 in the bar 1822 such that the groove 1827 may be configured to limit an amount of rotation of the upper lever 1812. For example, when the upper latching mechanism 1850 is in a latched position prior to actuation of the emergency handle 1814, the first fastener 1824 is at a first end of the groove, and when the upper latching mechanism 1850 is unlatched, the first fastener 1824 travels to the second end of the groove 1827.

In addition, as the upper lever 1812 rotates on the pivot 1815, the gear 1820 also rotates in the same direction as the upper lever 1812 due to a force applied by the bar 1822 connecting the upper lever 1812 and the gear 1820. The gear 1820 continues to rotate away from the stationary panel 1804 until teeth of the gear 1820 engage complementary teeth 1826 on the upper lever 1812, which stops or limits rotation of the gear 1820. In some implementations, the teeth of the gear 1820 engage the complementary teeth 1826 on the upper lever 1812 at substantially the same time that the first fastener 1824 reaches the second end of the groove 1827.

In some implementations, the upper latching mechanism 1850 also includes a pivoting latch 1828 that is connected at its approximate center to the gear 1820 by a fastener 1816, which may be any type of fastener such as screws, nuts, bolts, and the like. The pivoting latch 1828 may be configured to connect to the stationary panel 1804 when the emergency handle 1814 is not actuated. In response to the rotation of the gear 1820 away from the stationary panel 1804, the pivoting latch 1828 also pivots away from the stationary panel 1804, thereby unlatching the removable panel 1802 from the stationary panel 1804. In some implementations, the pivoting latch 1828 continues to rotate away from the stationary panel 1804 even after the teeth of the gear 1820 have engaged the teeth 1826 of the upper lever 1812. In addition, an upper end of the pivoting latch 1828 may be connected to a retention mechanism 1830, such as a spring that holds the pivoting latch 1828 in a closed or latched position when the emergency handle 1814 has not been pulled.

FIG. 18C illustrates the lower latching mechanism 1852 for the removable panel 1802 that provides for disconnecting the removable panel 1802 from a lower portion of the stationary panel 1804 during emergency situations when the emergency handle 1814 on the passenger side of the panel door assembly 1800 is pulled. In some implementations, the lower latching mechanism 1852 operates similarly to the upper latching mechanism 1850. When the emergency handle 1814 is pulled toward the passenger, the second cable 1811 is pulled upward by the emergency handle 1814, thereby engaging the lower latching mechanism 1850 by rotating a lower lever 1838 on a pivot 1844 away from the stationary panel 1804. In some examples, a resisting spring 1836 may connect between the lower lever 1838 and the pivot 1844 and may provide resistance to rotational motion of the lower lever 1838. In addition, the lower latching mechanism 1852 may include a retention mechanism 1834 with a groove that holds one end of the second cable 1811 that is secured at the other end to the emergency handle 1814. In some implementations, the retention mechanism 1834 may also include a spring that holds the lower latching mechanism 1852 in a closed or latched position when the emergency handle 1814 has not been pulled.

In addition, the lower lever 1838 may be connected to a rotating gear 1840 by a bar 1848 that is secured at a first end to the lower lever 1838 by a first fastener 1845 and at a second end to the gear 1840 by a second fastener 1849. The first fastener 1845 and second fastener 1849 may be any type of fastener such as any type screws, nuts, bolts, and the like. In some implementations, the bar 1848 may include an elongated groove 1847, which functions as a translation path for the first fastener 1845 such that the first fastener 1845 translates across the groove 1847 as the lower lever 1838 rotates away from the stationary panel 1804 in response to an upward force applied to the lower lever 1838 by the second cable 1811. As the lower lever 1838 and the gear 1840 rotate, the first fastener 1845 travels from a first end to the second end of the groove 1847 in the bar 1848 such that the groove 1847 may be configured to limit an amount of rotation of the lower lever 1838. For example, when the lower latching mechanism 1852 is in a latched position prior to actuation of the emergency handle 1814, the first fastener 1845 is at a first end of the groove and when the lower latching mechanism 1852 is unlatched, the first fastener 1845 travels to the second end of the groove 1847.

In addition, as the lower lever 1838 rotates on the pivot 1844, the gear 1840 also rotates in the same direction as the lower lever 1838 (e.g., upward) due to a force applied by the bar 1848 connecting the lower lever 1838 and the gear 1840. The gear 1840 continues to rotate away from the lower portion of the stationary panel 1804 until teeth of the gear 1840 engage complementary teeth 1842 on the lower lever 1838, which stops or limits rotation of the gear 1840. In some implementations, the teeth of the gear 1840 engage the complementary teeth 1842 on the lower lever 1838 at substantially the same time that the first fastener 1845 reaches the second end of the groove 1847.

In some implementations, the lower latching mechanism 1852 also includes a pivoting latch 1846 that is connected to the gear 1840 by a fastener (not shown), which may be any type of fastener such as screws, nuts, bolts, and the like. The pivoting latch 1846 may be configured to connect to the lower portion of the stationary panel 1804 when the emergency handle 1814 is not actuated. In response to the rotation of the gear 1840 away from the stationary panel 1804, the pivoting latch 1846 also pivots away from the stationary panel 1804, thereby unlatching a lower end of the removable panel 1802 from the stationary panel 1804. In some implementations, the pivoting latch 1846 continues to rotate away from the stationary panel 1804 even after the teeth of the gear 1840 have engaged the complementary teeth 1842 of the lower lever 1838.

The panel door assembly implementations described above may be implemented in aircraft cabin configurations for various sizes and types of aircraft cabins and passenger suites while still providing for proper sight lines of passengers by flight crew personnel. In some implementations, when in the closed or extended position, a panel door assembly can be configured to extend from an aisle-side privacy panel for the passenger suite to an aisle-side privacy panel of a passenger suite in the next row forward such that the panel door assembly cuts off access to an ingress/egress aisle of the passenger suite when in the closed or extended position, such as when the passenger is seated within the passenger suite. As discussed above, the panel door assembly includes an emergency handle that can be actuated from a passenger side of the suite to disconnect a removable panel from the panel door assembly to allow for egress from the passenger suite. In some examples, the panel door assembly for a front row passenger suite may extend from an aisle-side privacy panel for the passenger suite to an edge of a forward cabin monument that forms a forward boundary of the passenger suite.

Figure 20:
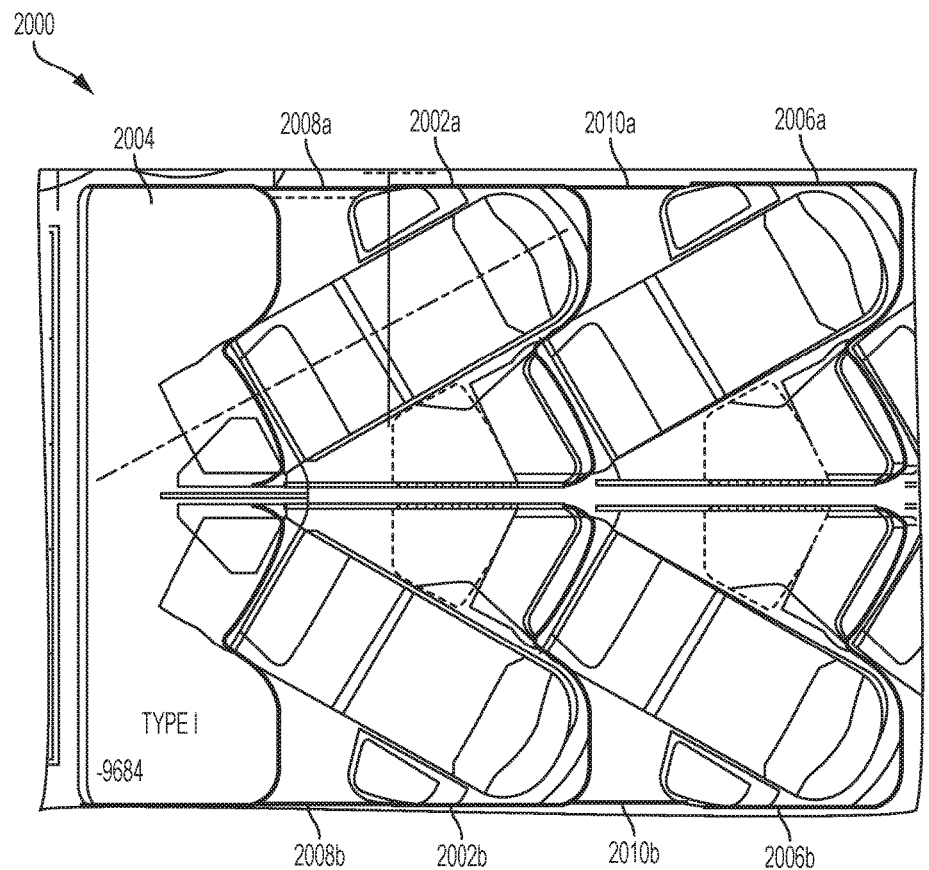
FIG. 20 illustrates a layout of passenger accommodation (LOPA) for an aircraft cabin configured with rows of passenger suites in which aisle-side panels of front row suites are aligned with aisle-side edges of forward cabin monuments.

For example, FIG. 20 illustrates a layout of passenger accommodation (LOPA) for an aircraft cabin 2000 configured with rows of passenger suites in which aisle-side panels of front row suites 2002 are aligned with aisle-side edges of forward cabin monuments 2004. In some implementations, panel door assemblies 2008 extend across openings to the passenger suites 2002 from an aisle-side privacy panel to an edge of a forward cabin monument 2004 that forms a forward boundary of the passenger suite 2002. In addition, for non-front row suites, such as passenger suites 2006, panel door assemblies 510 extend across openings of the passenger suites 2006 from an aisle-side privacy panel to an aisle-side privacy panel of the passenger suites 2002 in the next row forward.

Figure 21A:
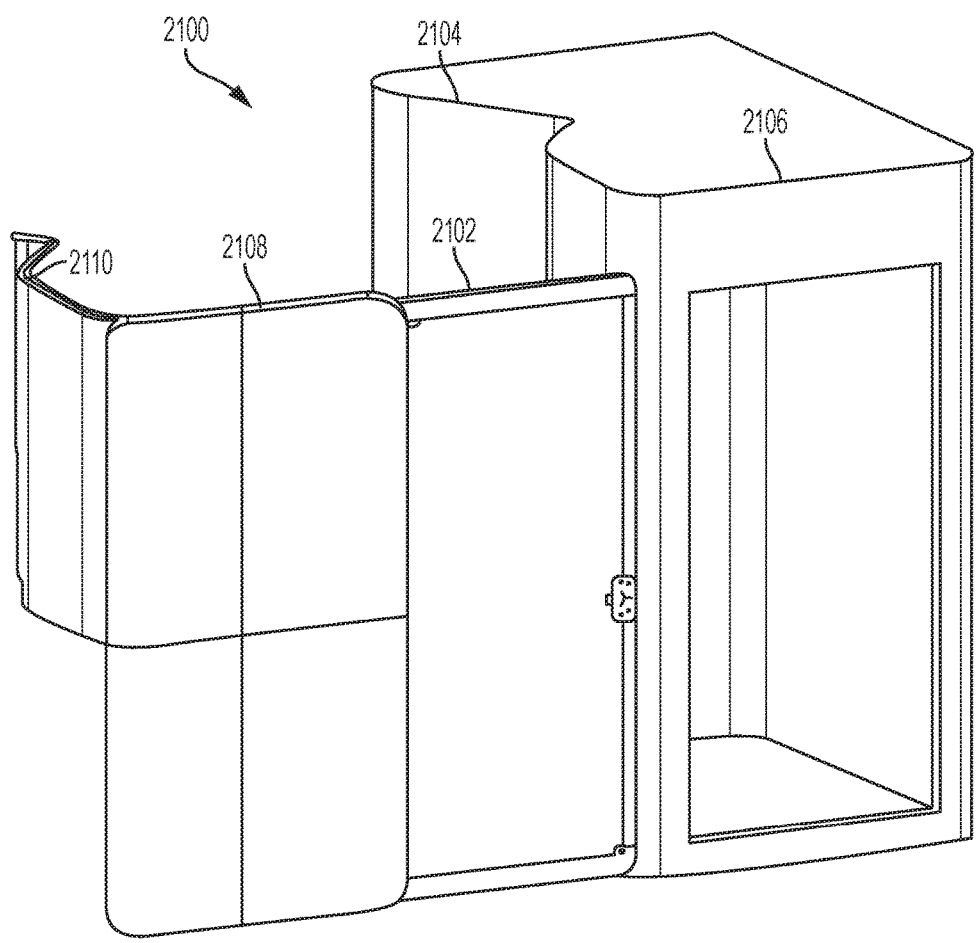
FIGS. 21A-21C illustrate views of panel door assemblies for front row passenger suites.
Figure 21B:
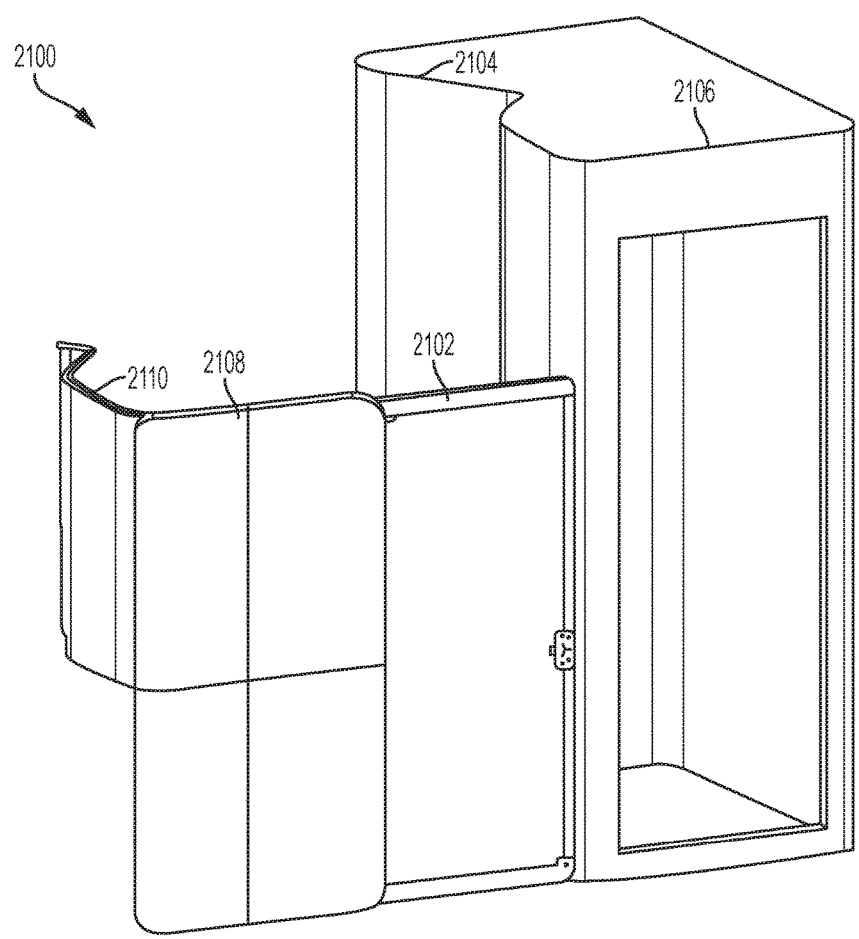
Figure 21C:
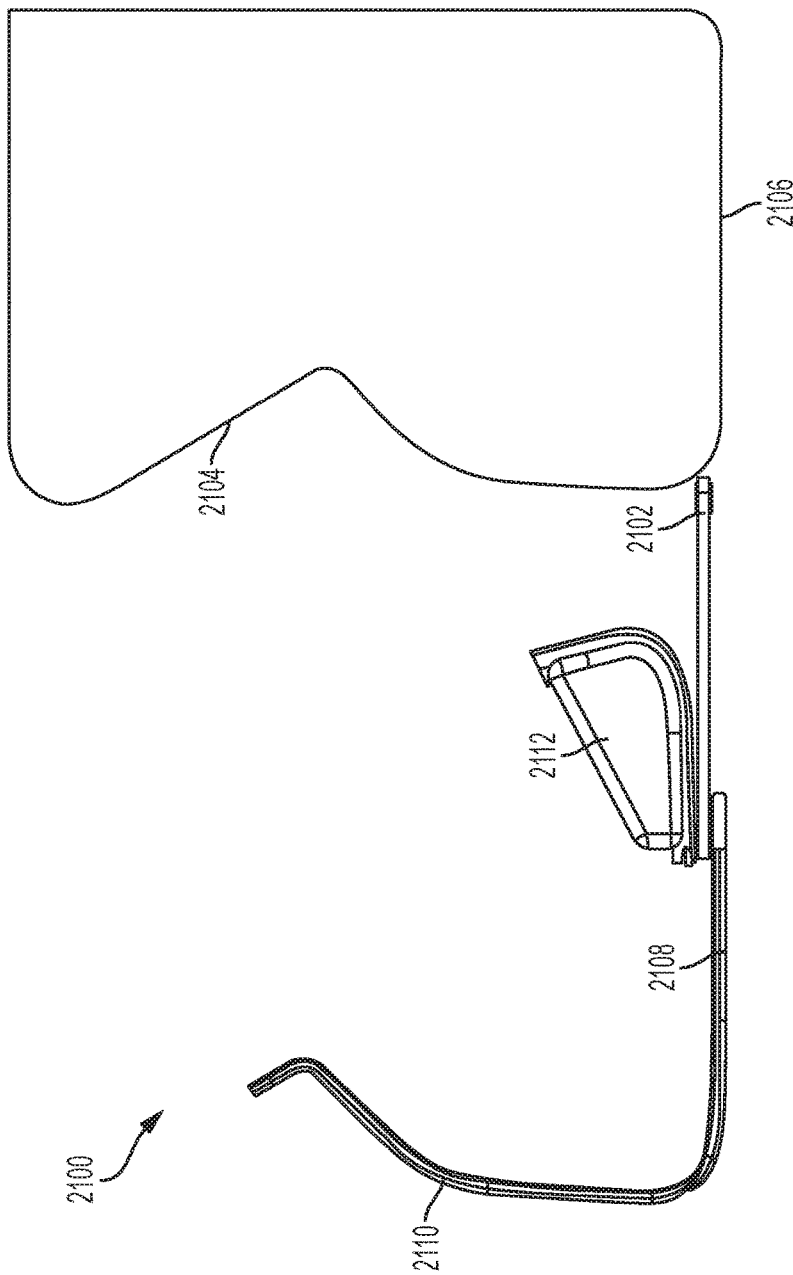

FIGS. 21A-21C illustrate views of a panel door assembly 2102 for a front row passenger suite 2100 of an aircraft cabin, such as the aircraft cabin 2000 of FIG. 20. For example, FIG. 21A is an aisle-side perspective view of the passenger suite 2100, FIG. 21B is an aisle-side perspective view of the passenger suite 2100 in an underbin configuration, and FIG. 21C provides a top-down view of the passenger suite 2100. In the underbin configuration shown in FIG. 21B, a height of the aft panel 2110, aisle-side privacy panel 2108, and panel door assembly 2102 may be reduced in order to fit underneath overhead storage bins in the aircraft cabin.

In some implementations, the passenger suite 2100 may include aft panel 2110 which functions as an aft boundary between the passenger suite 2100 and another passenger suite to the rear. In addition, an aft edge of forward cabin monument 2104 can function as a forward boundary of the passenger suite 2100. In some examples, the passenger suite 2100 may include a reclinable seat that extends from the aft panel 2110 to the forward cabin monument 2104 when the seat is in a lie-flat (e.g., bed) position. For example, a shape or curvature of the aft edge of the forward cabin monument 2104 may be designed to accommodate the seat of the passenger suite 2100 when in the lie-flat position.

An aisle-side privacy panel 2108, panel door assembly 2102, and an aisle-side edge 2106 of the forward cabin monument 2104 form an aisle-side boundary for the passenger suite 2100. In addition, the panel door assembly 2102 shown in FIGS. 6A-6C is in a closed position such that the panel door assembly 2102 extends from a forward end of the aisle-side privacy panel 2108 to the aisle-side edge 2106 of the forward cabin monument 2104. In some implementations, the panel door assembly 2102 slides in forward and rearward directions along an inner surface of the aisle-side privacy panel 2108 when moving between open and closed positions. When moving to the open position, the panel door assembly 2102 may slide in a rearward direction such that the panel door assembly 2102 is overlapped by the aisle-side privacy panel 2108. In addition, the panel door assembly 2102 may also overlap an armrest or table 2112 of the passenger suite 2100 when moving between the open and closed positions.

Figure 22:
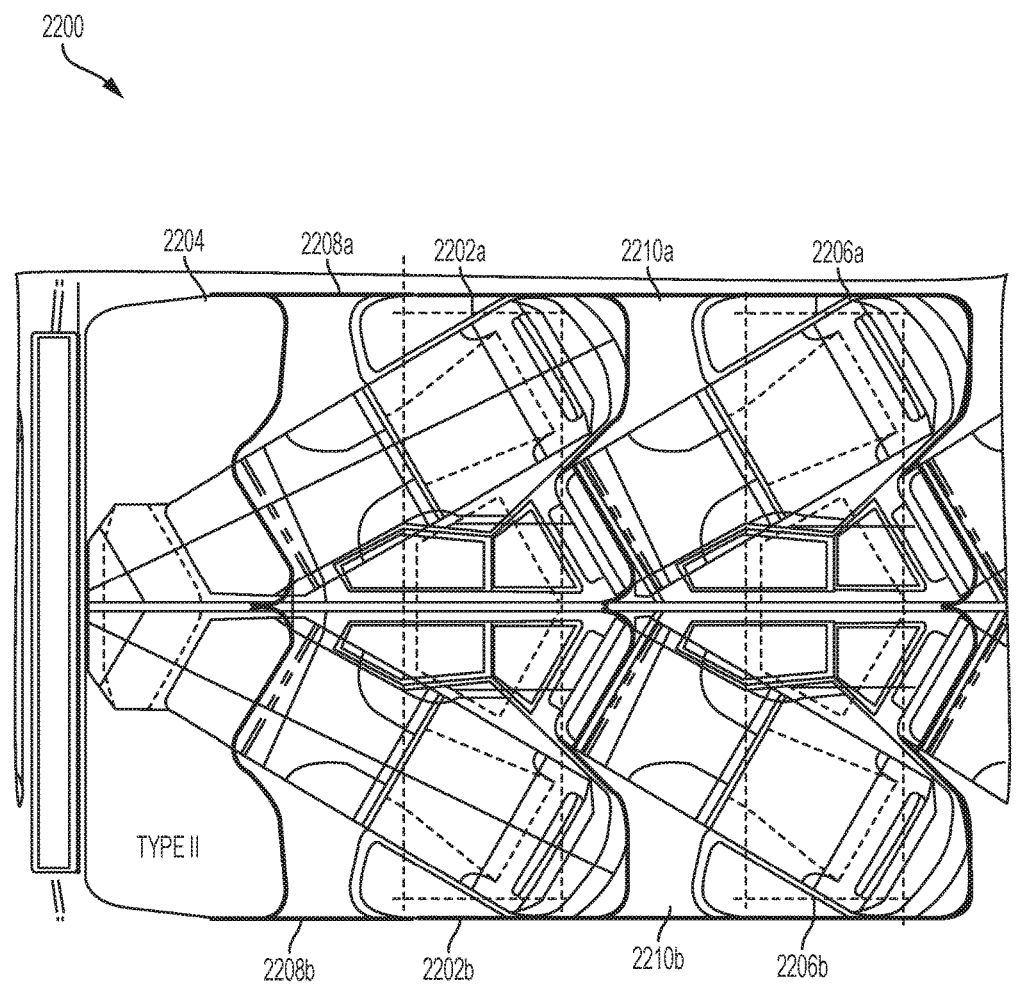
FIG. 22 illustrates a LOPA for an aircraft cabin configured with rows of passenger suites in which aisle-side panels of front row suites are aligned with aisle-side edges of forward cabin monuments.

FIG. 22 illustrates a LOPA for another configuration of an aircraft cabin 2200 configured with rows of passenger suites in which aisle-side panels of front row suites 2202 are aligned with aisle-side edges of forward cabin monuments 2204. Compared to the LOPA for the aircraft cabin 2000 shown in FIG. 20, the passenger suites 2202, 2206 of the aircraft cabin 2200 as well as the forward cabin monument 2204 have different dimensions and relative orientations than those in the aircraft cabin 2000. For example, an aisle-side edge of forward cabin monument 2204 may be curved while an aisle-side edge of forward cabin monument 2004 may be more squared off with the aisle. In addition, front row panel door assemblies 2208 may have a greater width than front row panel door assemblies 2008 of FIG. 20 due to a greater width of the ingress/egress aisle for the front row passenger suites 2202. In some implementations, panel door assemblies 2208 extend across openings to the passenger suites 2202 from an aisle-side privacy panel to an edge of a forward cabin monument 2204 that forms a forward boundary of the passenger suite 2202. In addition, for non-front row suites, such as passenger suites 2206, panel door assemblies 2210 extend across openings of the passenger suites 2206 from an aisle-side privacy panel to an aisle-side privacy panel of the passenger suites 2202 in the next row forward.

Figure 23A:
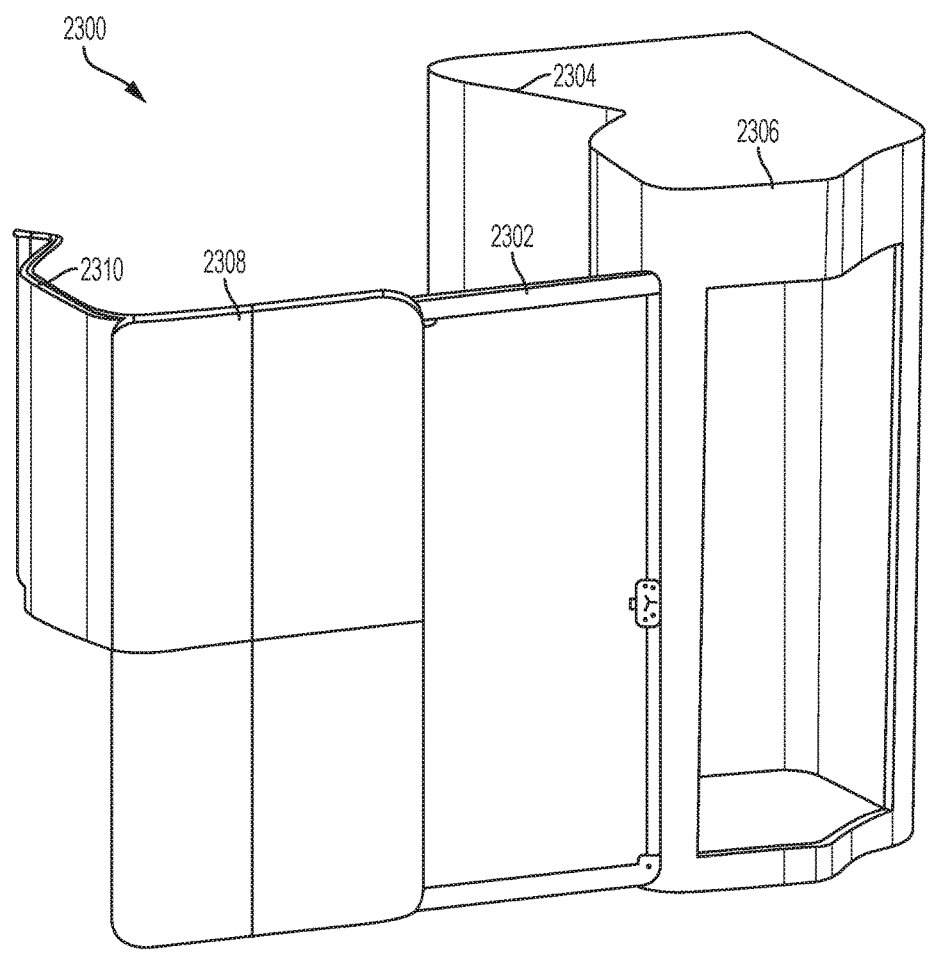
FIGS. 23A-23C illustrate views of panel door assemblies for front row passenger suites.
Figure 23B:
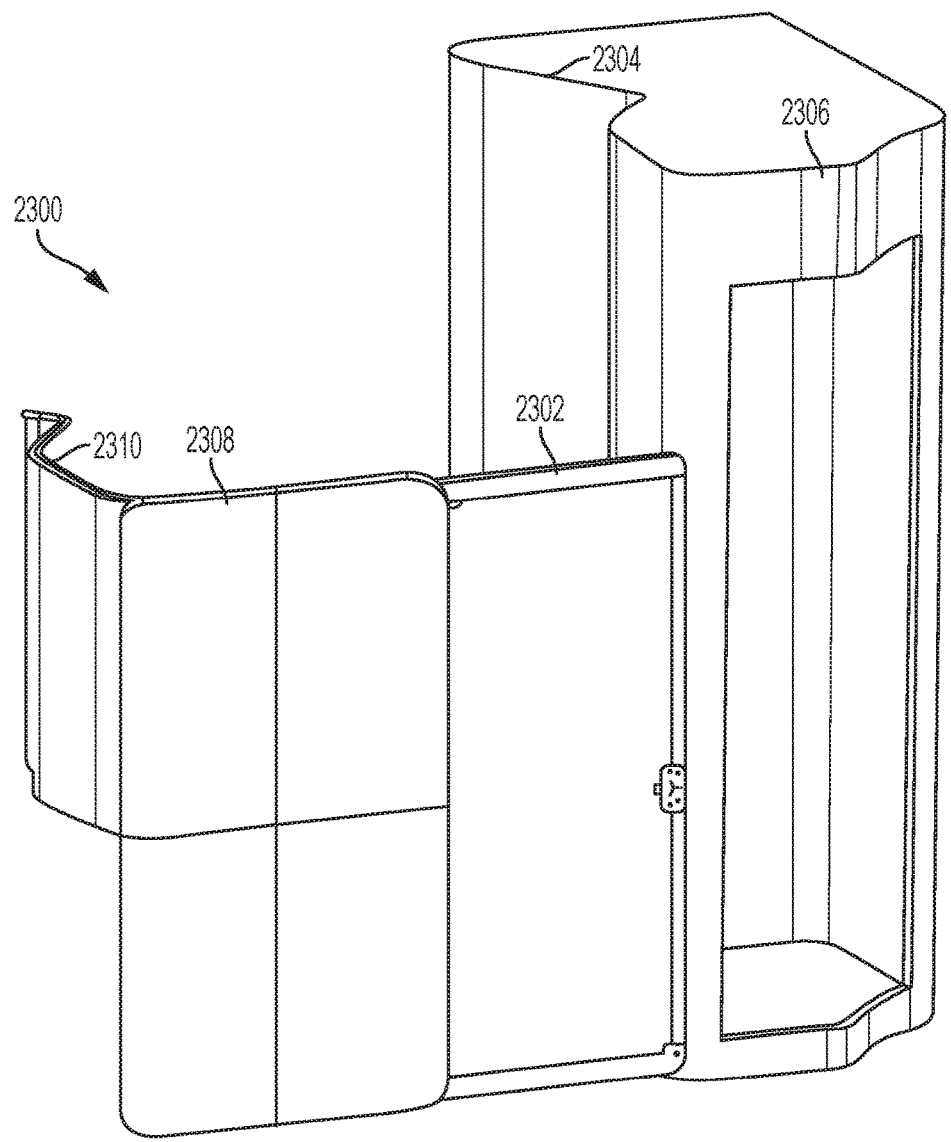
Figure 23C:
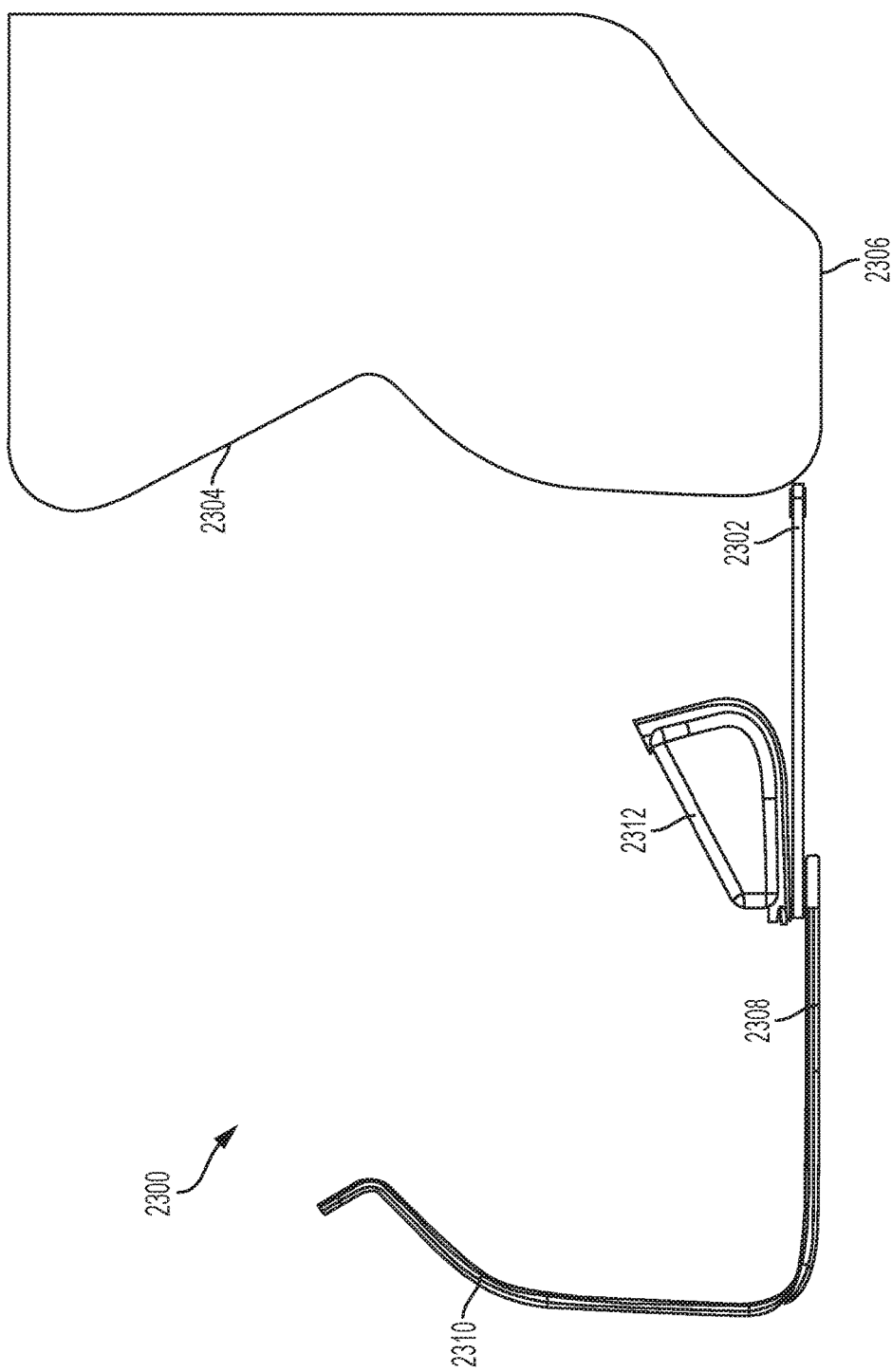

FIGS. 23A-23C illustrate views of a panel door assembly 2302 for front row passenger suite 2300 of an aircraft cabin, such as the aircraft cabin 2200. For example, FIG. 23A is an aisle-side perspective view of the passenger suite 2300, FIG. 23B is an aisle-side perspective view of the passenger suite 2300 in an underbin configuration, and FIG. 23C provides a top-down view of the passenger suite 2300. In the underbin configuration shown in FIG. 23B, a height of the aft panel 2310, aisle-side privacy panel 2308, and panel door assembly 2302 may be reduced in order to fit underneath overhead storage bins in the aircraft cabin.

In some implementations, the passenger suite 2300 may include aft panel 2310 which functions as an aft boundary between the passenger suite 2300 and another passenger suite to the rear. In addition, an aft edge of forward cabin monument 2304 can function as a forward boundary of the passenger suite 2300. In some examples, the passenger suite 2300 may include a reclinable seat that extends from the aft panel 2310 to the forward cabin monument 2304 when the seat is in a lie-flat (e.g., bed) position. For example, a shape or curvature of the aft edge of the forward cabin monument 2304 may be designed to accommodate the seat of the passenger suite 2300 when in the lie-flat position.

An aisle-side privacy panel 2308, panel door assembly 2302, and an aisle-side edge 2306 of the forward cabin monument 2304 form an aisle-side boundary for the passenger suite 2300. In addition, the panel door assembly 2302 shown in FIGS. 23A-23C is in a closed position such that the panel door assembly 2302 extends from a forward end of the aisle-side privacy panel 2308 to the aisle-side edge 2306 of the forward cabin monument 2304. In some examples, the aisle-side edge 2306 of the forward cabin monument 2304 may have a more curved or tapered shape than the forward cabin monument 2104 (FIG. 21). In some implementations, the panel door assembly 2302 slides in forward and rearward directions along an inner surface of the aisle-side privacy panel 2308 when moving between open and closed positions. When moving to the open position, the panel door assembly 2302 may slide in a rearward direction such that the panel door assembly 2302 is overlapped by the aisle-side privacy panel 2308. In addition, the panel door assembly 2302 may also overlap an armrest or table 2312 of the passenger suite 2300 when moving between the open and closed positions.

Figure 24:
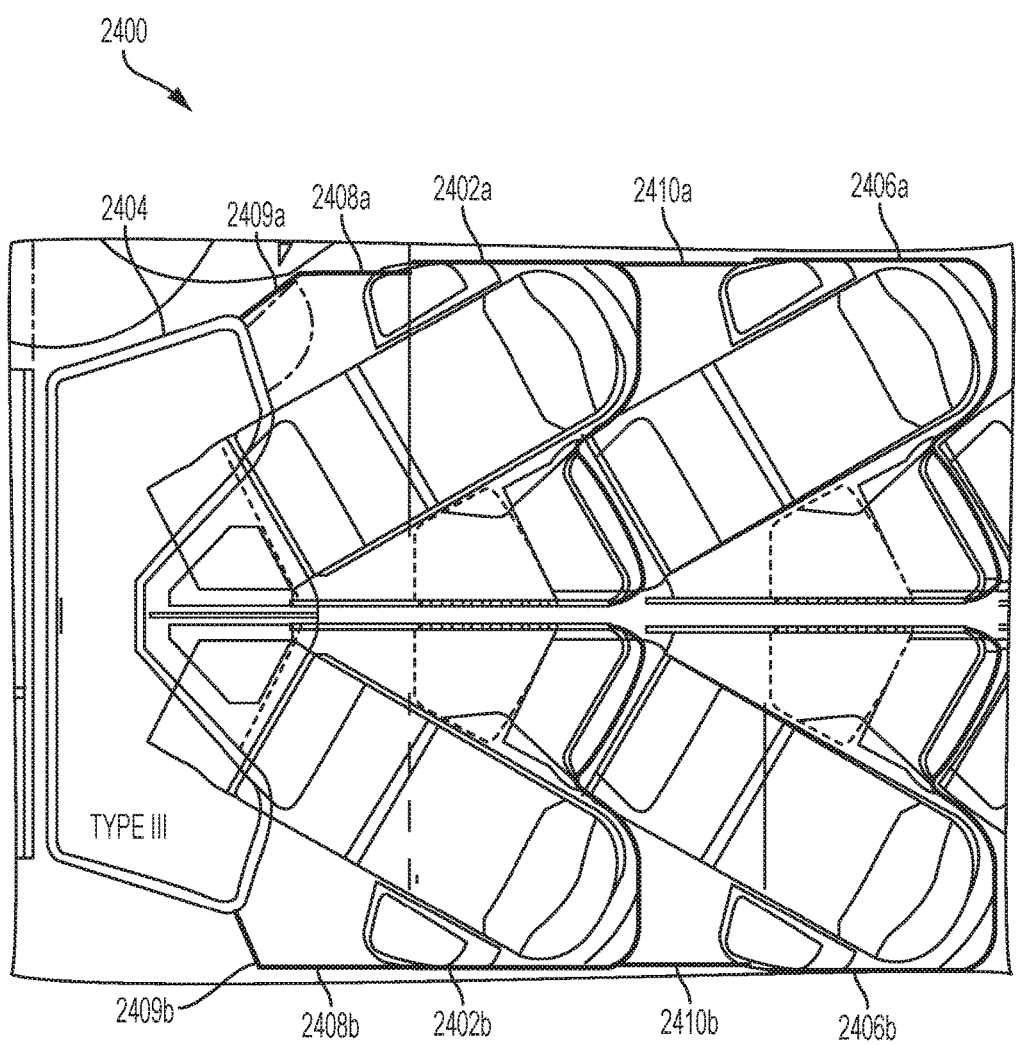
FIG. 24 illustrates a LOPA for an aircraft cabin configured with rows of passenger suites in which aisle-side panels of front row suites are out of line with aisle-side edges of forward cabin monuments.

Turning to FIG. 24, a LOPA for an aircraft cabin 2400 configured with rows of passenger suites in which aisle-side panels of front row suites 2402 are out of line with aisle-side edges of forward cabin monuments 2404 is illustrated. Compared to the LOPA for the aircraft cabins 2000 and 2200 shown in FIGS. 20 and 22, the forward cabin monuments 2404 are narrower than a total width of the front row passenger suites 2402 such that a front edge of the panel door assemblies 2408 for the front row suites 2402 are offset from the aisle-side edge of the front row monuments 2404 when in the extended or closed position, creating a gap between the front row monuments 2404 and the panel door assemblies 2408. In some implementations, the front row passenger suites 2402 include additional filler doors 2409 that bridge the gap between the panel door assemblies 2408 and the forward cabin monuments 2404 when the panel door assemblies 2408 are in the closed position. The aircraft cabin 2400 also includes an additional row of passenger suites 2406 aft of the front row passenger suites 2402 that include panel door assemblies 2410 extending across suite openings from an aisle-side privacy panel of the passenger suites 2406 to an aisle-side privacy panel of the passenger suites 2402 in the next row forward.

Figure 25A:
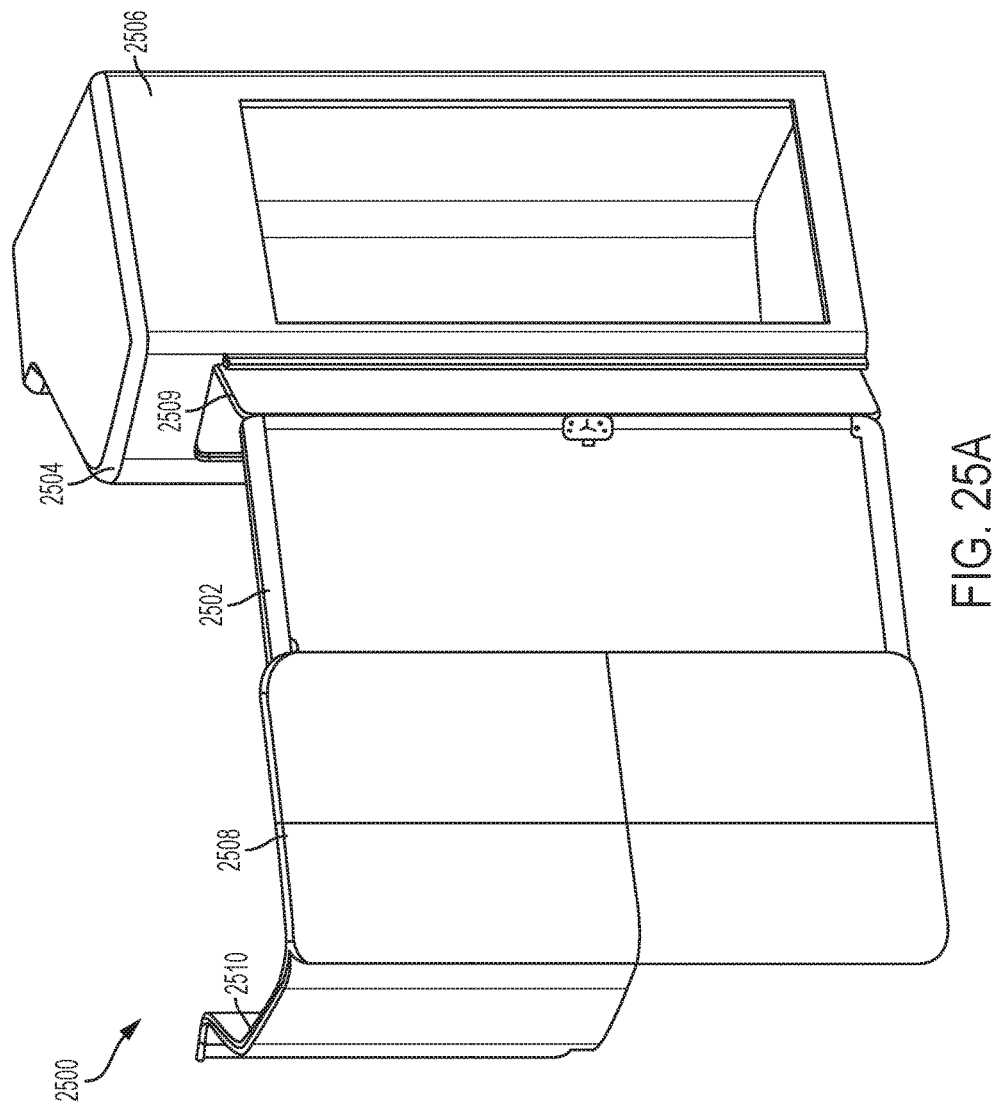
Figure 25B:
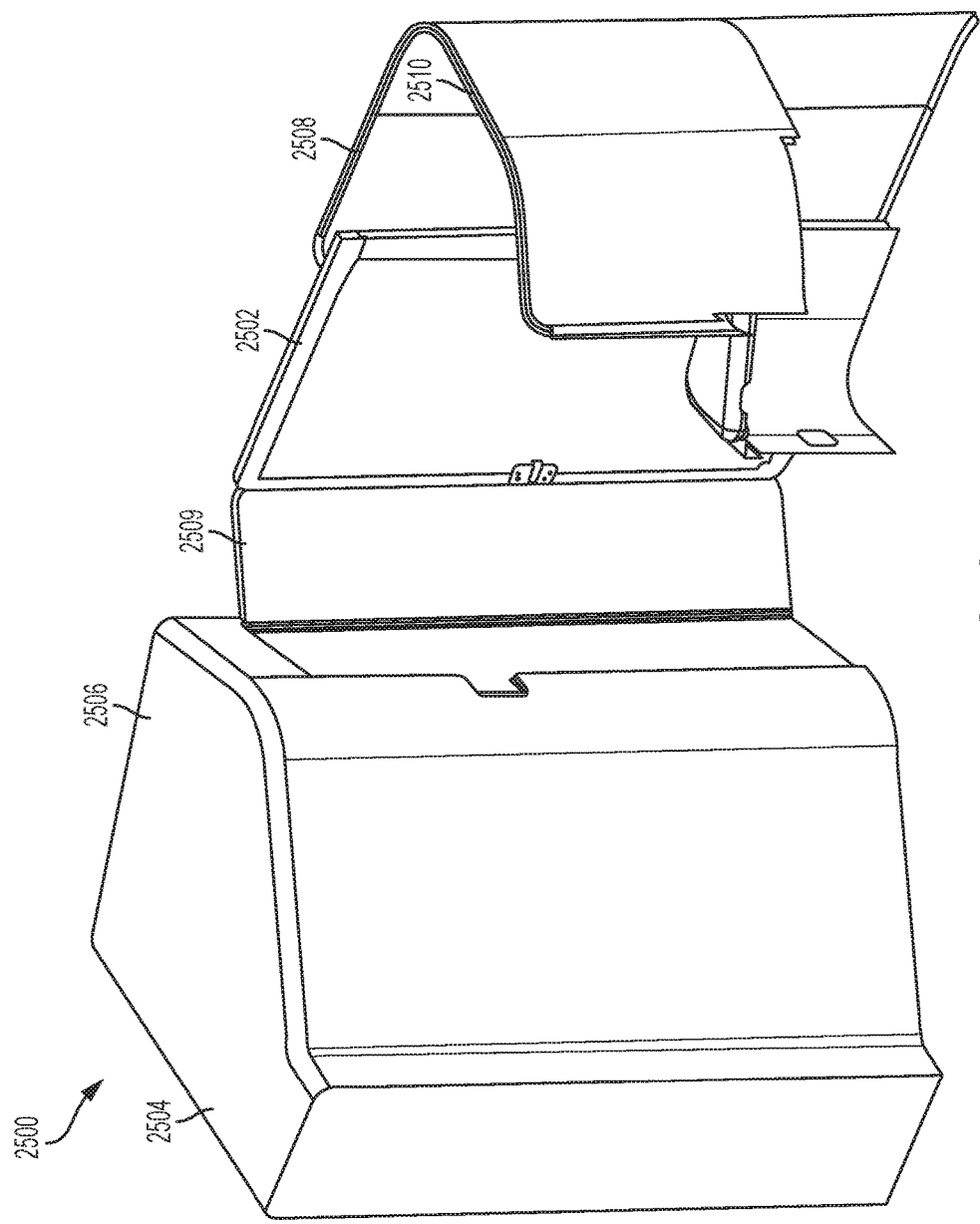
Figure 25C:
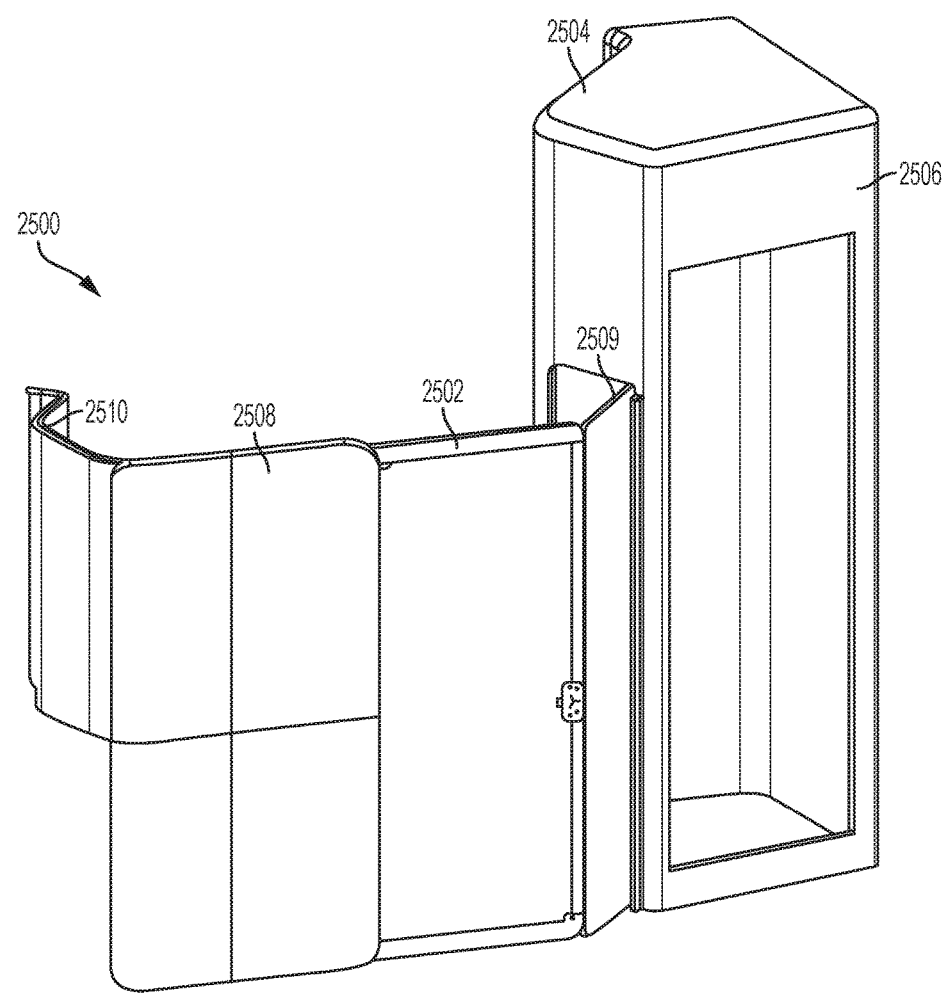

FIGS. 25A-25D illustrate views of a panel door assembly 2502 with a straight filler door 2509 for a front row passenger suite 2500 of an aircraft cabin, such as the aircraft cabin 2400 of FIG. 24. For example, FIG. 25A is an aisle-side perspective view of the passenger suite 2500, FIG. 25B is passenger-side perspective view of the passenger suite 2500, FIG. 25C is an aisle-side perspective view of the passenger suite 2500 in an underbin configuration, and FIG. 25D provides a top-down view of the passenger suite 2500. In the underbin configuration shown in FIG. 25C, a height of the aft panel 2510, aisle-side privacy panel 2508, panel door assembly 2502, and filler door 2509 may be reduced in order to fit underneath overhead storage bins in the aircraft cabin.

In some implementations, the passenger suite 2500 may include aft panel 2510 which functions as an aft boundary between the passenger suite 2500 and another passenger suite to the rear. In addition, an aft edge of forward cabin monument 2504 can function as a forward boundary of the passenger suite 2500. In some examples, the passenger suite 2500 may include a reclinable seat that extends from the aft panel 2510 to the forward cabin monument 2504 when the seat is in a lie-flat (e.g., bed) position. For example, a shape or curvature of the aft edge of the forward cabin monument 2504 may be designed to accommodate the seat of the passenger suite 2500 when in the lie-flat position.

An aisle-side privacy panel 2508, panel door assembly 2502, filler door 2509, and an aisle-side edge 2506 of the forward cabin monument 2504 form an aisle-side boundary for the passenger suite 2500. In addition, the panel door assembly 2502 shown in FIGS. 25A-25D is in a closed position such that the panel door assembly 2502 extends from a forward end of the aisle-side privacy panel 2508 in a forward direction. Because the extended panel door assembly 2502 is out of line (e.g., misaligned) with the aisle-side edge 2506 of the forward cabin monument 2504, the filler door 2509 bridges the gap caused by the misalignment. The filler door 2509 may be made of a lightweight, flexible material such as plastic and has straight (e.g., flat) inner and outer surfaces. In some implementations, the filler door 2509 is connected on one end to the forward cabin monument 2504 by a hinge or other connection mechanism and can be opened or closed by rotating, sliding, or completely detaching the filler door 2509 from the forward cabin monument 2504. In addition, the filler door 2509 engages a securing mechanism on the panel door assembly 2502 when both the panel door assembly 2502 and filler door 2509 are in a closed position. In one example, the filler door 2509 magnetically secures to the panel door assembly, but other securing mechanisms such as latches, knobs, or locks may also be used. In some examples, the filler door 2509 may include any of the implementations described above in FIGS. 1-16 with respect to the flexible privacy panels.

In some implementations, the panel door assembly 2502 slides in forward and rearward directions along an inner surface of the aisle-side privacy panel 2508 when moving between open and closed positions. When moving to the open position, the panel door assembly 2502 may slide in a rearward direction such that the panel door assembly 2502 is overlapped by the aisle-side privacy panel 2508. In addition, the panel door assembly 2502 may also overlap an armrest or table 2512 of the passenger suite 2500 when moving between the open and closed positions.

FIGS. 26A-26F are top-down views of a passenger suite 2600 that illustrate different types of operation of a straight filler door 2609 that bridges a gap between a panel door assembly 2602 in the closed position and an aisle-side edge 2606 of a forward cabin monument 2604. In the examples provided in FIGS. 26A-26F, the filler door 2609 moves in various ways between an open position where a gap exists between the panel door assembly 2602 and the aisle-side edge of the forward cabin monument 2604 and a closed position in which the filler door 2609 bridges the gap.

Figure 26A:
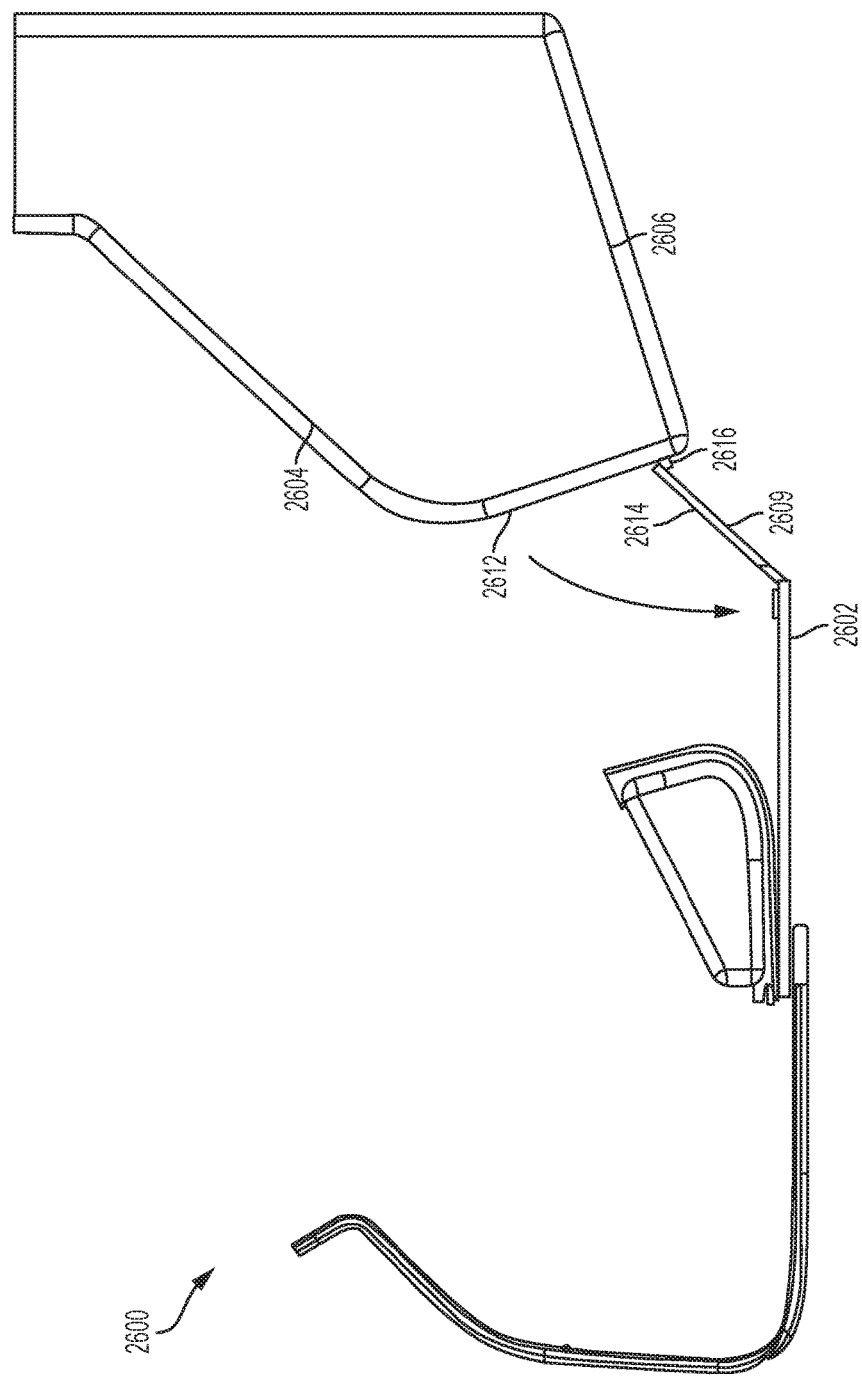
Figure 26B:
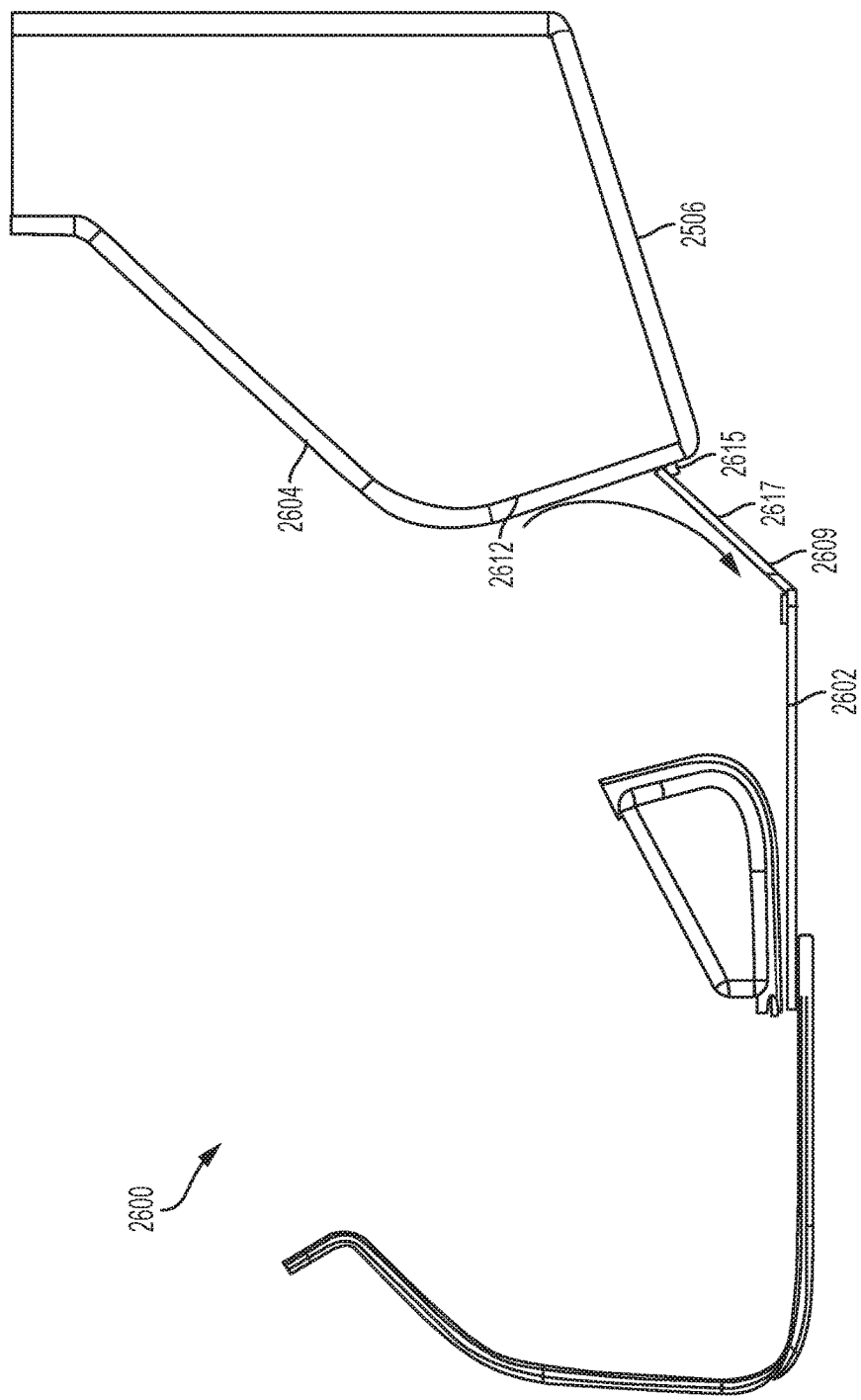

In FIG. 26A, the filler door 2609 may be hingedly connected to the forward cabin monument 2604 at hinge point 2616. For example, an inner surface 2614 of the filler door 2609 may be adjacent to an aft surface 2612 of the forward cabin monument 2604 when the filler door is in an open position. When moving from an open to a closed position, the filler door 2609 swings about the hinge point 2616 until meeting the panel door assembly 2602 in the closed position. As shown in FIG. 26B, in another example, an outer surface 2617 of the filler door 2609 translates across the aft surface of the forward cabin monument 2604 and is rotated into the closed position about rotation point 2615 when moving from the open to the closed position.

FIG. 26C illustrates operation of a filler door 2609 that includes multiple hinged panel 2618 that assist in moving the filler door 2609 between open and closed positions while maintaining a thin or low profile of the filler door 2609 when in the open position. For example, when the filler door 2609 is in an open position, the hinged panel 2618 lie flat against the aft surface of the forward cabin monument 2604. When the filler door 2609 is moved to the closed position, panel 2618a is hinged toward panel 2618b, such that inner surfaces of the panel 2618 are adjacent to one another, creating a single panel surface of the filler door 2609. Once the inner surfaces of the panels 2618 are adjacent to one another, the filler door 2609 may swing to the closed position about the hinge point 2616, as described above with respect to FIG. 26A.

Figure 26D:
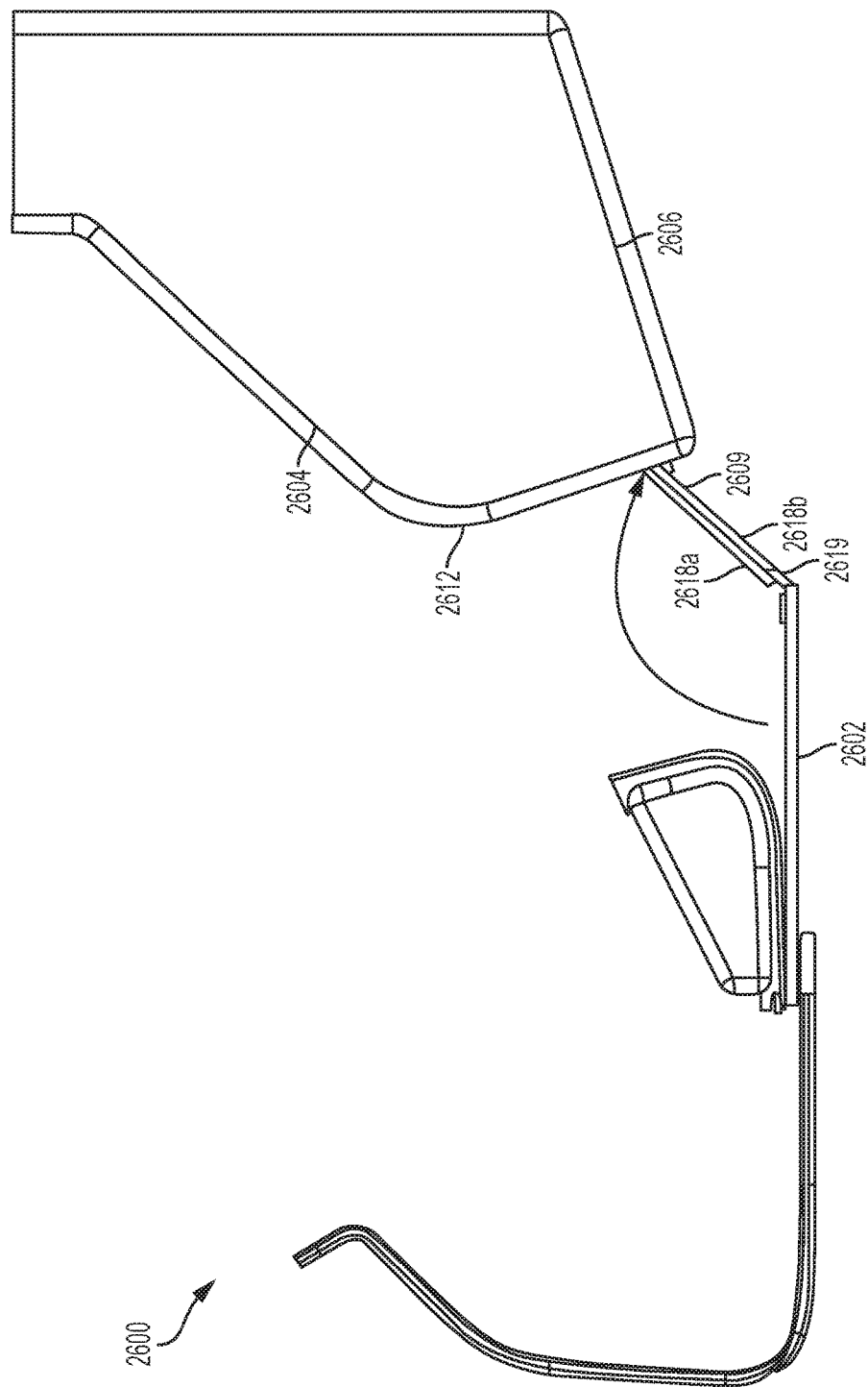

FIG. 26D illustrates another hinged implementation of the filler door 2609. In the example shown in FIG. 26D, the filler door 2609 includes hinged panel 2618 and operates in a direction opposite that shown in FIG. 26C. For example, when the filler door 2609 is in an open position, the hinged panel 2618 lie flat against the panel door assembly 2602, and the filler door 2609 is connected to a forward end of the panel door assembly 2602 at a hinge point 2619. When the filler door is moved to the closed position, panel 2618a is hinged toward panel 2618b, such that inner surfaces of the panel 2618 are adjacent to one another, creating a single panel surface of the filler door 2609. Once the inner surfaces of the panels 2618 are adjacent to one another, the filler door 2609 may swing to the closed position about the hinge point 2619 until the filler door 2609 meets the aisle-side edge 2606 of the forward cabin monument 2604.

Figure 26E:
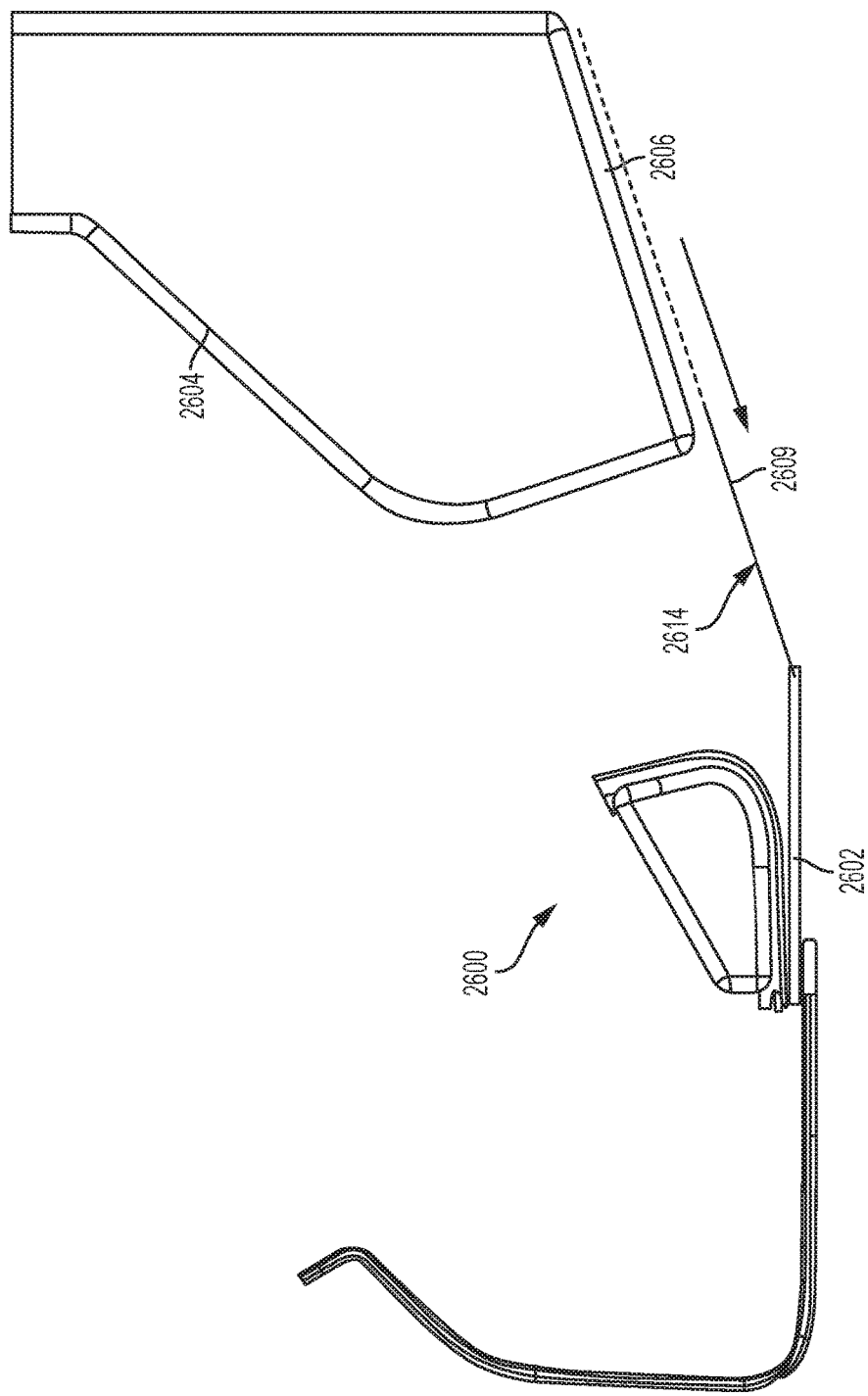

In the example illustrated in FIG. 26E, the inner surface 2614 of the filler door 2609 slides across the aisle-side edge 2606 of the forward cabin monument 2604 when moving from the open position to the closed position. For example, when in the open position, the filler door 2609 completely overlaps the aisle-side edge 2606 of the forward cabin monument 2604. As the filler door 2609 moves to the closed position, the filler door 2609 translates across the aisle-side edge 2606 until reaching the panel door assembly 2602. The example shown in FIG. 26E may be implemented in situations where the aisle-side edge 2606 does not provide access to the contents of the forward cabin monument 2604 so that the filler door 2609 does not cover up access to any aisle-side doors or openings for the forward cabin monument 2604.

Figure 26F:
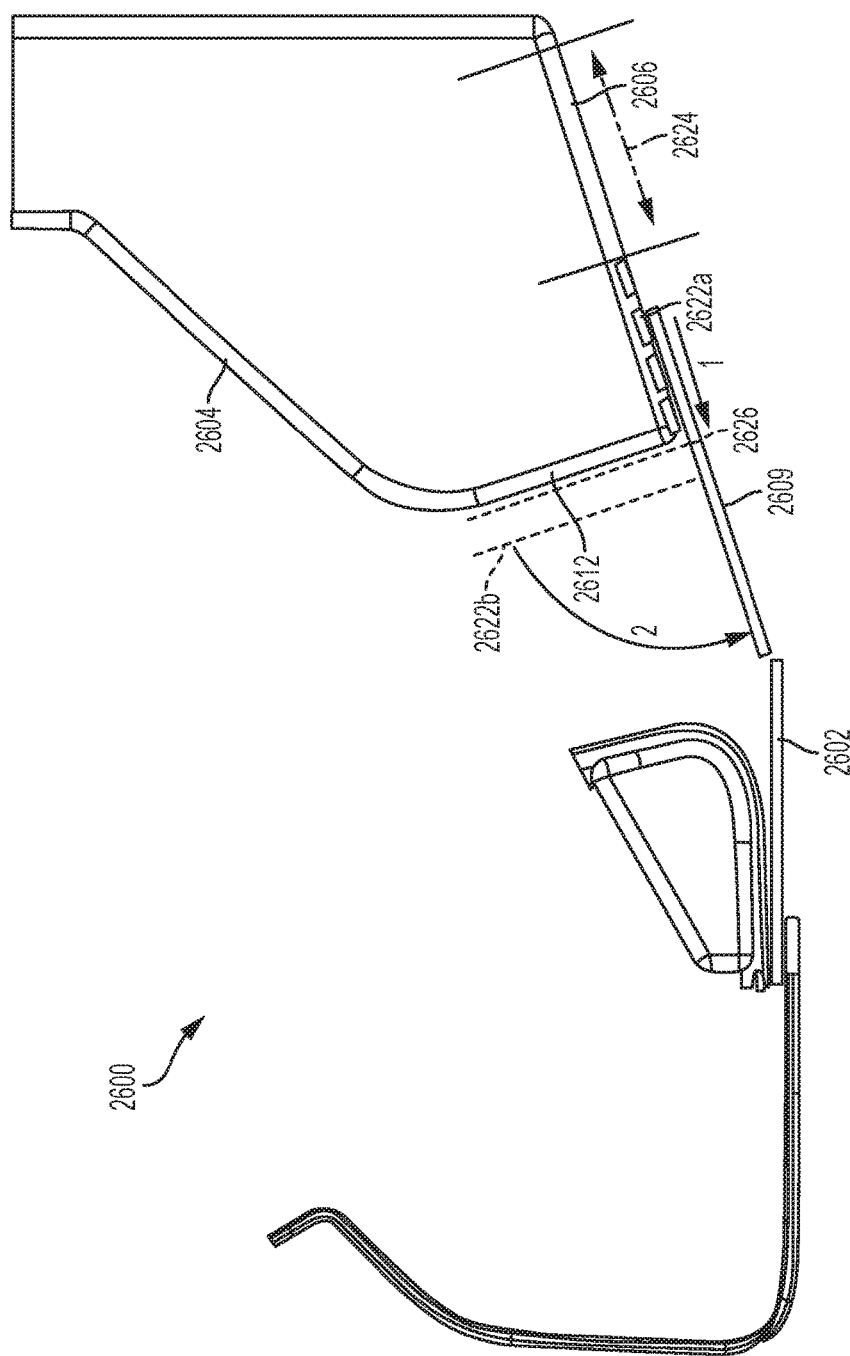

FIG. 26F illustrates another hinged implementation of the filler door 2609 that may be used in situations where the forward cabin monument 2604 includes aisle-side doors or openings so the aisle-side edge 2606 includes a length 2624 that remains uncovered by the filler door 2609 to provide access to the aisle-side compartments. In the example shown in FIG. 26F, the filler door 2609 includes hinged panels 2622. When in an open position, the filler door 2609 is bent at a hinge point 2626 such that panel 2622a is adjacent to the aisle-side edge 2606 of the forward cabin monument, and panel 2622b is adjacent to an aft surface 2612 of the forward cabin monument 2604. When moving from the open position to the closed position, the panel 2622a translates across the aisle-side edge 2606 of the forward cabin monument 2604 toward the panel door assembly 2602, and the panel 2622 is rotated about the hinge point 2626 to the closed position where the filler door 2609 makes contact with the panel door assembly 2602.

Figure 27A:
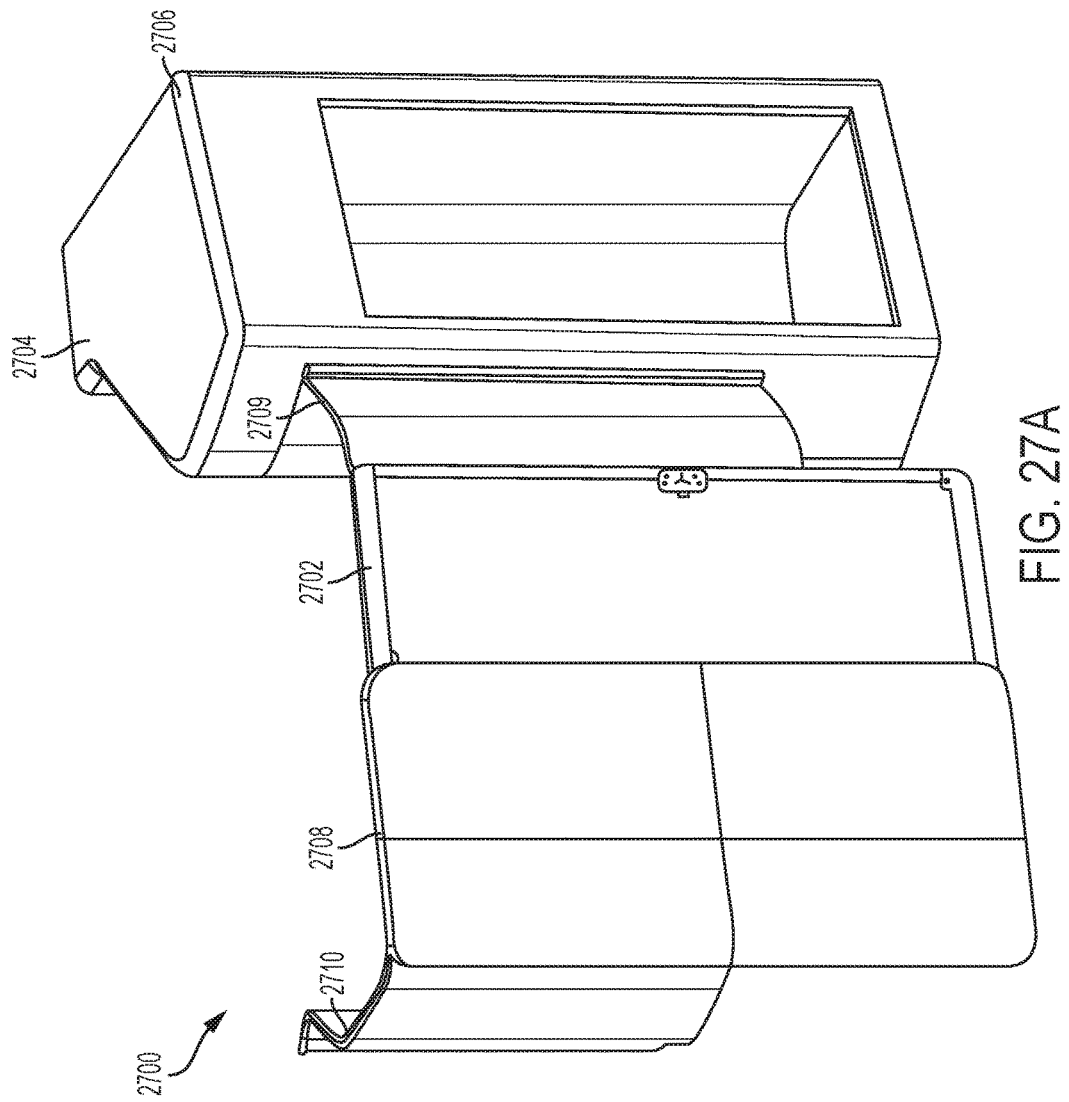
Figure 27B:
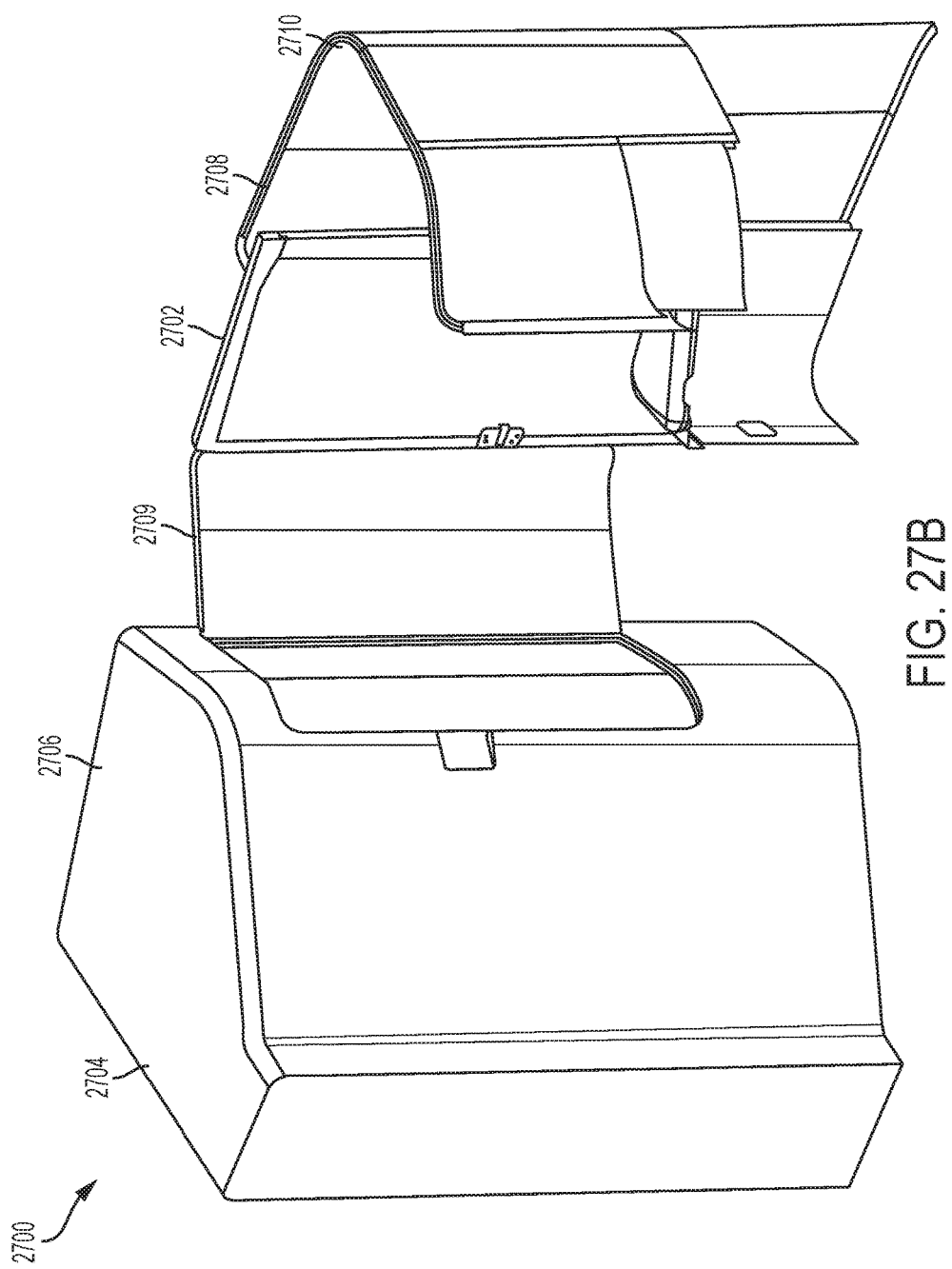
Figure 27C:
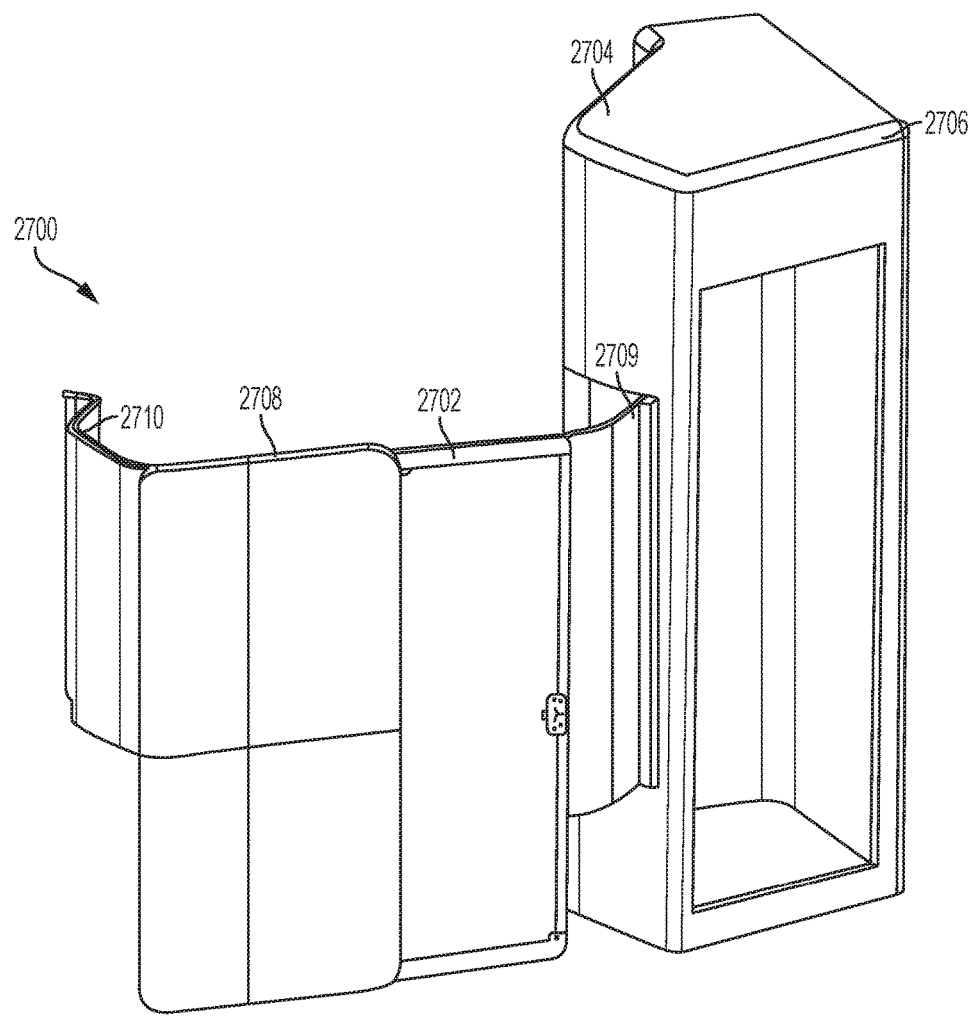

Turning to FIGS. 27A-27D, views of a panel door assembly 2702 with a curved filler door 2709 for front row passenger suite 2700 of an aircraft cabin, such as the aircraft cabin 2400 are illustrated. For example, FIG. 27A is an aisle-side perspective view of the passenger suite 2700, FIG. 27B is passenger-side perspective view of the passenger suite 2700, FIG. 27C is an aisle-side perspective view of the passenger suite 2700 in an underbin configuration, and FIG. 27D provides a top-down view of the passenger suite 2700. In the underbin configuration shown in FIG. 27C, a height of the aft panel 2710, aisle-side privacy panel 2708, panel door assembly 2702, and filler door 2709 may be reduced in order to fit underneath overhead storage bins in the aircraft cabin.

In some implementations, the passenger suite 2700 may include aft panel 2710 which functions as an aft boundary between the passenger suite 2700 and another passenger suite to the rear. In addition, an aft edge of forward cabin monument 2704 can function as a forward boundary of the passenger suite 2700. In some examples, the passenger suite 2700 may include a reclinable seat that extends from the aft panel 2710 to the forward cabin monument 2704 when the seat is in a lie-flat (e.g., bed) position. For example, a shape or curvature of the aft edge of the forward cabin monument 2704 may be designed to accommodate the seat of the passenger suite 2700 when in the lie-flat position.

An aisle-side privacy panel 2708, panel door assembly 2702, filler door 2709, and an aisle-side edge 2706 of the forward cabin monument 2704 form an aisle-side boundary for the passenger suite 2700. In addition, the panel door assembly 2702 shown in FIGS. 27A-27D is in a closed position such that the panel door assembly 2702 extends from a forward end of the aisle-side privacy panel 2708 in a forward direction. Because the extended panel door assembly 2702 is out of line (e.g., misaligned) with the aisle-side edge 2706 of the forward cabin monument 2704, the filler door 2709 bridges the gap caused by the misalignment. The filler door 2709 may be made of a lightweight, flexible material such as plastic and has curved inner and outer surfaces. In some examples, the filler door 2709 is concave toward an inside of the passenger suite 2700 and convex toward an aisle. In some implementations, the filler door 2709 is connected on one end to the forward cabin monument 2704 by a hinge or other connection mechanism and can be opened or closed by rotating, sliding, or completely detaching the filler door 2709 from the forward cabin monument 2704. In addition, the filler door 2709 engages a securing mechanism on the panel door assembly 2702 when both the panel door assembly 2702 and filler door 2709 are in a closed position. In one example, the filler door 2709 magnetically secures to the panel door assembly, but other securing mechanisms such as latches, knobs, or locks may also be used.

In some implementations, the panel door assembly 2702 slides in forward and rearward directions along an inner surface of the aisle-side privacy panel 2708 when moving between open and closed positions. When moving to the open position, the panel door assembly 2702 may slide in a rearward direction such that the panel door assembly 2702 is overlapped by the aisle-side privacy panel 2708. In addition, the panel door assembly 2702 may also overlap an armrest or table 2712 of the passenger suite 2700 when moving between the open and closed positions.

Figure 28B:
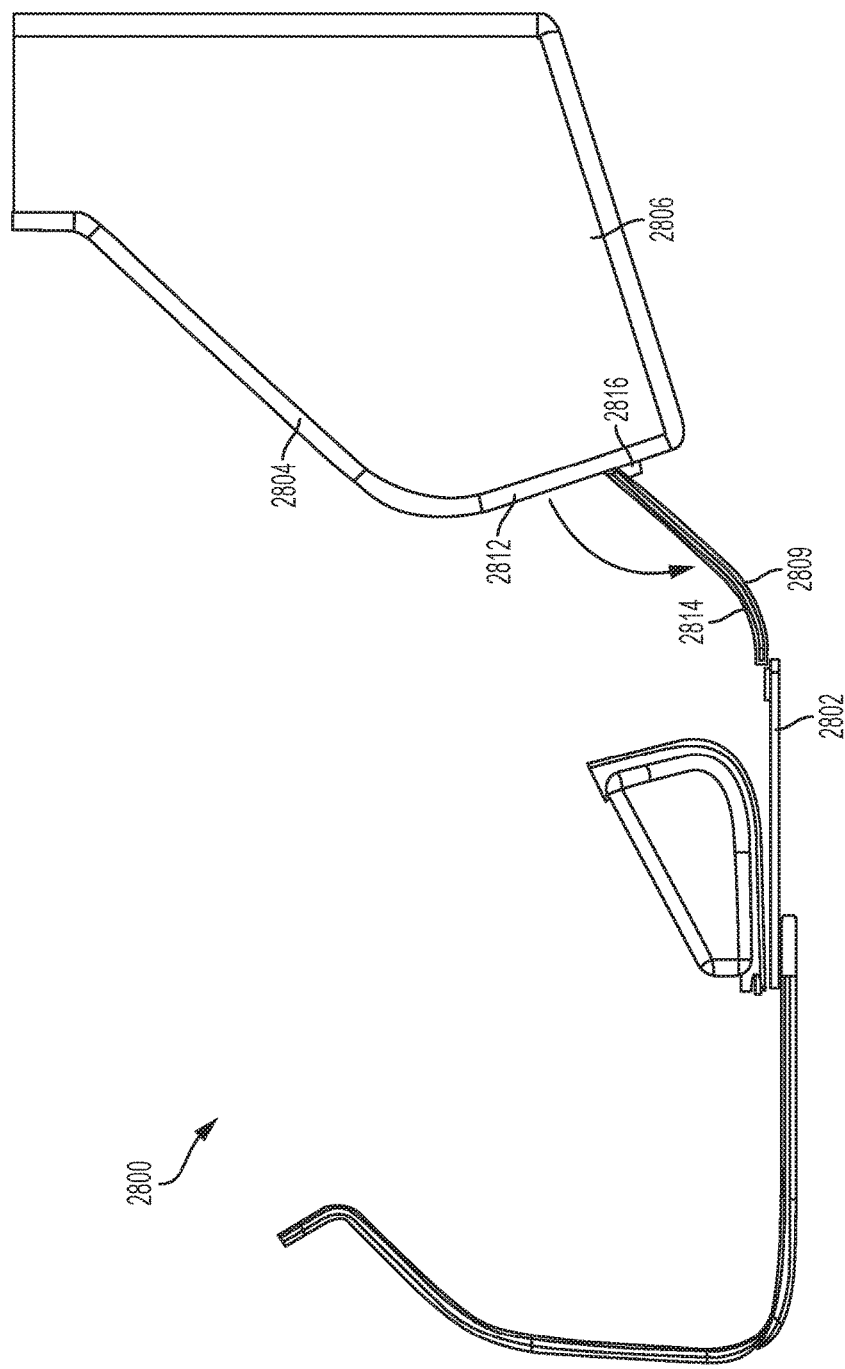
Figure 28C:
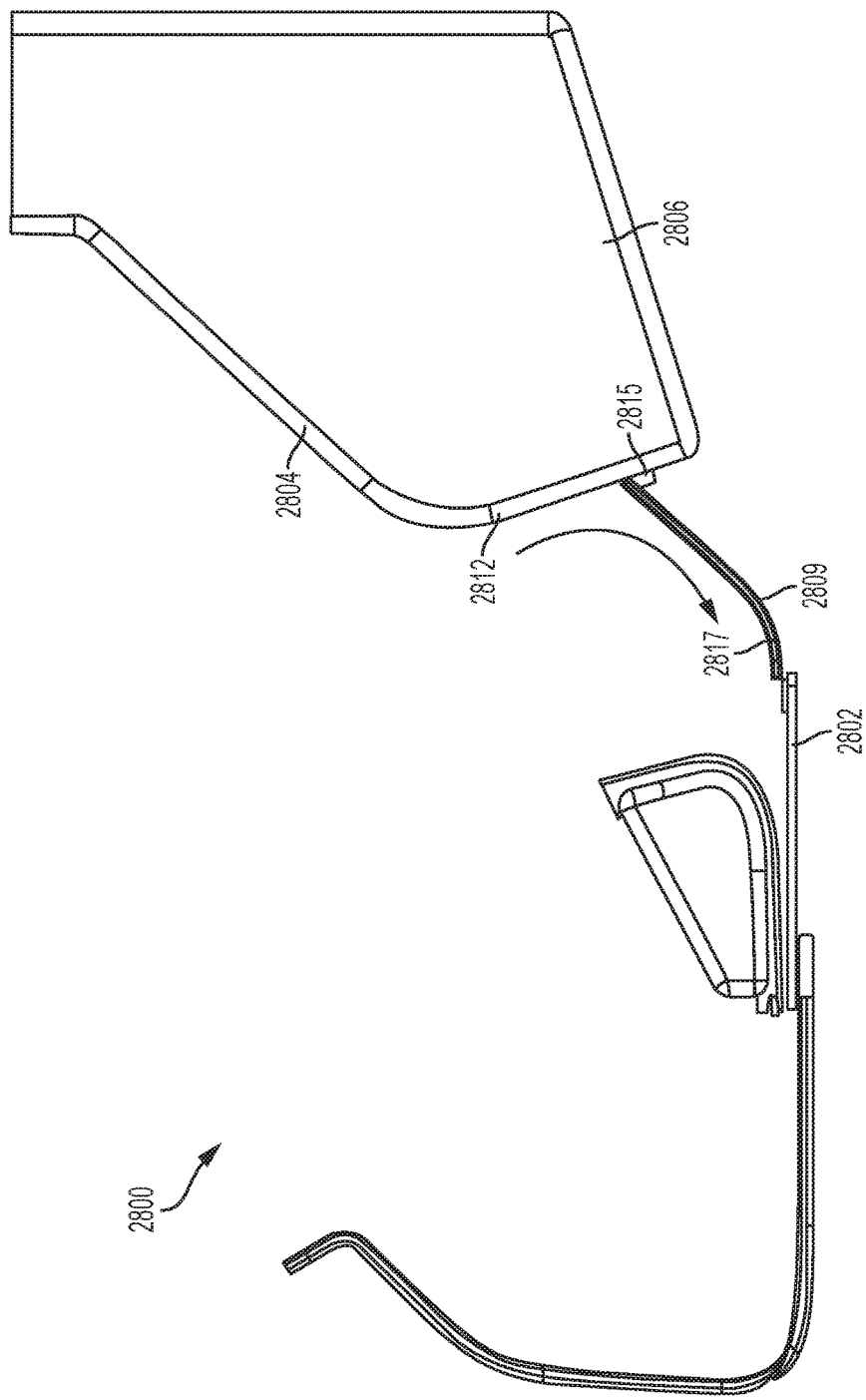

FIGS. 28A-28C are top-down views of a passenger suite 2800 that illustrate different types of operation of a curved filler door 2809 that bridges a gap between a panel door assembly 2802 in the closed position and an aisle-side edge 2806 of a forward cabin monument 2804. In the examples provided in FIGS. 28A-28C, the filler door 2809 moves in various ways between an open position where a gap exists between the panel door assembly 2802 and the aisle-side edge of the forward cabin monument 2804 and a closed position in which the filler door 2809 bridges the gap.

In the implementation illustrated in FIG. 28A, the filler door 2809 is detachably attached to the panel door assembly 2802 such that the filler door 2809 can be completely disconnected from the forward cabin monument 2804 and the panel door assembly 2802. In some implementations, the filler door 2809 can be magnetically connected to the forward cabin monument 2804 and the panel door assembly 2802, and may be stowed within the forward cabin monument 2804 or in another location when disconnected. The example illustrated in FIG. 28A can also be applied to the straight filler door 2609 described above.

In FIG. 28B, the filler door 2809 may be hingedly connected to the forward cabin monument 2804 at hinge point 2816. For example, an inner surface 2814 of the filler door 2809 may be adjacent to an aft surface 2812 of the forward cabin monument 2804 when the filler door is in an open position. When moving from an open to a closed position, the filler door 2809 swings about the hinge point 2816 until meeting the panel door assembly 2802 in the closed position. In some implementations, the curvature of the filler door 2609 mirrors the curvature of the aft surface 2812 of the forward cabin monument 2804 such that the filler door 2809 lies flat against the aft surface 2812 of the forward cabin monument 2804 when in the open position. As shown in FIG. 28C, in another example, an outer surface 2817 of the filler door 2809 translates across the aft surface of the forward cabin monument 2804 and is rotated into the closed position about rotation point 2815 when moving from the open to the closed position.

The implementations described above are directed to panel door assemblies that provide passengers with a private traveling experience while still allowing passengers to safely egress from passenger suites during emergencies. During normal use operations, the panel door assemblies may operate as a single panel to either slide into or out of a panel recess in the passenger suite or rotate between open and closed positions without violating aisle clearance regulations. In some implementations, the panel door assembly may also include an emergency handle that may be operated by the passenger from within the suite that separates a removable portion from a stationary portion of the panel door assembly by operating latch mechanisms connecting the removable portion to the stationary portion, allowing the passenger to exit the passenger suite even when a normal operation path of the panel door assembly may be restricted such as during an emergency.

The panel door assemblies described herein can also be implemented for front row passenger suites where forward cabin monuments function as a forward boundary of the suites. In some implementations, an aisle-side edge of the front row passenger suite is aligned with an aisle-side edge of the forward cabin monuments such that the panel door assembly extends from the passenger suite to the forward cabin monuments so that the passenger is enclosed within the suite when the panel door assembly is in a closed position. In examples of other aircraft cabin configurations, an aisle-side edge of the front row passenger suite may be out of line with an aisle-side edge of the forward cabin monuments such that a gap exists between the panel door assembly in an extended closed position and the aisle-side edge of the forward cabin monuments. In implementations where the aisle-side edge of the front row passenger suite is not aligned with the aisle-side edge of the forward cabin monuments, a filler door may be included that bridges the gap between the panel door assembly and the forward cabin monuments so that a passenger can be completely enclosed within the suite when the panel door assembly is in the closed position. The filler door may be detachably attached to the forward cabin monuments to provide for opening and closing the filler door during both normal and emergency operations.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A panel door assembly for providing access to an aircraft passenger suite comprising:
   a stationary panel having a side portion extending from an upper end to a lower end of the panel door assembly, and a lower portion extending across a width of the panel door assembly, wherein the lower portion is configured to slide along a rail disposed at a lower end of the panel door assembly between an open position and a closed position during normal operations; and
   a removable panel detachably attached to the stationary panel, the removable panel including
      a first latching mechanism configured to connect the removable panel to an upper portion of the stationary panel,
      a second latching mechanism configured to connect the removable panel to the lower portion of the stationary panel, and
      an emergency handle connected on an inner side of the removable panel;
   wherein the stationary panel and the removable panel are configured to operate as a single panel structure in a normal operational mode as the lower portion of the stationary panel slides along the rail between the open position and the closed position; and
   wherein, in an emergency operational mode, the emergency handle is configured, upon actuation, to engage the first latching mechanism and the second latching mechanism such that the removable panel is disconnected from the stationary panel to provide an emergency egress path from the passenger suite.

2. The panel door assembly of claim 1, wherein the removable panel, upon disconnection from the stationary panel, is configured to hinge toward an interior of the aircraft passenger suite.

3. The panel door assembly of claim 1, further comprising a first cable configured to couple of the first latching mechanism to the emergency handle, and a second cable configured to couple the first latching mechanism to the emergency handle such that actuation of the emergency handle causes the first cable to cause release of the first latching mechanism and the second cable to cause release of the second latching mechanism.

4. The panel door assembly of claim 3, wherein each of the first latching mechanism and the second latching mechanism comprises:
   a lever configured to rotate about a pivot in response to a pulling force applied by a respective cable coupled to the lever, the pulling force from the respective cable caused by the actuation of the emergency handle; and
   a rotating gear coupled to the lever by a connection bar, the connection bar causing rotation of the rotating gear in response to rotation of the lever.

5. The panel door assembly of claim 4, wherein the connection bar includes a groove defining a translation path for a fastener attaching the connection bar to the lever, the groove configured to limit an amount of rotation of the lever.

6. The panel door assembly of claim 5, wherein each lever of the first latching mechanism and the second latching mechanism includes a set of complementary teeth configured to engage gear teeth of the rotating gear, the complementary teeth configured to limit an amount of rotation of the rotating gear.

7. The panel door assembly of claim 4, wherein each of the first latching mechanism and the second latching mechanism further comprises a pivoting latch coupled to the rotating gear, the pivoting latch configured to latch a respective latching mechanism to the stationary panel of the panel door assembly.

8. The panel door assembly of claim 7, wherein rotation of the rotating gear causes rotation of the pivoting latch such that the respective latching mechanism unlatches from the stationary panel of the panel door assembly.

9. The panel door assembly of claim 7, wherein each of the first latching mechanism and the second latching mechanism further comprises a retention mechanism configured resist movement of the pivoting latch when the latching mechanism is in a latched position connecting the removable panel to the stationary panel.

10. The panel door assembly of claim 1, wherein the emergency handle is configured to be actuated in response to pulling the emergency handle in an inward direction toward a passenger within an interior of the passenger suite.

11. The panel door assembly of claim 1, wherein the panel door assembly is configured to extend across at least a portion of an egress path of a front row passenger suite, wherein at least a portion of a forward boundary of the front row passenger suite is defined by a forward cabin monument.

12. The panel door assembly of claim 11, wherein the egress path of the front row passenger suite is defined by an aisle-side edge of the forward cabin monument and an aisle-side privacy panel of the passenger suite.

13. The panel door assembly of claim 12, wherein the aisle-side edge of the forward cabin monument is aligned with the aisle-side privacy panel such that the panel door assembly is configured to extend from the aisle-side privacy panel to the aisle-side edge of the forward cabin monument when the panel door assembly is in the closed position.

14. The panel door assembly of claim 12, wherein the aisle-side edge of the forward cabin monument is out of alignment with the aisle-side privacy panel such that a gap exists between the panel door assembly and the aisle-side edge of the forward cabin monument when the panel door assembly is in the closed position.

15. The panel door assembly of claim 14, wherein a filler door portion is configured to bridge the gap between the panel door assembly in the closed position and the aisle-side edge of the forward cabin monument.

16. A front row aircraft cabin passenger suite including a forward boundary defined by a forward cabin monument, the front row aircraft cabin passenger suite comprising:
   an aisle-side privacy panel; and
   a panel door assembly for providing access to the aircraft passenger suite configured to extend across at least a portion of an egress path of the passenger suite, the egress path defined by an aisle-side edge of the forward cabin monument and the aisle-side privacy panel, the panel door assembly including
      a stationary panel having a side portion extending from an upper end to a lower end of the panel door assembly, and a lower portion extending across a width of the panel door assembly, wherein the lower portion is configured to slide along a rail disposed at a lower end of the panel door assembly between an open position and a closed position in a normal operational mode, and
      a removable panel detachably attached to the stationary panel, the removable panel including an emergency handle connected on an inner side of the removable panel;
   wherein the stationary panel and the removable panel are configured to operate as a single panel structure in the normal operational mode as the lower portion of the stationary panel slides along the rail between the open position and the closed position; and
   wherein the emergency handle is configured, upon actuation, to engage at least one latching mechanism such that the removable panel is disconnected from the stationary panel to provide an emergency egress path from the passenger suite in an emergency operational mode.

17. The front row passenger suite of claim 16, wherein the aisle-side edge of the forward cabin monument is out of alignment with the aisle-side privacy panel such that a gap exists between the panel door assembly and the aisle-side edge of the forward cabin monument when the panel door assembly is in the closed position.

18. The front row passenger suite of claim 17, further comprising a filler door portion configured to bridge the gap between the panel door assembly in the closed position and the aisle-side edge of the forward cabin monument.

19. The front row passenger suite of claim 18, wherein the filler door portion includes a flexible panel having a straight or curved shape.

20. The front row passenger suite of claim 18, wherein the filler door portion is hingedly connected to the forward cabin monument such that the filler door portion hingedly rotates to contact an edge of the panel door assembly when the panel door assembly is in the closed position.

* * * * *